(12) United States Patent
Sevigny

(10) Patent No.: US 7,084,879 B2
(45) Date of Patent: Aug. 1, 2006

(54) IMAGE PROCESSING

(75) Inventor: Benoit Sevigny, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 304 days.

(21) Appl. No.: 10/324,565

(22) Filed: Dec. 19, 2002

(65) Prior Publication Data

US 2004/0051716 A1    Mar. 18, 2004

(30) Foreign Application Priority Data

Aug. 30, 2002  (GB) .................................. 0220138
Sep. 13, 2002  (GB) .................................. 0221265

(51) Int. Cl.
*G09G 5/00*    (2006.01)

(52) U.S. Cl. ...................... 345/581; 345/589; 345/590; 345/592; 345/594

(58) Field of Classification Search ................ 345/581, 345/589, 590, 592, 594
See application file for complete search history.

(56) References Cited

U.S. PATENT DOCUMENTS 4,007,487 A    2/1977  Vlahos
5,923,380 A    7/1999  Yang et al.
5,990,903 A    11/1999 Donovan

FOREIGN PATENT DOCUMENTS

GB    2291759 A    1/1996

OTHER PUBLICATIONS

Search Report No. GB 0221265.2 dated Feb. 25, 2003, Examiner Natasha Jenkins, 1 page.

*Primary Examiner*—Matthew C. Bella
*Assistant Examiner*—Mike Rahmjoo
(74) *Attorney, Agent, or Firm*—Staas & Halsey LLP

(57) ABSTRACT

Apparatus is provided to flare-suppress a source frame. A distance value is defined that, for any pixel, describes how close its color is to a specified color, and the processing means calculates a transformation that maximizes the distance value of a selected background pixel. A flare value is then calculated for each pixel that is a function of the distance value of the corresponding transformed pixel. Compensating values are also calculated that are functions of the amounts that when added to the components of the transformed selected background pixel make its color grey. The processing means then, for each pixel, multiplies the compensating values by the flare value and adds the results to the components of the pixel to suppress flare of the backing color from the foreground image.

34 Claims, 57 Drawing Sheets

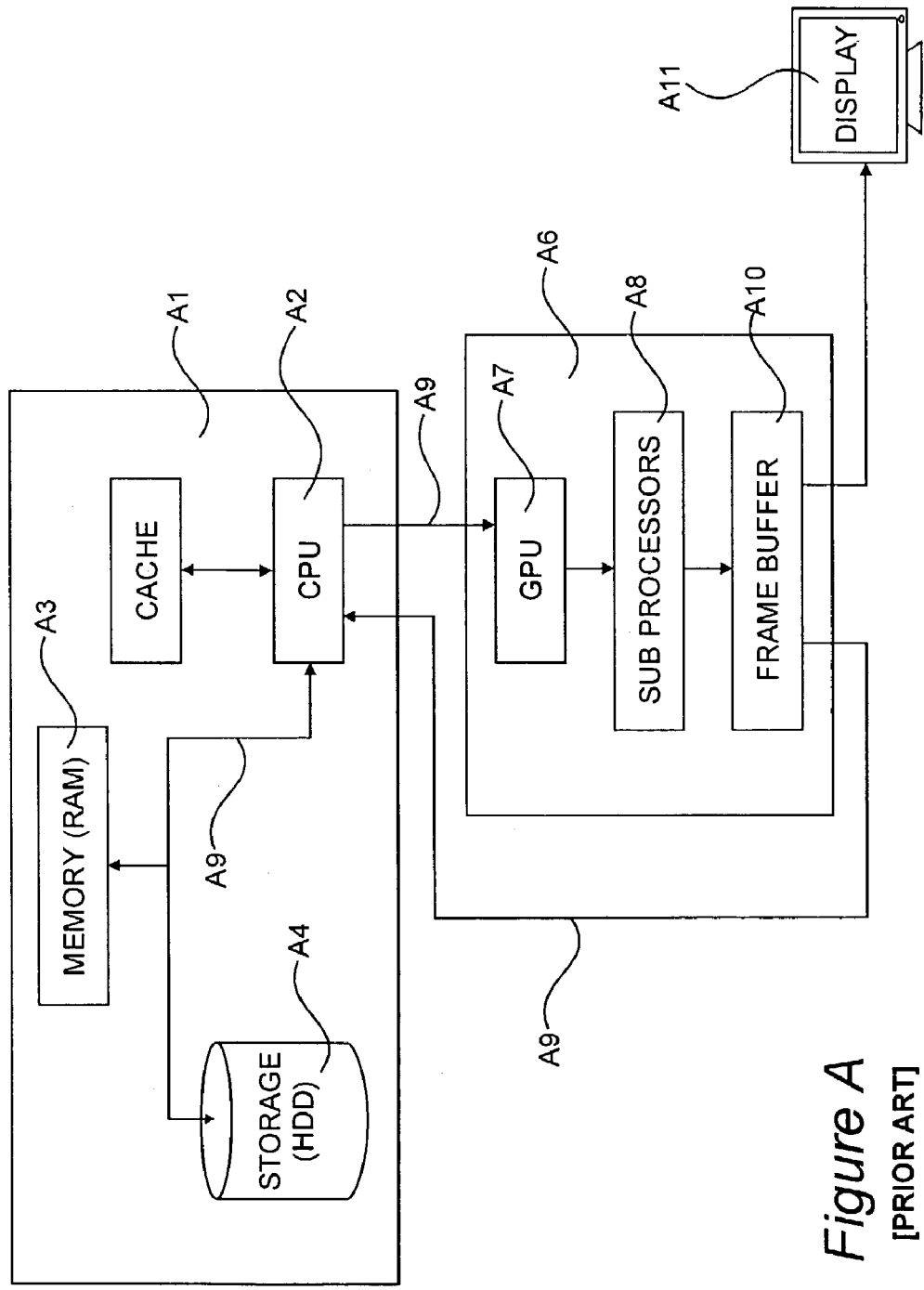
*Figure A*
[PRIOR ART]

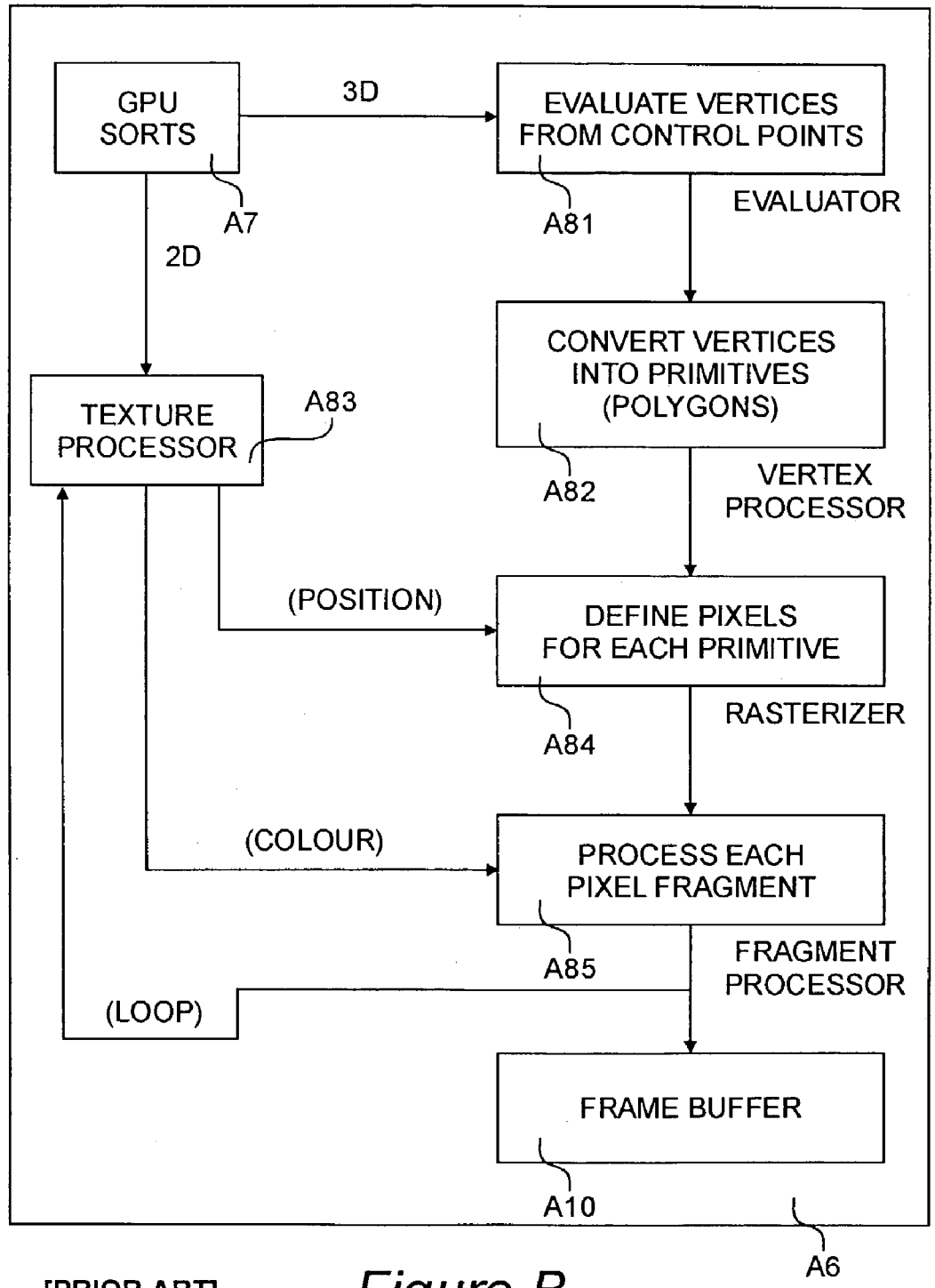
[PRIOR ART] *Figure B* gl_Color3f(1.0; 0.0; 0.0) — C1
gl_Rect(X1; Y1; X2; Y2) — C2 gl_Enable(Blend) — C3
gl_Blend(Fn)(GL_SRC_ALPHA; GL_ONE; MIN_SRC_ALPHA) — C4
gl_DrawBuffer(1.0; 0.0; 0.0; Alpha) — C1
gl_Rect(X1; Y1; X2; Y2) — C2 gl_FeedbackBuffer(GL_size i; GlenumGL_4D_COLOR_TEXTURE; Glfloat*) — C5
gl_RenderMode(GL_FEEDBACK)
gl_Passthrough(argument γ)
gl_Passthrough(argument γ + ∪)
gl_RenderMode(GL_RENDER) — C6 gl_ReadPixels(GL_RGBA) — C7
gl_DrawPixels(GL_RGBA)
(Frag Ops) — C8
gl_CopyPixels

[PRIOR ART]
*Figure C*

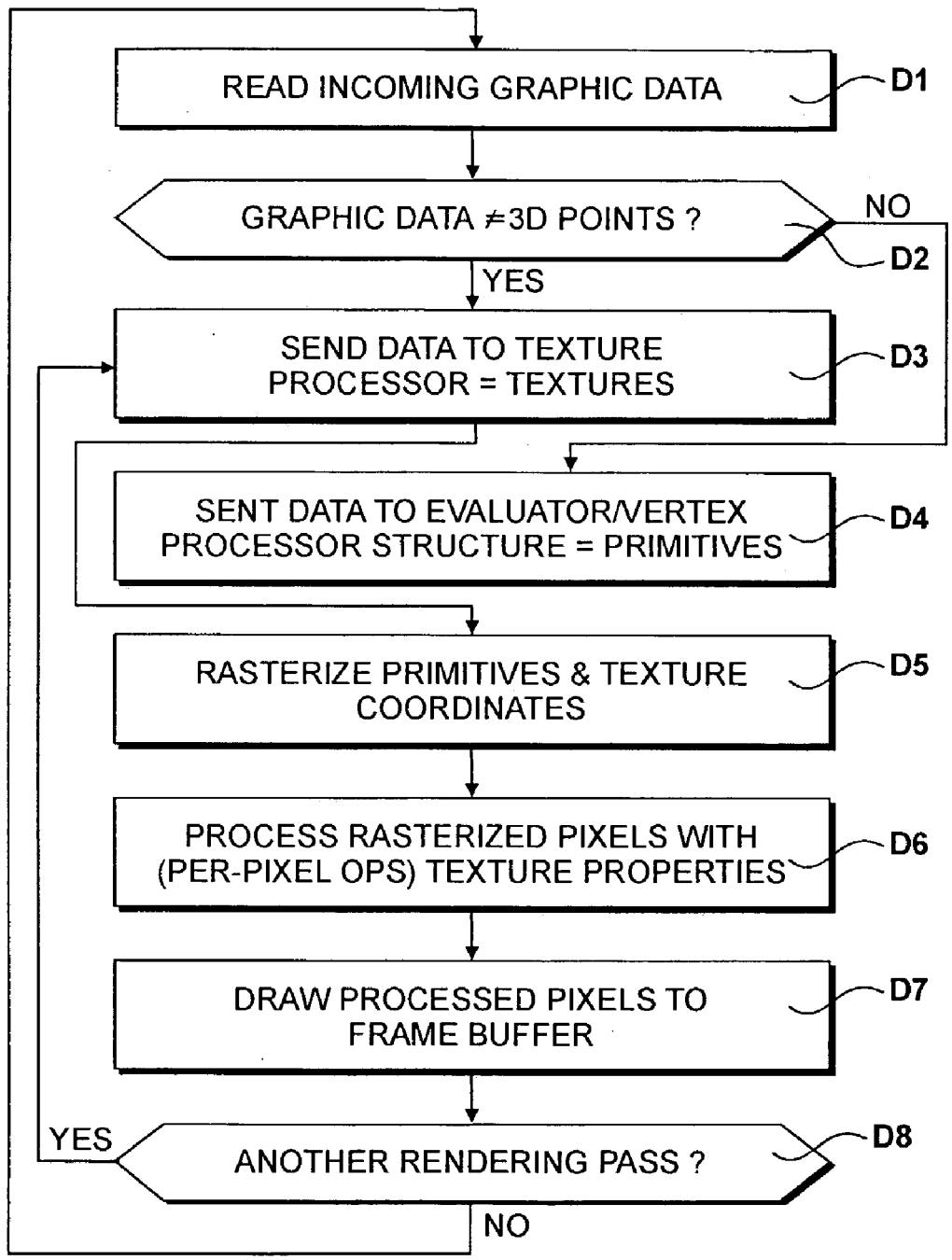
[PRIOR ART] *Figure D*

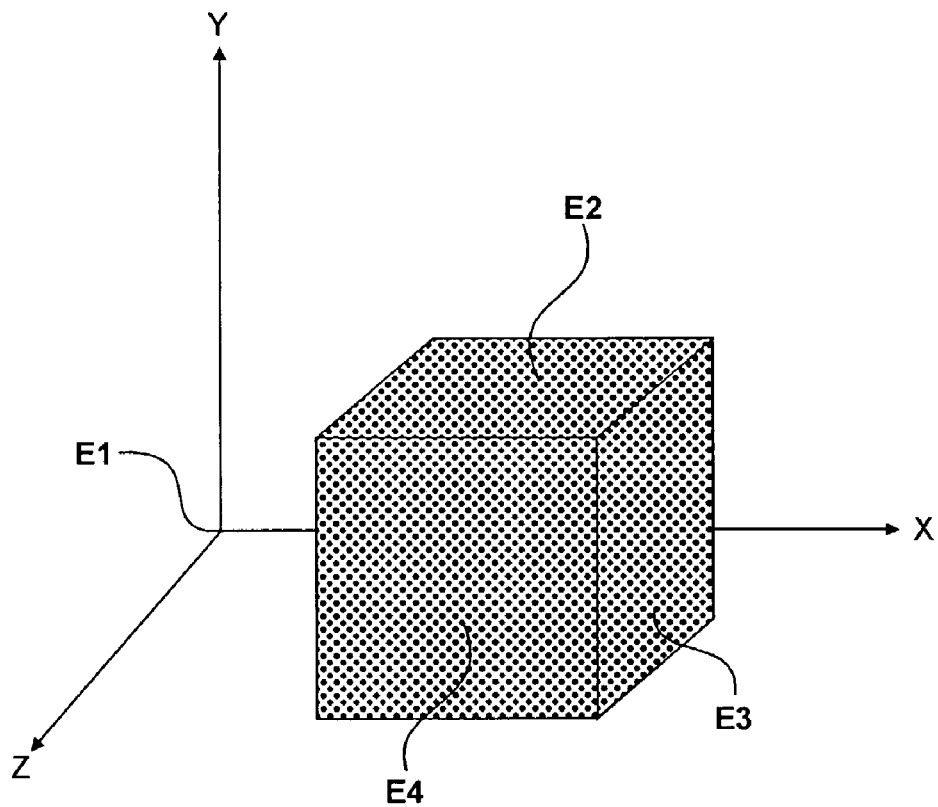
[PRIOR ART]
*Figure E*

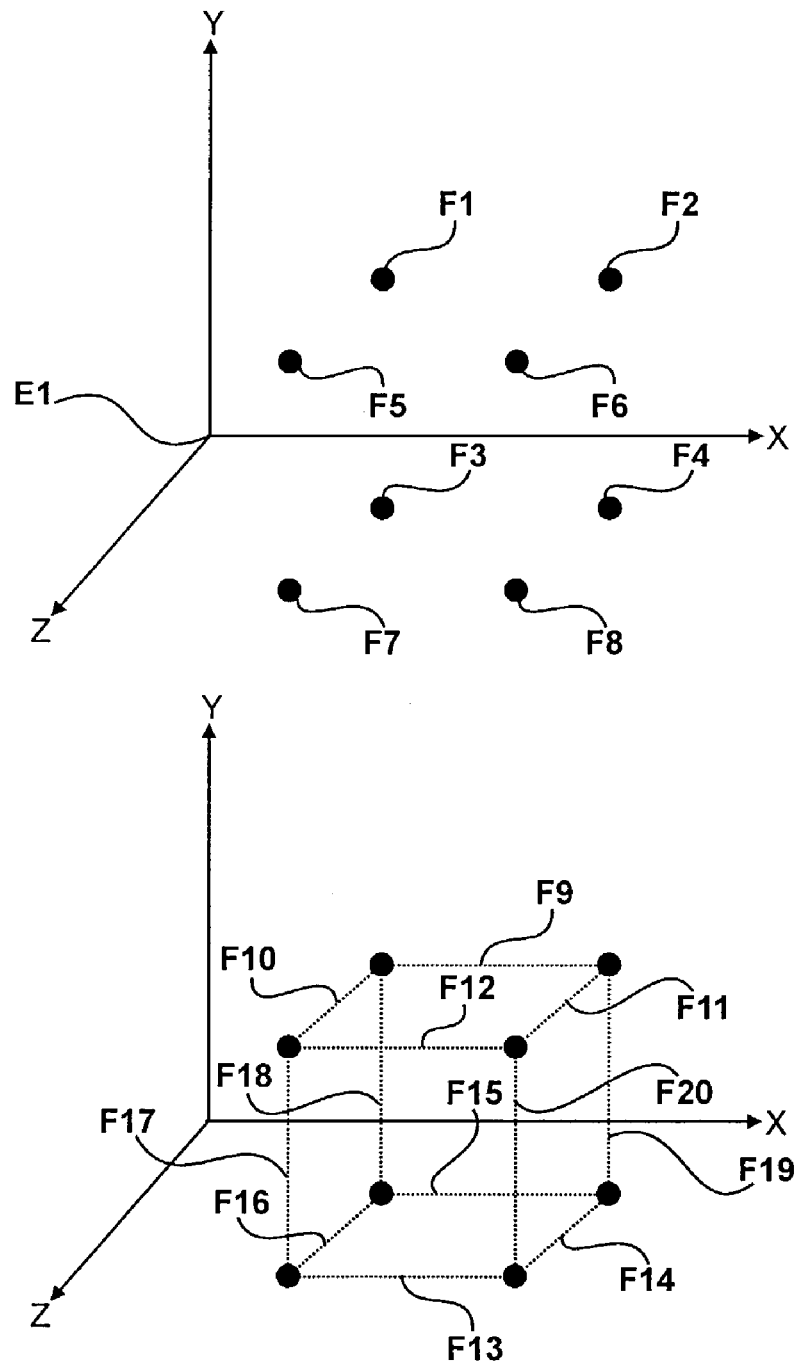
[PRIOR ART] *Figure F*

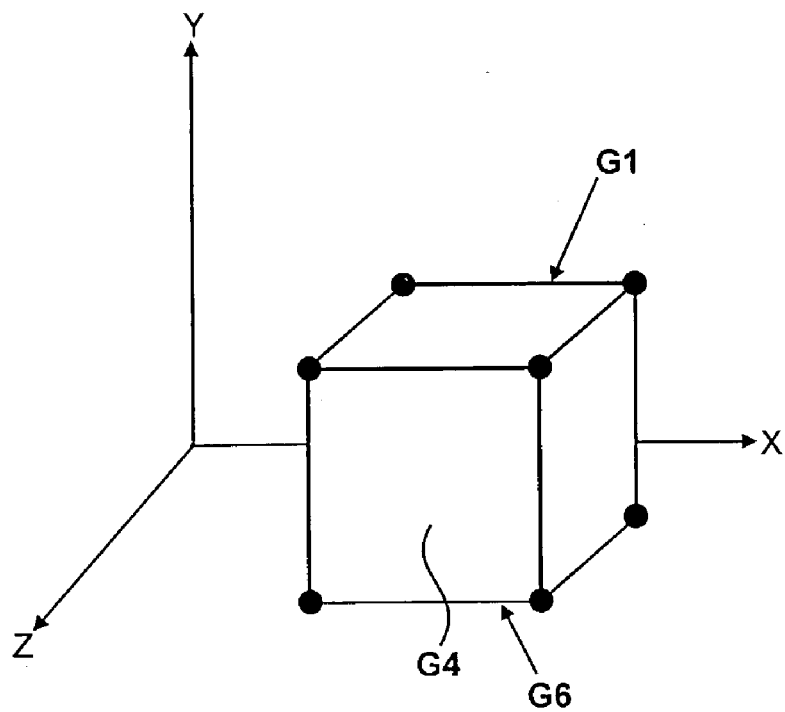
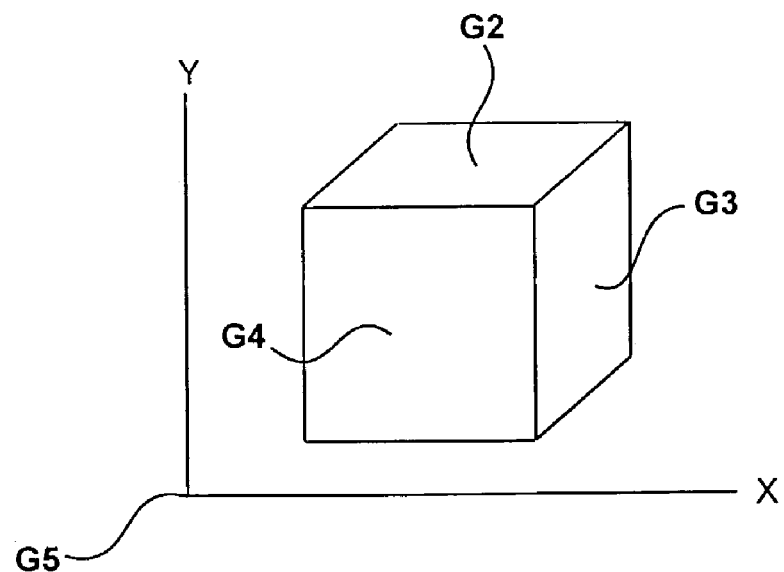
[PRIOR ART]  *Figure G*

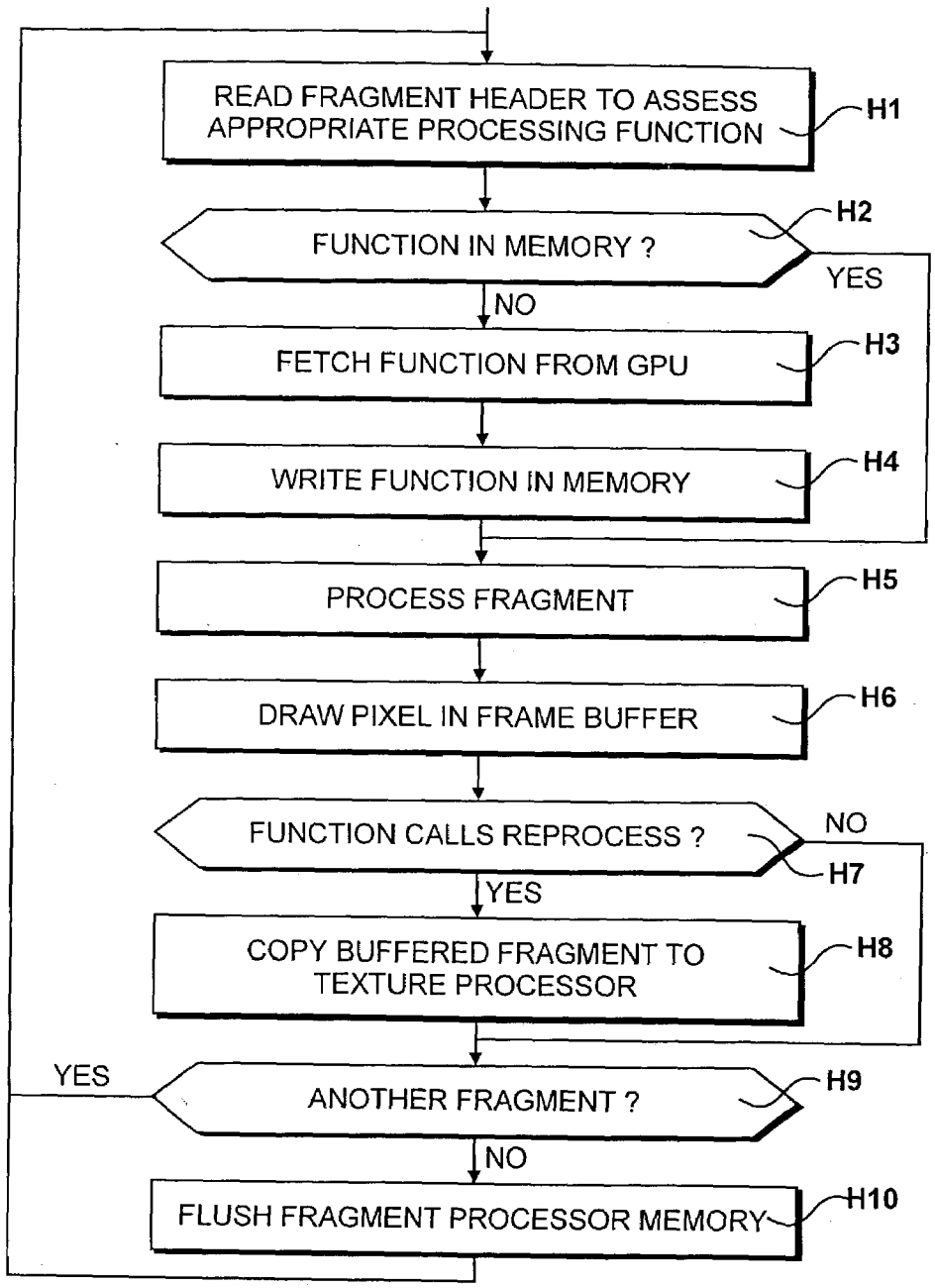
[PRIOR ART]  *Figure H*

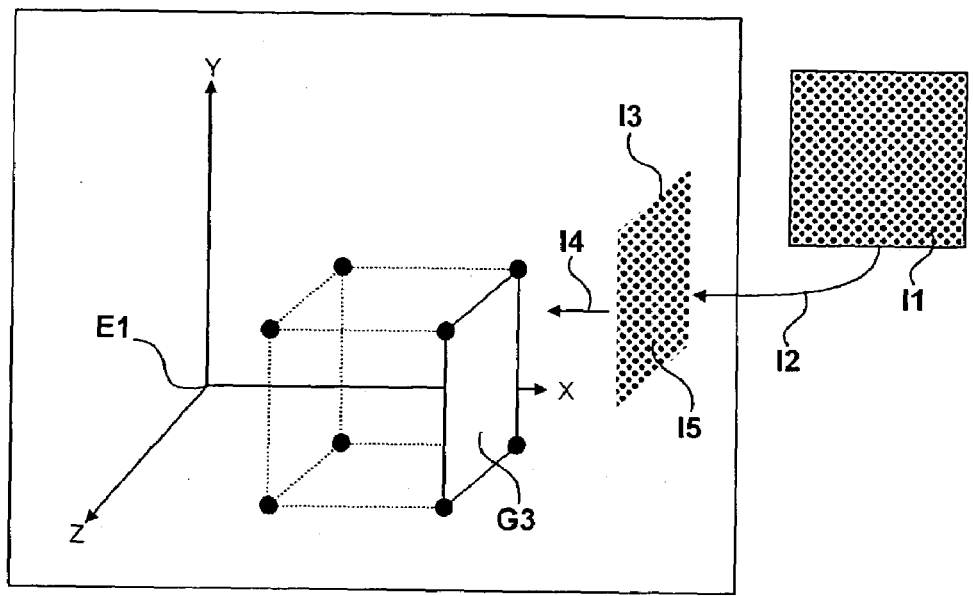
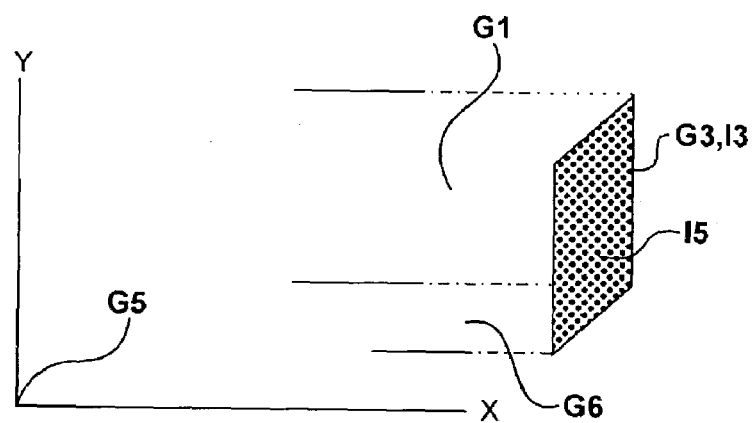
[PRIOR ART]
*Figure 1*

$$C' = \begin{pmatrix} C'_r \\ C'_g \\ C'_b \\ 1 \end{pmatrix} = \underbrace{\frac{1}{3}\begin{pmatrix} 1+2\cos\gamma & 1-\cos\gamma-\sqrt{3}\sin\gamma & 1-\cos\gamma+\sqrt{3}\sin\gamma & 0 \\ 1-\cos\gamma+\sqrt{3}\sin\gamma & 1+2\cos\gamma & 1-\cos\gamma-\sqrt{3}\sin\gamma & 0 \\ 1-\cos\gamma-\sqrt{3}\sin\gamma & 1-\cos\gamma+\sqrt{3}\sin\gamma & 1+2\cos\gamma & 0 \\ 0 & 0 & 0 & 1 \end{pmatrix}}_{=TC} \begin{pmatrix} C_r \\ C_g \\ C_b \\ 1 \end{pmatrix}$$

$$\rho = C_b - \frac{1}{2}(C_r + C_g) \quad \text{1501}$$

$$\text{where} \quad C = \begin{pmatrix} C_r & C_g & C_b & 1 \end{pmatrix}$$

*Figure 15*

2001 ⟶ UPPER THRESHOLD $= \tau = \delta_k$

2002 ⟶ LOWER THRESHOLD $= \tau(1-\sigma)$

2003 ⟶ $\theta = \begin{cases} 0 & for\ \delta \leq \tau(1-\sigma) \\ \dfrac{\delta - \tau(1-\sigma)}{\sigma\tau} & for\ \tau(1-\sigma) \leq \delta \leq \tau \\ 1 & for\ \delta \geq \tau \end{cases}$

2004

$$\theta = \frac{\delta - \tau(1-\sigma)}{\sigma\tau} = \frac{\delta}{\sigma\tau} + \left(1 - \frac{1}{\sigma}\right) \quad \text{— 2301}$$

$$= \left(\frac{-(\cos\gamma + \sqrt{3}\sin\gamma)}{2\sigma\tau} \quad \frac{-(\cos\gamma - \sqrt{3}\sin\gamma)}{2\sigma\tau} \quad \frac{\cos\gamma}{\sigma\tau} \quad 1 - \frac{1}{\sigma}\right) C_S \quad \text{— 2302}$$

$$= \left(\frac{-x}{2\sigma\tau} \quad \frac{-y}{2\sigma\tau} \quad \frac{z}{\sigma\tau} \quad 1 - \frac{1}{\sigma}\right) C_S$$

$$\Rightarrow C_\theta = \begin{pmatrix} C_r \\ C_g \\ C_b \\ \theta \end{pmatrix} = \begin{pmatrix} 1 & 0 & 0 & 0 \\ 0 & 1 & 0 & 0 \\ 0 & 0 & 1 & 0 \\ \frac{-x}{2\sigma\tau} & \frac{-y}{2\sigma\tau} & \frac{z}{\sigma\tau} & 1-\frac{1}{\sigma} \end{pmatrix} \begin{pmatrix} C_r \\ C_g \\ C_b \\ 1 \end{pmatrix} \quad \text{— 2303}$$

$$= M_\theta C_S$$

*Figure 23*

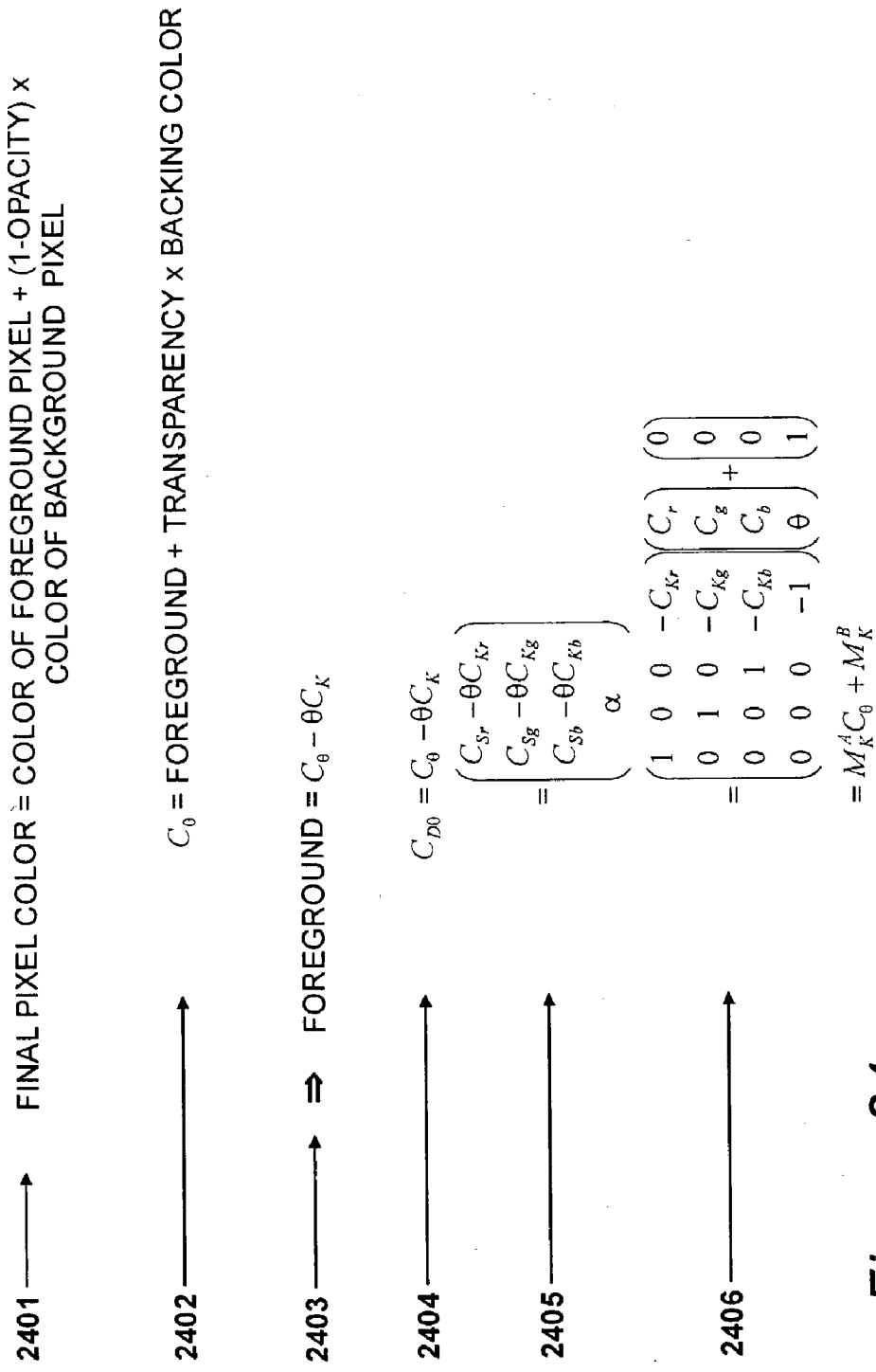

2401 — FINAL PIXEL COLOR = COLOR OF FOREGROUND PIXEL + (1-OPACITY) × COLOR OF BACKGROUND PIXEL

2402 — $C_0$ = FOREGROUND + TRANSPARENCY × BACKING COLOR

2403 — FOREGROUND = $C_\theta - \theta C_K$

2404 — $C_{D\theta} = C_\theta - \theta C_K$

2405 —
$$\begin{pmatrix} C_{Sr} - \theta C_{Kr} \\ C_{Sg} - \theta C_{Kg} \\ C_{Sb} - \theta C_{Kb} \\ \alpha \end{pmatrix} = \begin{pmatrix} 1 & 0 & 0 & -C_{Kr} \\ 0 & 1 & 0 & -C_{Kg} \\ 0 & 0 & 1 & -C_{Kb} \\ 0 & 0 & 0 & -1 \end{pmatrix} \begin{pmatrix} C_r \\ C_g \\ C_b \\ \theta \end{pmatrix} + \begin{pmatrix} 0 \\ 0 \\ 0 \\ 1 \end{pmatrix}$$

2406 — $= M_K^A C_\theta + M_K^B$

*Figure 24*

2501 ⟶ $C'_r + \Delta_r = C'_g + \Delta_g = C'_b + \Delta_b$

2502 ⟶ $\Delta_r + \Delta_g + \Delta_b = 0$

2503 ⟶ $\Delta_r = \Delta_g$

2504 
$$\Rightarrow \Delta_r = \Delta_g = \frac{C'_b - \frac{1}{2}(C'_r + C'_g)}{3} = \frac{\tau}{3}$$
$$\Rightarrow \Delta_b = -\frac{2\tau}{3}$$

Figure 25

UPPER THRESHOLD $= \tau$ ←——2601

LOWER THRESHOLD $= \tau(1-\varphi)(1-\sigma)-\varphi$ ←——2602

$$2603 \rightarrow \beta = \begin{cases} 0 & \text{for } \delta \leq \tau(1-\varphi)(1-\sigma)-\varphi \\ \dfrac{\delta - \tau(1-\rho)(1-\sigma)+\varphi}{\tau+\varphi-\tau(1-\rho)(1-\sigma)} & \text{for } (\tau(1-\varphi)(1-\sigma)-\varphi) \leq \delta \leq \tau \\ 1 & \text{for } \delta \geq \tau \end{cases}$$

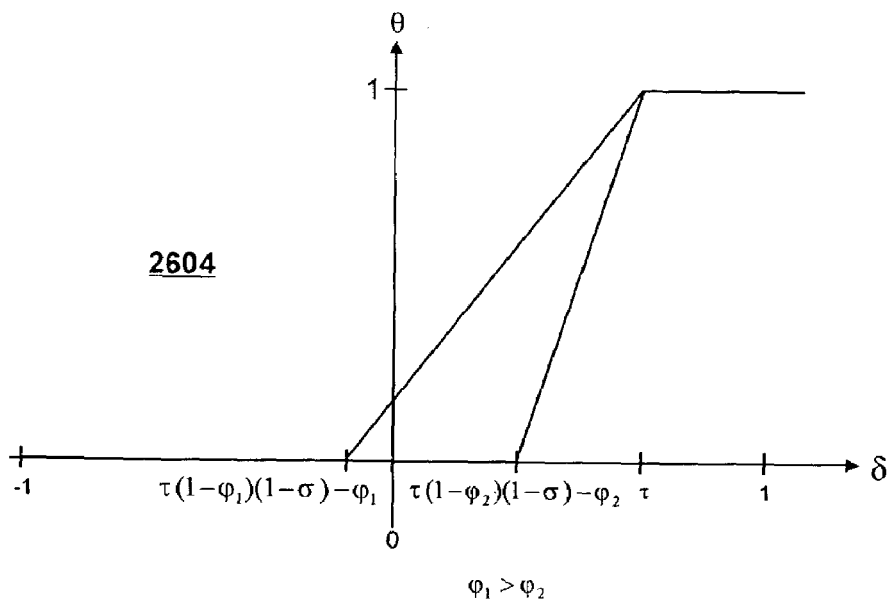

$\varphi_1 > \varphi_2$

Figure 26

2901 →
$$\beta = \frac{\delta - L_\beta}{\tau - L_\beta}$$
$$= \frac{\delta}{\tau - L_\beta} - \frac{L_\beta}{\tau - L_\beta}$$

2902 →
$$\Rightarrow C_\beta = \begin{pmatrix} C_r \\ C_g \\ C_b \\ \beta \end{pmatrix}$$
$$= \begin{pmatrix} 1 & 0 & 0 & 0 \\ 0 & 1 & 0 & 0 \\ 0 & 0 & 1 & 0 \\ \frac{a}{\tau - L_\beta} & \frac{b}{\tau - L_\beta} & \frac{c}{\tau - L_\beta} & \frac{L_\beta}{\tau - L_\beta} \end{pmatrix} \begin{pmatrix} C_r \\ C_g \\ C_b \\ 1 \end{pmatrix}$$
$$= M_\beta C_S$$

*Figure 29*

$$3001 \Rightarrow C_{\varphi\beta} = \begin{pmatrix} C'_{Sr} + \beta\Delta_r \\ C'_{Sg} + \beta\Delta_g \\ C'_{Sb} + \beta\Delta_b \\ \beta \end{pmatrix} = \begin{pmatrix} 1 & 0 & 0 & \dfrac{\tau}{3} \\ 0 & 1 & 0 & \dfrac{\tau}{3} \\ 0 & 0 & 1 & \dfrac{-2\tau}{3} \\ 0 & 0 & 0 & 1 \end{pmatrix} \begin{pmatrix} C'_{Sr} \\ C'_{Sg} \\ C'_{Sb} \\ \beta \end{pmatrix}$$

$$= M_\Delta C'_\beta$$

$$3002 \quad C'_S = RC_S \Rightarrow RC_{\varphi\beta} = M_\Delta RC_\beta$$

$$3003 \quad \Rightarrow R^{-1}RC_{\varphi\beta} = R^{-1}M_\Delta RC_\beta$$

$$3004 \quad \Rightarrow C_{\varphi\beta} = R^{-1}M_\Delta RC_\beta$$

$$3005 \quad C_{\varphi\beta} = \begin{pmatrix} C_{\varphi r} \\ C_{\varphi g} \\ C_{\varphi b} \\ \beta \end{pmatrix} = \begin{pmatrix} 1 & 0 & 0 & \dfrac{\tau x}{3} \\ 0 & 1 & 0 & \dfrac{\tau y}{3} \\ 0 & 0 & 1 & \dfrac{-2\tau z}{3} \\ 0 & 0 & 0 & 1 \end{pmatrix} \begin{pmatrix} C_{Sr} \\ C_{Sg} \\ C_{Sb} \\ \beta \end{pmatrix}$$

$$= M_\varphi C'_\beta$$

$$\theta = \beta \left( \frac{\tau - L_\beta}{\sigma \tau} \right) + \left( 1 - \frac{\tau - L_\beta}{\sigma \tau} \right)$$

3102 →

$$C_{\varphi\vartheta} = \begin{pmatrix} C_{\varphi r} & C_{\varphi g} & C_{\varphi b} \\ & \theta & \end{pmatrix} = \begin{pmatrix} 1 & 0 & 0 \\ 0 & 1 & 0 \\ 0 & 0 & 1 \\ 0 & 0 & 1 \end{pmatrix} \begin{pmatrix} \frac{\tau x}{3} \\ \frac{\tau y}{3} \\ \frac{-2\tau z}{3} \\ \frac{\tau - L_\beta}{\sigma \tau} \end{pmatrix} \begin{pmatrix} C_{Sr} & C_{Sg} & C_{Sb} \\ & \beta & \end{pmatrix} + \begin{pmatrix} 0 \\ 0 \\ 0 \\ 1 - \frac{\tau - L_\beta}{\sigma \tau} \end{pmatrix}$$

$$= M_\varphi^A C_\beta + M_\varphi^B$$

*Figure 31*

$$C_D = \begin{pmatrix} C_{Dr} \\ C_{Dg} \\ C_{Db} \\ \alpha \end{pmatrix}$$

3201 →
$$= \begin{pmatrix} 1 & 0 & 0 & (-C_{Kr} - \frac{\tau x}{3}) \\ 0 & 1 & 0 & (-C_{Kg} - \frac{\tau y}{3}) \\ 0 & 0 & 1 & (-C_{Kb} + \frac{2\tau z}{3}) \\ 0 & 0 & 0 & -1 \end{pmatrix} \begin{pmatrix} C_{\varphi r} \\ C_{\varphi g} \\ C_{\varphi b} \\ \theta \end{pmatrix} + \begin{pmatrix} 0 \\ 0 \\ 0 \\ 1 \end{pmatrix}$$

$$= M_K^C C_{\varphi\theta} + M_K^B$$

Figure 32

3501 ⟶ $C_\beta = \text{clamp}\left[M_\beta C\right]$

3502 ⟶ $C_{\varphi\theta} = \text{clamp}\left[M_\varphi^A C_\beta + M_\varphi^B\right]$ 3503 ⟶ $C_D = \text{clamp}\left[M_K^C C_{\varphi\theta} + M_K^B\right]$

*Figure 35*

3601 ⟶ $C_\theta = clamp[M_\theta C_S]$

3602 ⟶ $C_{D\theta} = clamp[M_K^A C_\theta + M_K^B]$

*Figure 36*

3701 → $C_\beta = clamp[M_\beta C_S]$

3702 → $C_{D\beta} = clamp[M_\varphi^C C_\beta + M_\varphi^D]$

3703 → where $M_\varphi^C = \begin{pmatrix} 1 & 0 & 0 & \dfrac{\tau x}{3} \\ 0 & 1 & 0 & \dfrac{\tau y}{3} \\ 0 & 0 & 1 & \dfrac{-2\tau z}{3} \\ 0 & 0 & 0 & \dfrac{L_\beta - \tau}{\sigma\tau} \end{pmatrix}$ 3704 → $M_\varphi^D = \begin{pmatrix} 0 \\ 0 \\ 0 \\ \dfrac{\tau - L_\beta}{\sigma\tau} \end{pmatrix}$

Figure 37

IMAGE PROCESSING

BACKGROUND OF THE INVENTION

The present invention relates to generating composited image data from respective background and foreground image data with an image processing system configured with graphics data processing means.

DESCRIPTION OF THE RELATED ART

Recent technical advances in image processing systems have facilitated and generalised the use of highly-saturated studio environments in which to film talents performing a scene, which should subsequently be composited in an alternative background. "Bluescreen" techniques in video environments and "greenscreen" techniques in cinematographic environments are well known, wherein talents or models are filmed in a studio configured with respectively blue- or green-saturated surroundings, in order to generate a clip of foreground image frames. An alternative clip of background image frames is subsequently generated and a compositing process allows an image editor to seamlessly blend the foreground and background image frames by means of keying parts of the corresponding video signals, for instance the luminance or chrominance signal, which is known to those skilled in the art as chroma-keying.

Such image data processing has long been provided by means of using dedicated hardware, for instance the ultimatte provided by the Ultimatte Corporation of Chatsworth, Calif. or, more recently, by means of computer apparatus configured to process and output rendered composited image frames.

Image data processing apparatus as described above is very expensive, however, and traditionally requires similarly expensive, highly trained operators. Moreover, only a marginal portion of such known systems are configured with a processing capability sufficient to generate composited image frames in real time, an accepted definition of real-time rendering being receiving, processing and outputting image data at display rate, also known to those skilled in the art as the number of displayable frames per second.

Techniques are known to overcome the elevated cost of ownership described above, which use relatively inexpensive computer systems as image processing systems, and especially when configured with hardware based graphics accelerators, an example of which would be an Nvidia GEforce3 provided by the Nvidia Corporation of Santa Clara, Calif. An important problem however hinders the development of the use of inexpensive computer systems as described above to generate composited image data, because hardware graphics accelerators are typically designed to best process three-dimensional primitives such as polygons but the dedicated processing capabilities of the processors and sub-processors thereof are limited in relation to two-dimensional image frame data processing algorithms, for instance the image keying algorithms developed by Petro Vlahos. According to the known prior art, such keying algorithms are computed by the main processor of an image processing system, whereby all of the source, matte and destination image data is provided by said main processor to said graphics accelerator as textures. In the above described inexpensive computer systems, the processing of such source image data to generate said matte image data and subsequent compositing thereof into said final image data requires significant computation by said main processor, wherein the supplementary graphical data processing capabilities of said graphics accelerator are not exploited which renders such inexpensive systems unsuitable for outputting composited image data in real time. One reason for this is that graphics accelerators can usually only handle relatively simple calculations while traditional compositing methods require the solution of complex equations.

In Figure A an inexpensive computer system A1 is shown configured with a main processor A2, random-access memory A3 and data storage means A4, wherein all of said components A2 to A4 are interfaced by means of a system bus A5. A graphics accelerator A6 is also shown configured with a main graphic processor A7 and a plurality of graphics sub-processors A8, wherein processor A7 receives graphical data from processor A2 by means of a dedicated bus A9 and forwards said graphical data after local processing to said sub-processors A8 for further processing. Said processed graphical data is eventually written by said sub-processors A8 to a frame buffer A10 from which said data is either output to a display A11 in the form of image frames or sent back to main processor A2 over bus A9 for subsequent temporary storing in memory A3 or permanent storing in storage means A4.

A functional overview of the components A7 to A10 of graphics accelerator A6 is shown in Figure B, in which a processing function of graphics processor A7 is to sort graphic data sent from processor A2 between three-dimensional data and two-dimensional data. Typically, 3-D data is sent by processor A7 as control points equipped with co-ordinates in a volume configured with a Cartesian co-ordinate system to a first evaluating system sub-processor A81, where vertices are evaluated from said control points. Said vertices are then sent from said sub-processor A81 to a second vertex processing sub-processor A82, where they are converted into primitives, i.e. polygons. Two-dimensional data is sent by processor A7 to a third texture-processing sub-processor A83, a typical function of which is to generate positional data and color attributes, such that when the polygons are sent from sub-processor A82 to a fourth rasterizing sub-processor A84 for conversion into screen-positioned, two-dimensional pixels, said two-dimensional graphic data is similarly rasterized at a correct position within the eventual image frame and, when said pixels are sent from said sub-processor A84 to a fifth fragment-processing sub-processor A85 for further color and/or transparency data processing, the two-dimensional graphic data-dependent color attributes are correctly processed and associated with said pixels. In accordance with the description of Figure A, sub-processor A85 outputs final image frame data to frame buffer A10 but may optionally loop said output back to said texture-processing sub-processor A83 in order to reprocess said output, for instance if data processing operations performed by said sub-processor A85 require multiple passes.

In order to output image data, graphics accelerator A6 requires instructions and data from main processor A2, wherein said instructions are processed by said processor A2 into microcode that graphics processor A7 can then itself execute when received, and said microcode may be received only once at start-up, for instance initialisation instructions, or said instructions may be received on a regular basis to instruct the accelerator 206 to perform certain tasks required by the application executed by said main processor A2. Examples of such instructions are shown in Figure C as OpenGL pseudo code, to improve the clarity of the present description.

Pseudo code C1 for instance sets a color and the example shown instructs graphics accelerator A6 to draw the brightest red possible, with no green or blue components. Pseudo code C2 similarly instructs graphics accelerator A6 to draw a rectangle, and the joining of C1 and C2 would instruct accelerator A6 to draw an intensely red rectangle. In terms of invoking the specific functionality of sub-processors, pseudo code C3 instructs accelerator A6 to blend an intensely red rectangle with an alternative background, whereby said rectangle data is processed by sub-processors A81 and A82, the color (red) data is processed by sub-processor A83 and the blending thereof is processed by fragment processing sub-processor A85, with blending parameters specified at C4.

Further levels of sub-processor functionality and accelerator configuration can be accessed at will in order to obtain the desired output image data. For instance, complex pseudo code C5 initialises an image data processing mode known as "Feedback", wherein no output is provided to the displayable portion of frame buffer A10 until said output data is fully processed and ready. Incoming graphics data is thus looped through the various sub-processors, each of which carries iterative functions thereon, until such time as all functions have been carried out and the final data is now sent to said displayable portion of frame buffer A10. Such iterative function processing is traditionally known as rendering passes. Said sub-processors thus also require instructions shown as pseudo code C6 to C8 in order to determine where to access (C6) said looped data and where to store (C7) or copy (C8) said data after they have processed it.

It is the pseudo code described in Figure C and executed by a main processor A2 that configures the graphics processor A7 and, further, the sub-processors A81 to A85 to perform their respective tasks described in Figures B and C, wherein said code defines operational steps shown in Figure D for the purpose of said configuration. Typically, said code is compiled into a binary executable form which, when processed by said processor A2, is output as microcode, e.g. processing functions, to processor A7. Said microcode would thus instruct graphics processor A7 to read incoming graphic data at step D1 and discriminate said incoming data by asking a question at step D2 to establish whether said incoming data is equipped with three-dimensional attributes or not. If the question of step D2 is answered positively, said incoming data is sent to the texture processing sub-processor A83 at step D3, where it is processed into a texture to be mapped onto polygons. Alternatively, the question of D2 is answered negatively, whereby the three-dimensional data is sent to the combination of sub-processors A81 and A82 at step D4, where it is processed into polygons.

At step D5, both the three-dimensional data resulting from the execution of step D4 and the two-dimensional data resulting from the execution of step D3 are rasterized into two-dimensional screen co-ordinates by a process of rasterization, whereby the combination of 2-D and 3-D data is known as fragments, i.e. all of the data associated with a pixel including co-ordinates, color, depth and texture co-ordinates. At this stage, fragments are traditionally temporarily written to the frame buffer A10 but at the next step D6, each of said pixel/fragment is blended with the fragment color attributes such that a displayable pixel is drawn back to the frame buffer at step D7. At the next step D8, a question is asked as to whether the intended color attributes of said displayable pixel require further processing before said pixel is eventually output to display means and/or storage means. If the question of step D8 is answered positively, the first iteration of said fragments processed into displayable pixels according to step D6 and written as a first iteration of said displayable pixels in said frame buffer A10 according to step D7 are copied back to texture processing sub-processor A83, such that the next processing function, i.e. pass, may be performed thereon according to steps D5, D6 and D7. Alternatively, the question of step D8 is answered negatively, whereby final processed graphic data is output to said display means and/or storage means and control is returned to step D1 and next graphical data is read from main processor A2 by a graphical processor A7 and so on and so forth.

A three-dimensional cube is shown in Figure E within a volume configured with a Cartesian co-ordinate system E1 defined by a set of three orthogonal axes. Said cube comprises six faces existing as square, textured polygons. With respect to the view adopted in Figure E, only three such textured polygons E2, E3 and E4 are visible. The cube shown in Figure E is a very simple three-dimensional structure representing graphical data to be rendered and for which graphics accelerators such as graphics accelerator A6 have been developed and optimised.

In accordance with the description of Figure A to D, eight control points F1 to F8 are shown in Figure F, representing three-dimensional data sent by graphics processor A7 to the evaluation sub-processor A81, wherein each of said control points is equipped with its respective three-dimensional, positional data in reference to co-ordinate system E1. Upon completing the evaluation processing of step D4, sub-processor A81 eventually outputs twelve vertices F9 to F20, each of which links two each of said 3-D control points F1 to F8 to define one side of the cube object shown in Figure E.

Upon completing the conversion processing at the same step D4, sub-processor A82 outputs six primitives G1 to G6 shown in Figure G, wherein said primitives are square, four-sided polygons defining the cube faces such as cube faces E2, E3 and E4. In the figure, polygon G2 defines cube face E2, polygon G3 defines cube face E3 and polygon G4 defines cube face E4 and polygons G1, G5 and G6 are occluded from view. The occlusion of said polygons, G1, G5 and G6 by said polygons G2, G3 and G4 in relation to the view point with which the polygon object is shown in the figure results in only said visible polygons G2, G3 and G4 being rasterized according to step D5, i.e. the pixels representing the respective surfaces thereof are processed in order to confer two-dimensional screen co-ordinates thereto in relation to a two-dimensional co-ordinate system G5 comprising two perpendicular axes.

In the art, the omission of the occluded polygons G1, G5 and G6 from the rendering of the entire cube is known as culling and is traditionally performed by the fifth fragment processing sub-processor A85, typical operational steps of which are further described in Figure H.

It was previously explained that sub-processor A85 receives data colloquially referred to as pixels, but which are better known in the art as fragments which are all of the data associated with any such one pixel, including two-dimensional co-ordinates, color, depth and texture co-ordinates. Typically, the fragment processor A85 blends the fragment's color and/or texture provided by sub-processor A83 with the pixel provided by sub-processor A84 and submits the fragments depth data to a culling test to determine whether said pixel is written to the frame buffer or not, e.g. a pixel generated from the service of polygon G1 would fail said depth-based test and thus not be rendered to the frame buffer. The above occluding function is one typical example amongst a plurality of functions carried out by sub-processor A85, whereby all of the fragments defining a complete image frame are iteratively processed by each function and, potentially, any of said functions may thus require a subsequent reprocessing of the entire array of fragments, thereby defining multiple rendering passes.

At step H1, fragment processor A85 first reads the incoming fragment header, which specifies the fragment processing function with which the data therein should be processed. Said reading step prompts a question to be asked at the next step H2, to determine whether said required function, which would usually be in the form of microcode as described above, is already stored in a portion of dynamic memory of graphics accelerator A6 dedicated to storing processing functions executable by said fragment processor A85. If the question of step H2 is answered negatively, fragment processor A85 subsequently invokes graphics processor A7 for the missing function, which is then fetched and written for storage in said dedicated RAM portion at the next step H4.

Alternatively, the question of step H2 is answered positively, signifying that said function already resides in said dedicated memory portion, whereby fragment processor A85 may now process the fragment read at step H1 with the appropriate function at the next step H5. A displayable pixel is thus obtained from said processing step H5 which is subsequently drawn to the frame buffer at step H6 but may equally be drawn into a plurality of configurable portions of said frame buffer A10, known to those skilled in the art as color buffers, depth buffer, stencil buffer or an accumulation buffer, wherein said configurations depend upon the initialisation of graphics accelerator A6 by the image processing application used and the parameterisation of the processing functions carried out therein.

At step H7, a question is asked as to whether the function executed at step H5 specifies a reprocessing of the fragment read at step H1, processed at step H5 and drawn as a pixel at step H6, i.e. a subsequent rendering pass is required before the required final output pixel is displayed. If the question of step H7 is answered positively, the fragment processor A85 copies the buffered pixel of step H6 to the texture processing sub-processor A83, whereby its two-dimensional screen co-ordinates will be sent to the rasterizing sub-processor A84 and its color and other such attributes will be sent back to fragment processor A85 in order to carry out said next processing function on what is essentially the output of the first iteration of the processing step H5. Alternatively, the question of step H7 is answered negatively, whereby a third question is asked at step H9, as to whether another fragment is to be read and subsequently processed. Typically the question of step H9 is answered positively as fragment processor A85 receives the fragment having two-dimensional screen co-ordinates defining said fragment as the displayable pixel next to the last such processed displayable pixels in the eventual output image frame from sub-processor A84, whereby control is thus returned to step H1. Alternatively, the question of step H9 is answered negatively, signifying that all of the displayable pixels defining a first iteration of the output image frame have been processed, for instance to generate the first rendering pass as described above, whereby the fragment processor memory is flushed at the next step H10 and control is also returned to the initial reading step H1, where for instance the first fragment processed by the first function and copied to the texture processor A83 is read and the next processing function corresponding to the above described second rendering pass is carried out and so on and so forth, until all of the fragments defining the eventual output image frame have been processed by as many successive functions as required by fragment processor A85 to generate the final output image frame.

Figure I illustrates the rasterized polygon G3 shown in Figure G configured with a texture as shown on cube face E3 in Figure E by means of a processing function carried out by sub-processor A85, having received the fragments defining said rasterized polygon G3 comprising positional data from rasterizer A84 and texture color attributes from texture processor A83. In accordance with the above description of the known prior art, graphics processor A7 receives control points F1 to F8 defining the cube object shown in Figure E, along with a texture 11 which it determines to be two-dimensional data thus sent to texture processing sub-processor A83 shown as 12. Sub-processor A83 subsequently processes said texture 11 with scaling and biasing functions to correctly skew, position and orient said texture 11 in relation to the Cartesian co-ordinates system E1 such that it overlays said polygon G3. Texture processor A83 thus generates a processed texture 13, having positional data derived from said processing functions shown in the Figure as 14 and color attributes 15, wherein said positional data is sent to rasterizer A84 and said color attributes are sent to fragment processor A85.

Fragment processor A85 thus receives all of the fragments defining polygon G3 overlaid with texture 13 having color attributes 15 within the two-dimensional orthogonal system G5, whereby said fragments are processed with a number of functions described above, an example of which would be the culling function, configuring fragment processor A85 to remove the portion of fragments defining polygons G1 and G6 positioned behind polygon G3 in relation to the rendering view point.

BRIEF SUMMARY OF THE INVENTION

According to an aspect of the present invention, there is provided a method of processing image data, comprising image data stored in storage means or memory means, instructions stored in said memory means defining processing to be performed upon said image data by graphics processing means equipped with at least one frame buffer, wherein said method comprises the steps of configuring said graphics processing means according to said instructions; in said graphics processing means, defining said image data as at least one image texture to be applied to at least one polygon; in said graphics processing means, processing said image texture to generate corresponding texture elements defining a matte thereof; and drawing said texture elements in said frame buffer.

According to another aspect of the present invention, there is provided an apparatus for processing image data, comprising storage means for storing image data, memory means for storing said image data and instructions, processing means for processing said instructions and further comprising graphics processing means equipped with at least one frame buffer, wherein said instructions are processed by said processing means to configure said graphics processing means to perform the steps of defining said image data as at least one image texture to be applied to at least one polygon; processing said image texture to generate corresponding texture elements defining a matte thereof; and drawing said texture elements in said frame buffer.

BRIEF DESCRIPTION OF THE SEVERAL VIEWS OF THE DRAWINGS

FIG. A shows an inexpensive computer system.

FIG. B is an overview of the components of the graphics accelerator.

FIG. C is a listing of Open GL pseudo instruction codes.

FIG. D defines operational steps used to configure the graphics processor.

FIG. E is a three dimensional cube with a volume configured with a Cartesian co-ordinate system defined by a set of three orthogonal axes.

FIG. F shows eight control points representing three-dimensional data sent by the graphics processor to the evaluation sub-processor.

FIG. G shows four-sided polygons displaying the sub-processor output primitives.

FIG. H shows typical operational steps of the fragment processor.

FIG. I illustrates the rasterized polygon shown in FIG. G.

Figure 1:
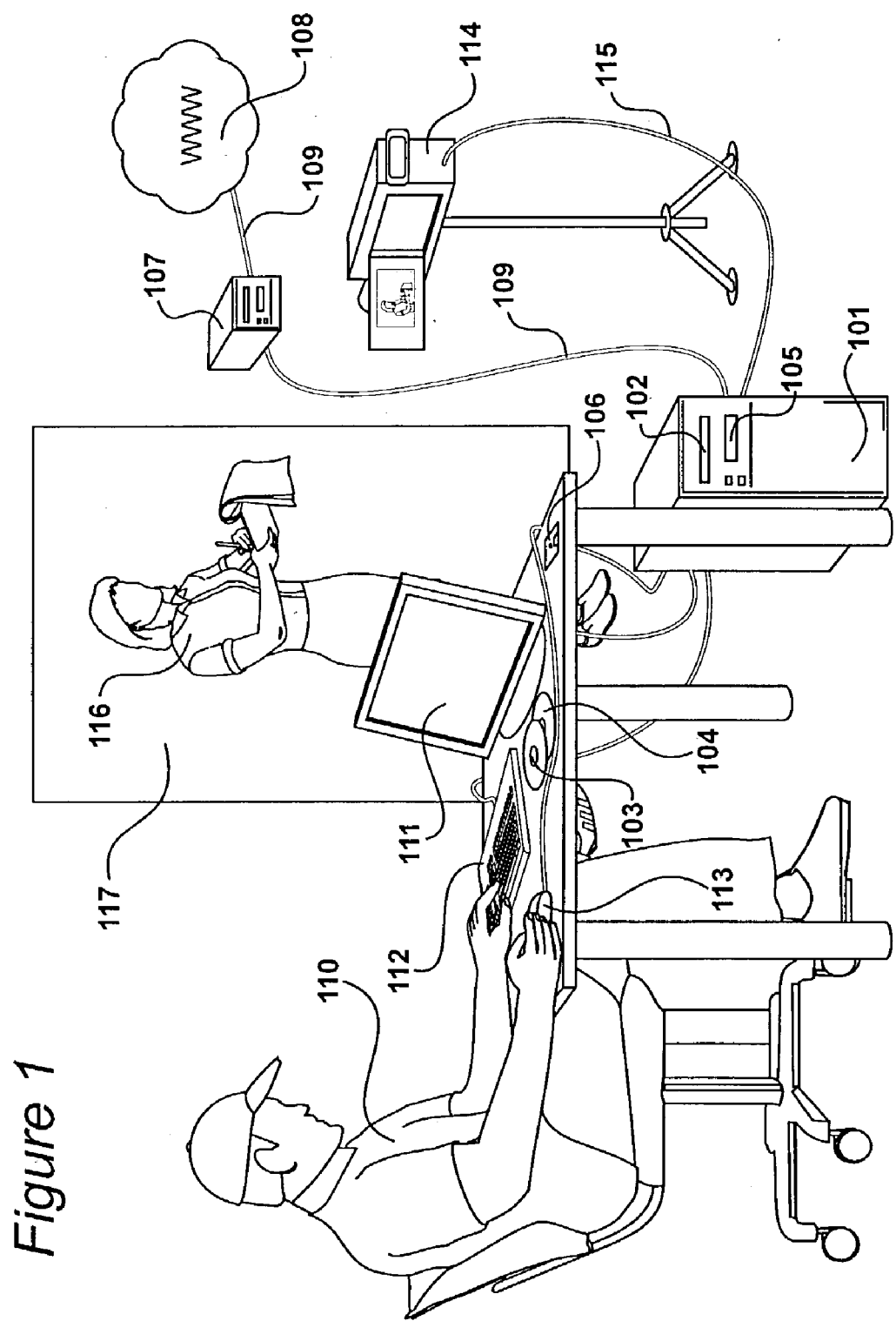
Figure 2:
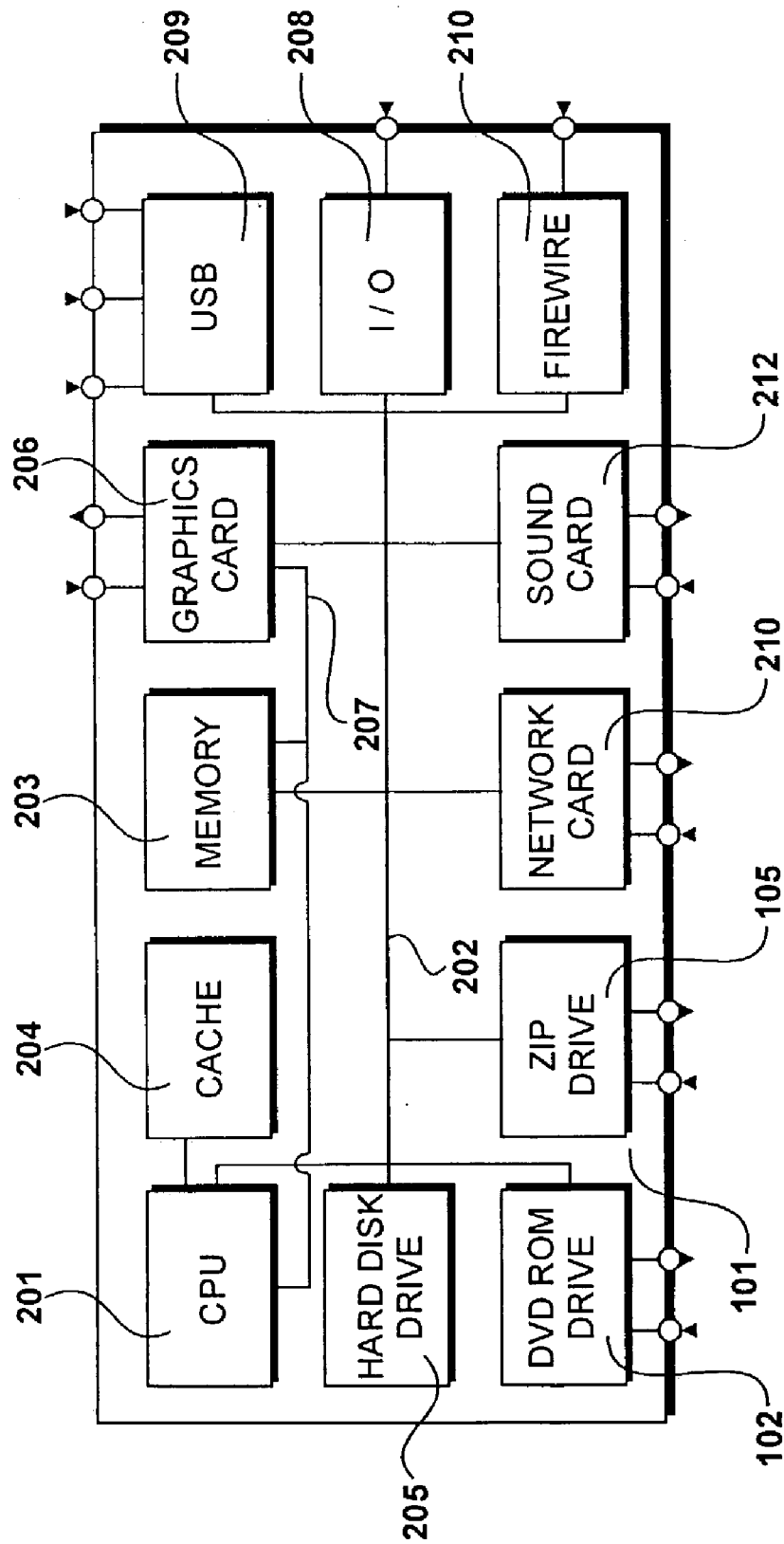
Figure 3:
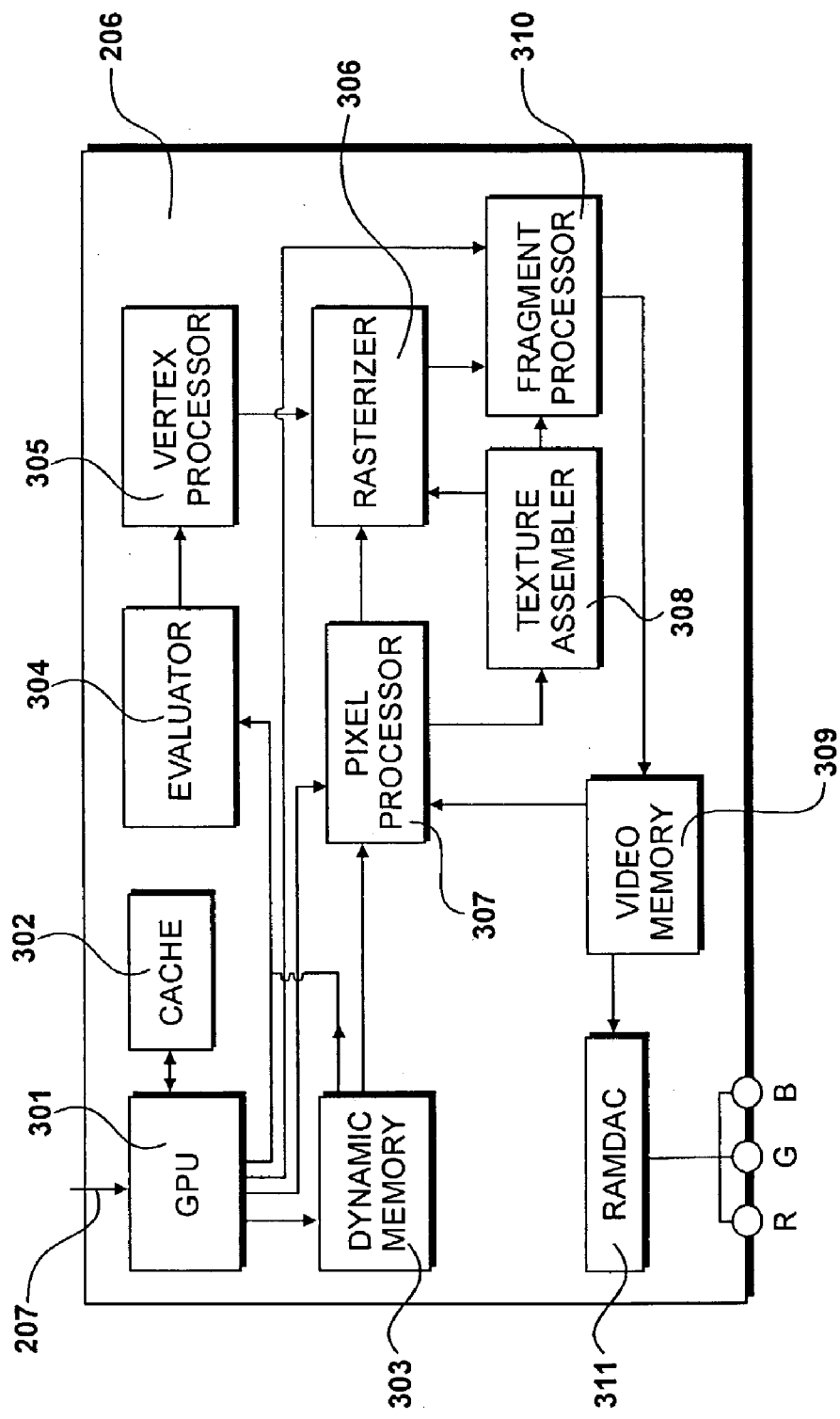
Figure 4:
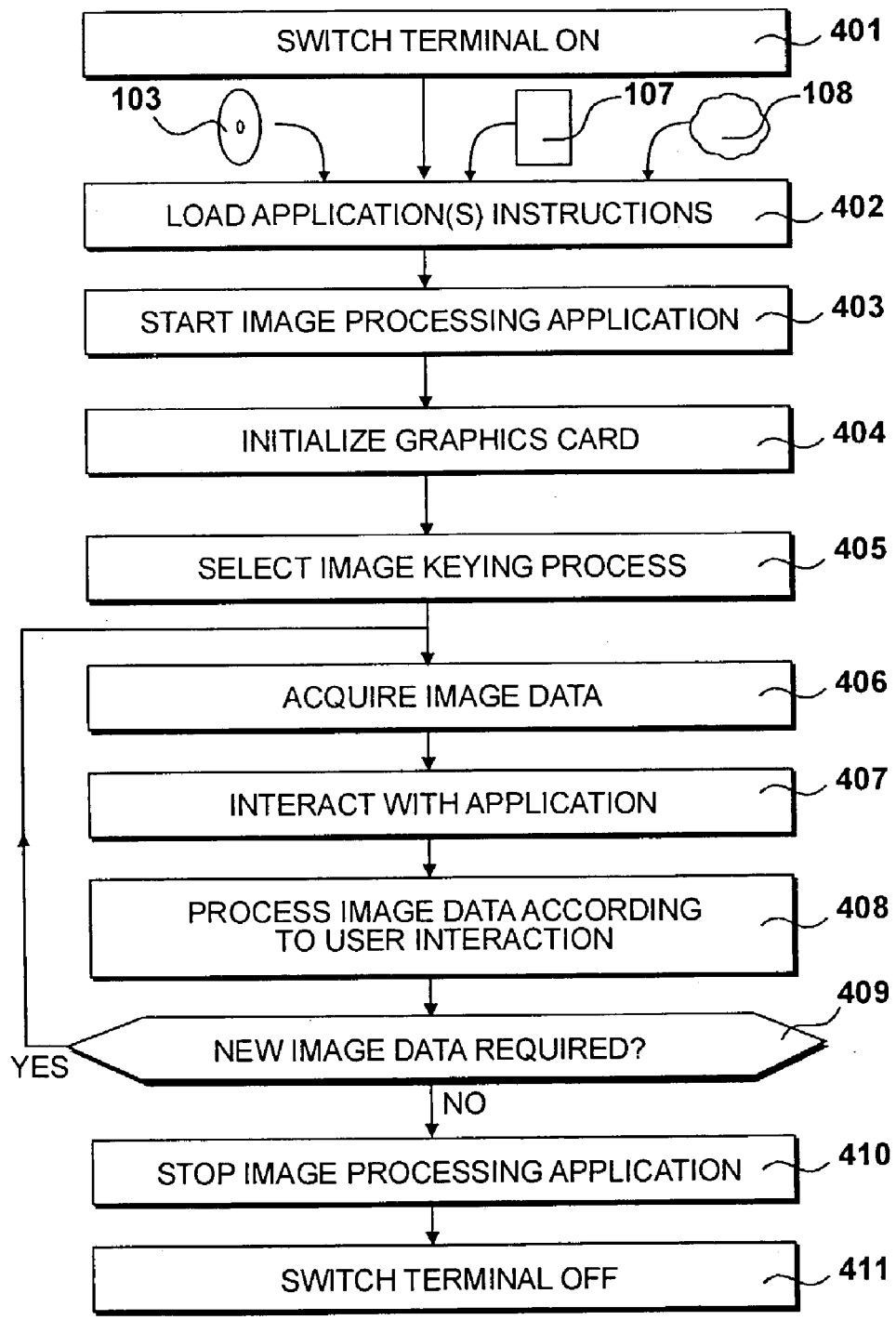
Figure 5:
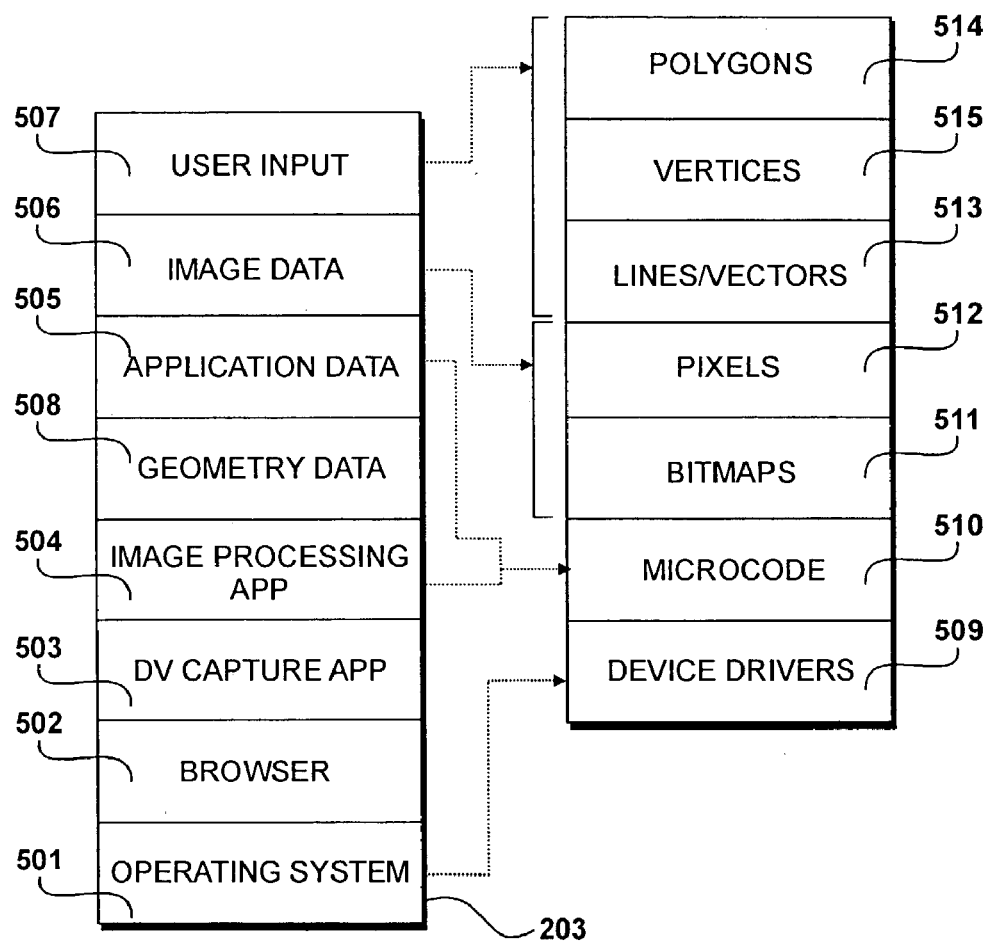
Figure 6:
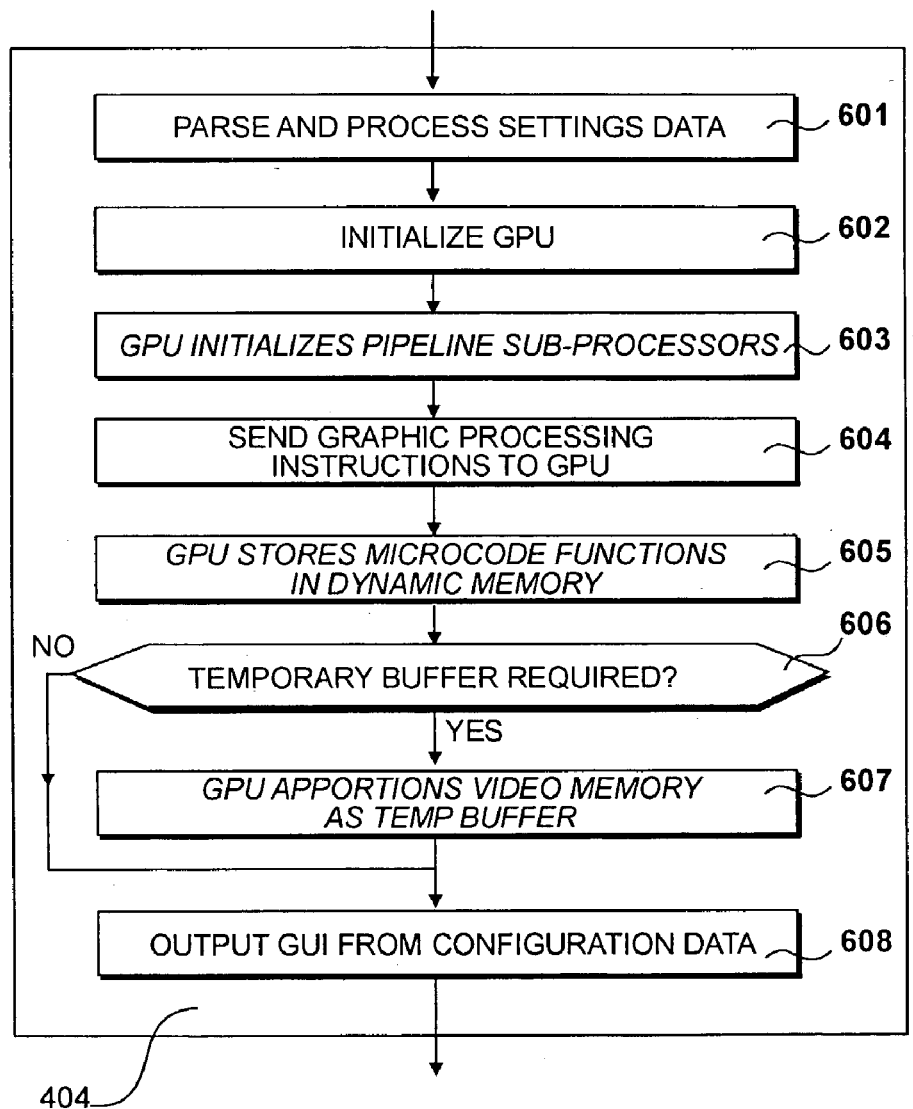
Figure 7:
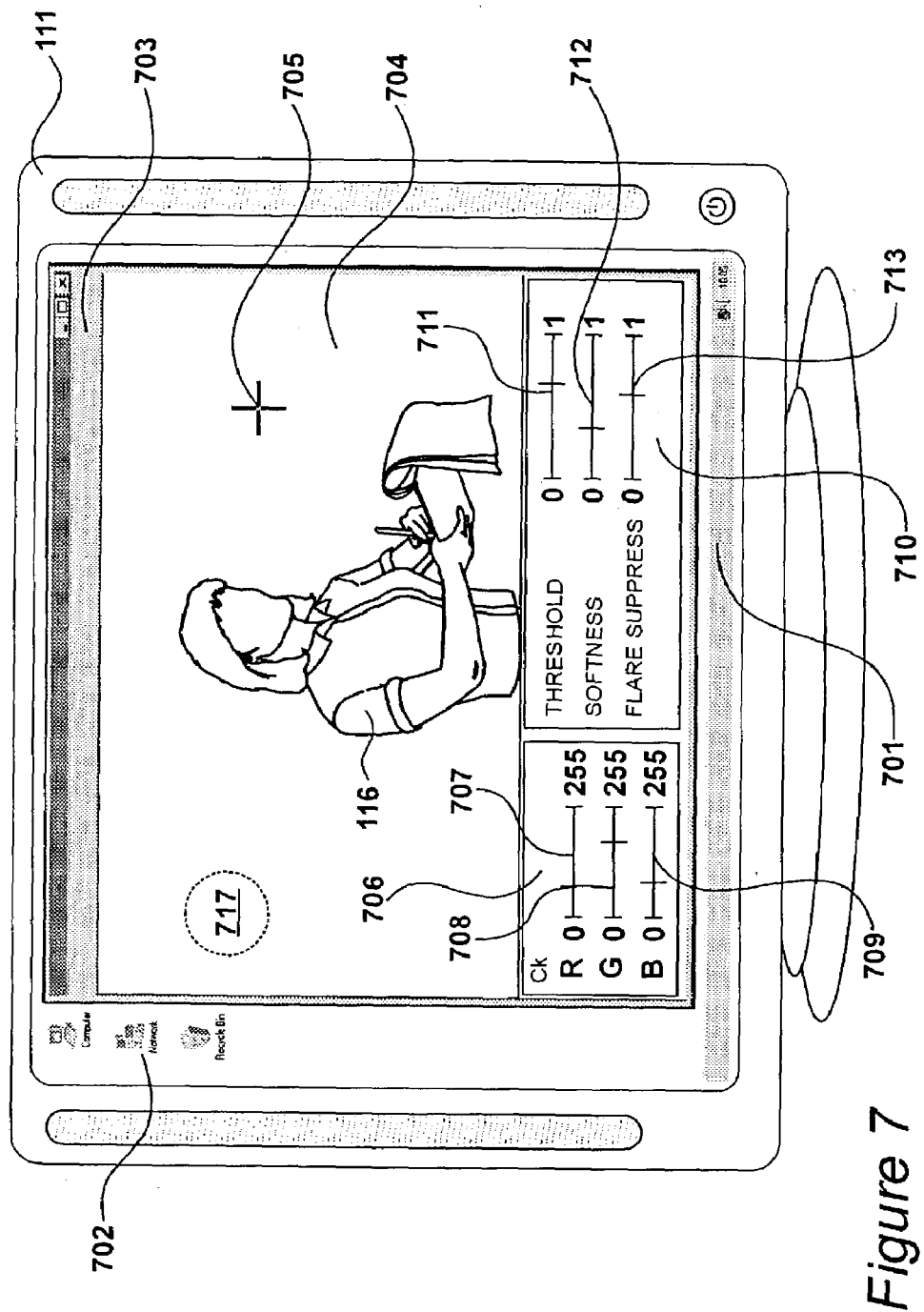
Figure 8:
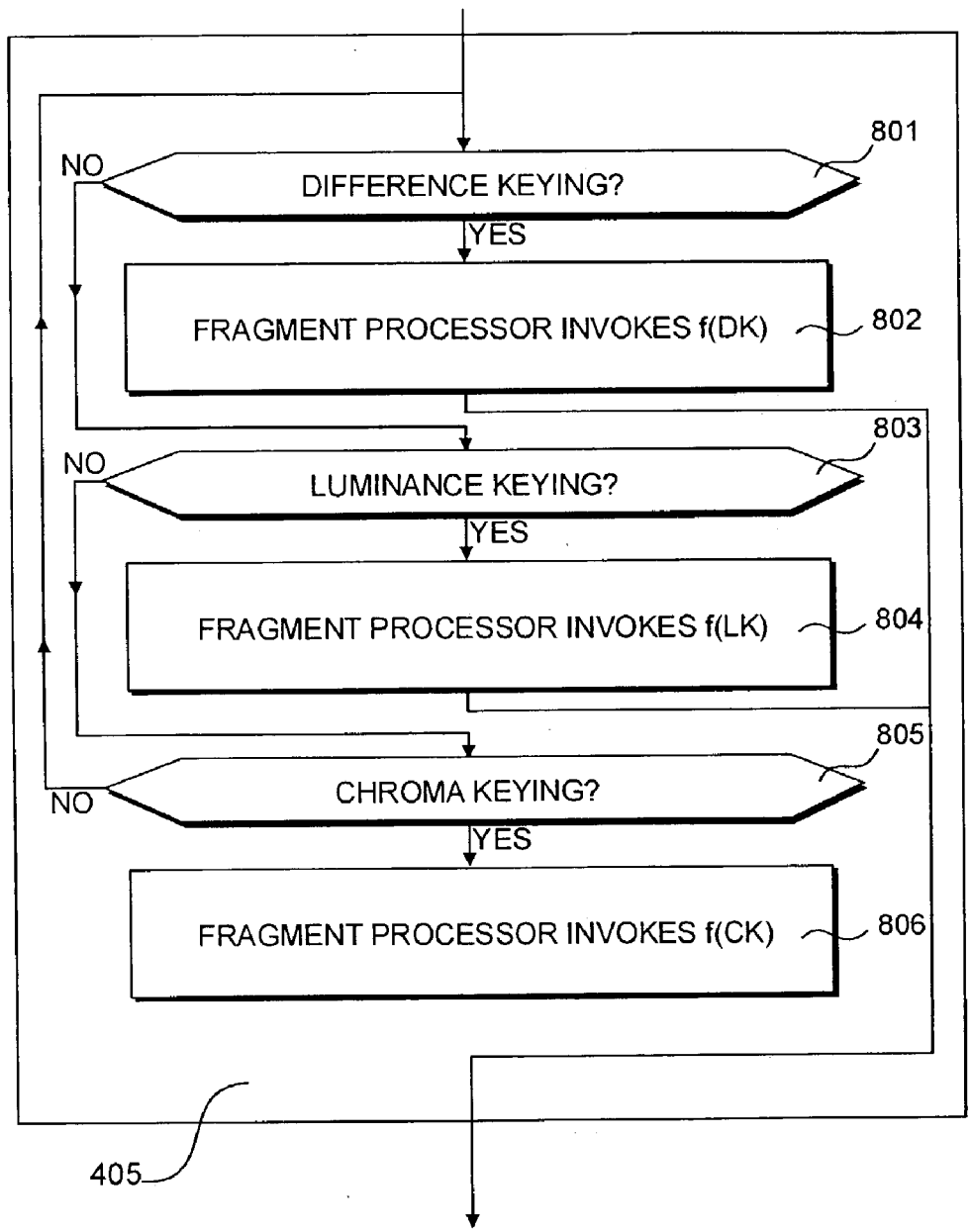
Figure 9A:
Figure 9B:
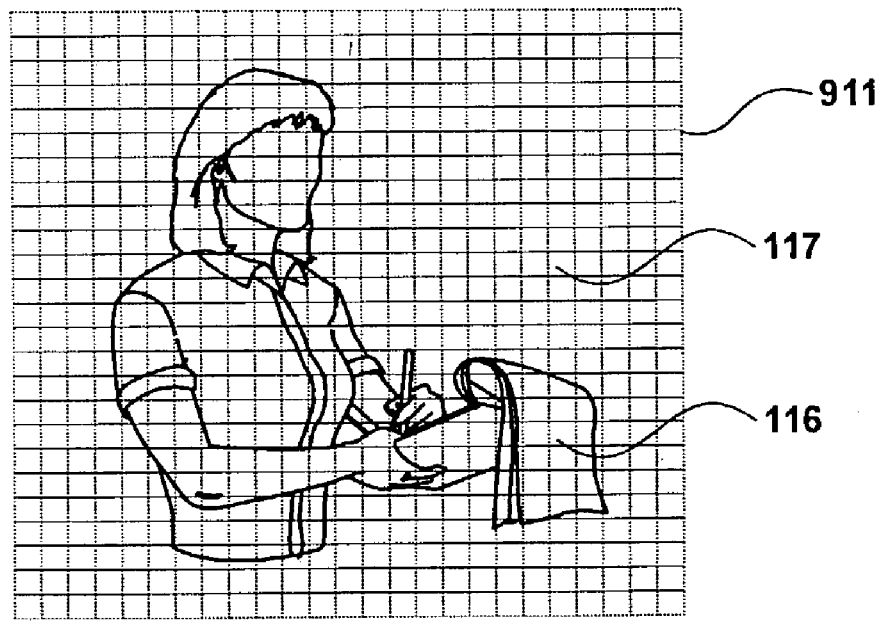
Figures 9C, 9D:
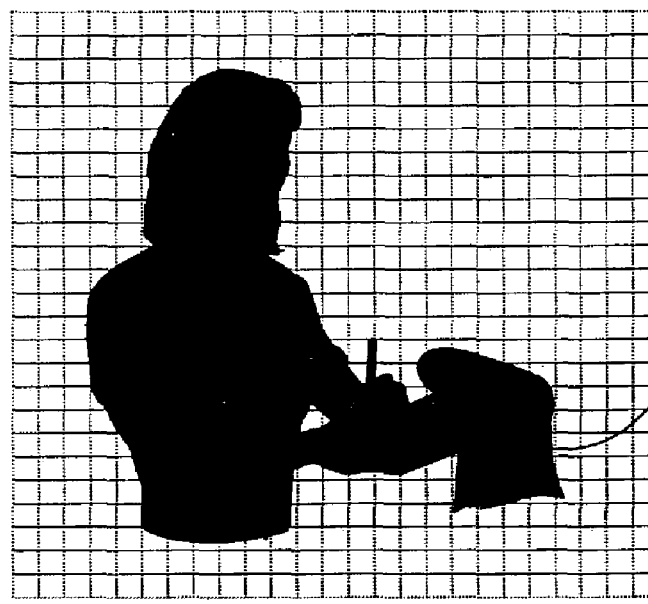
Figure 9E:
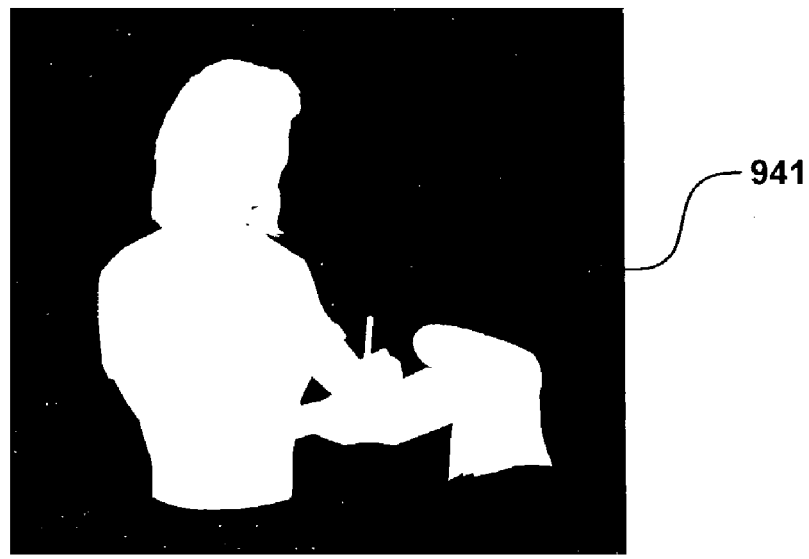
Figure 9F:
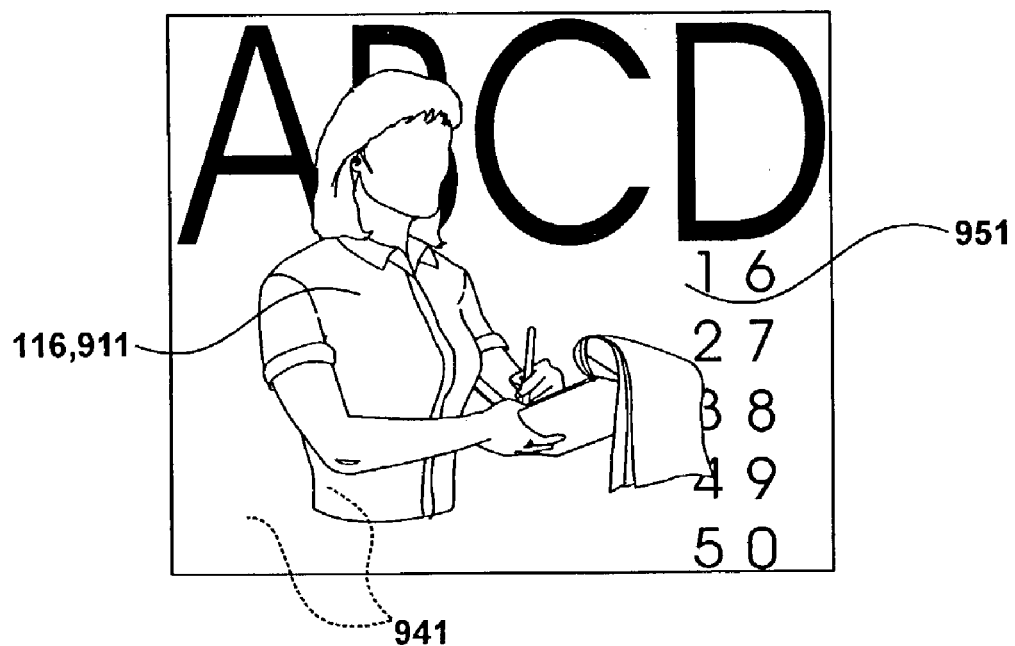
Figure 10:
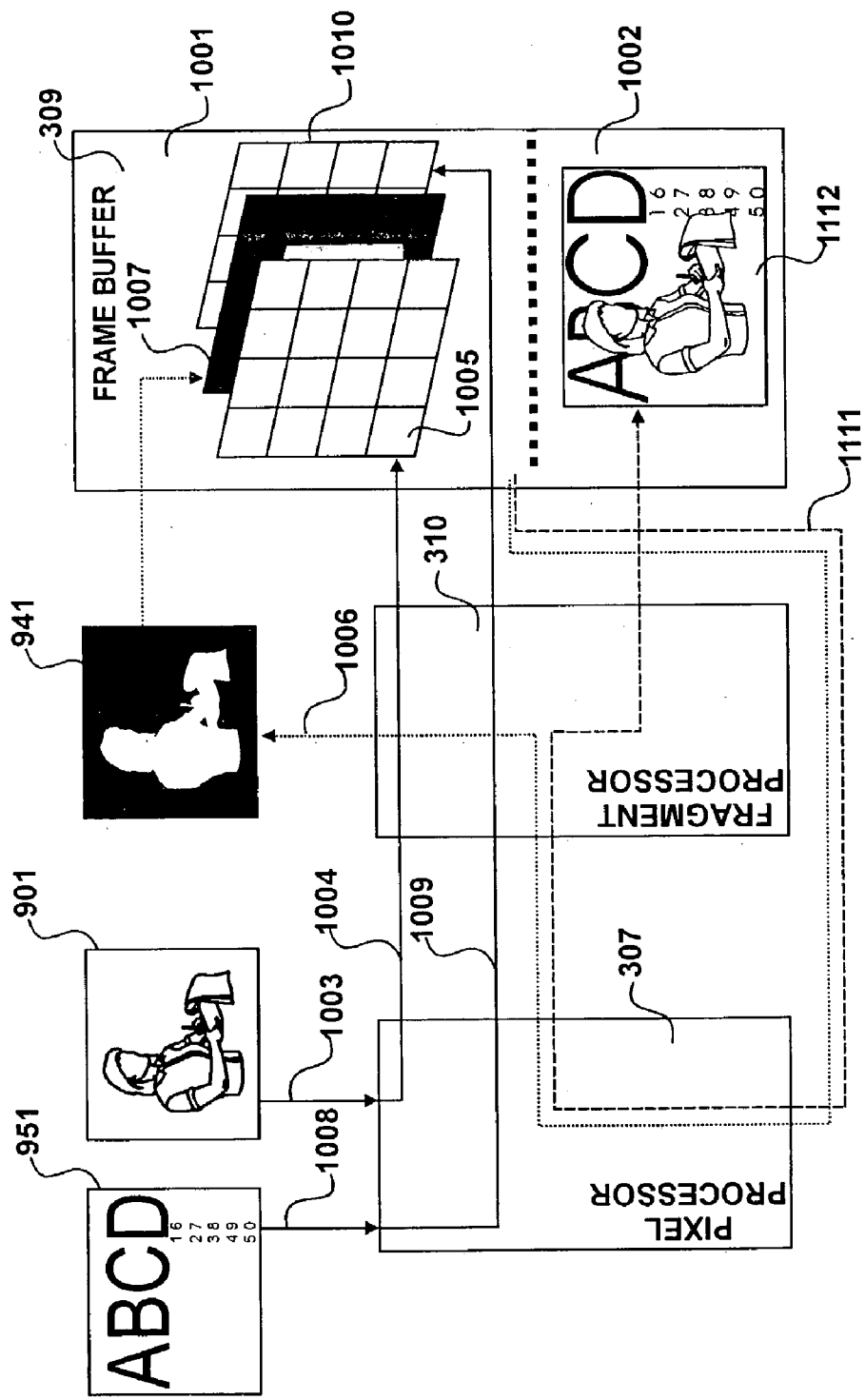
Figure 11:
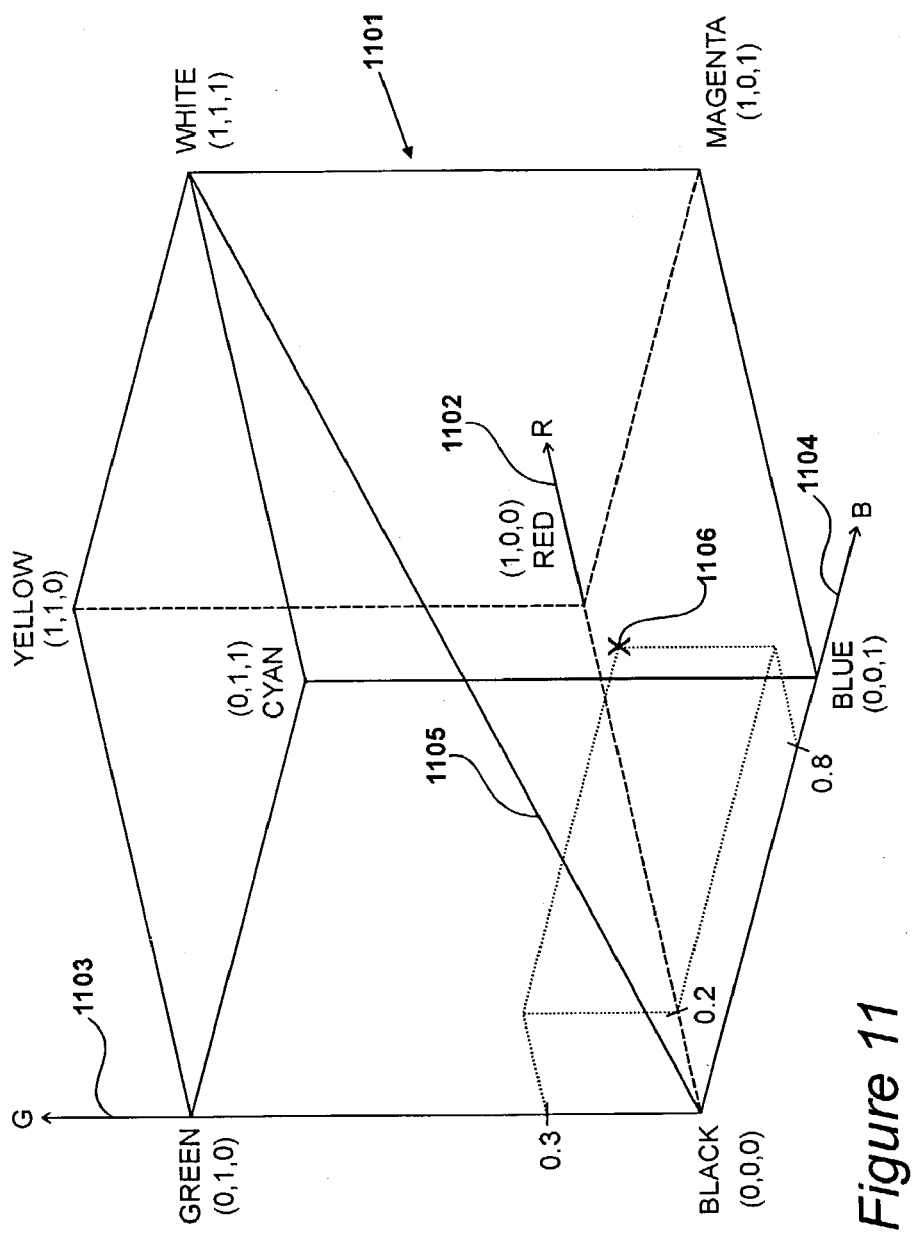
Figure 12:
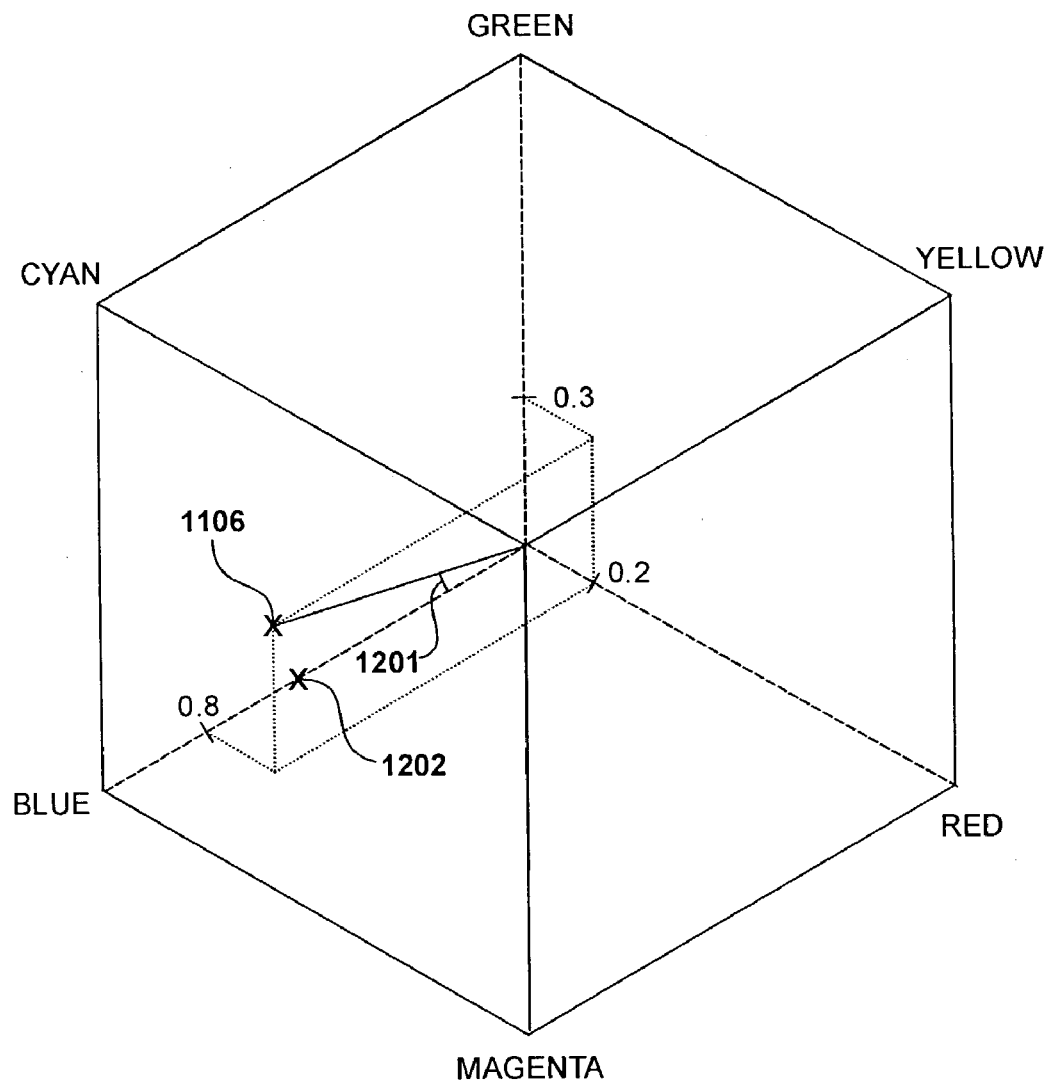
Figure 13:
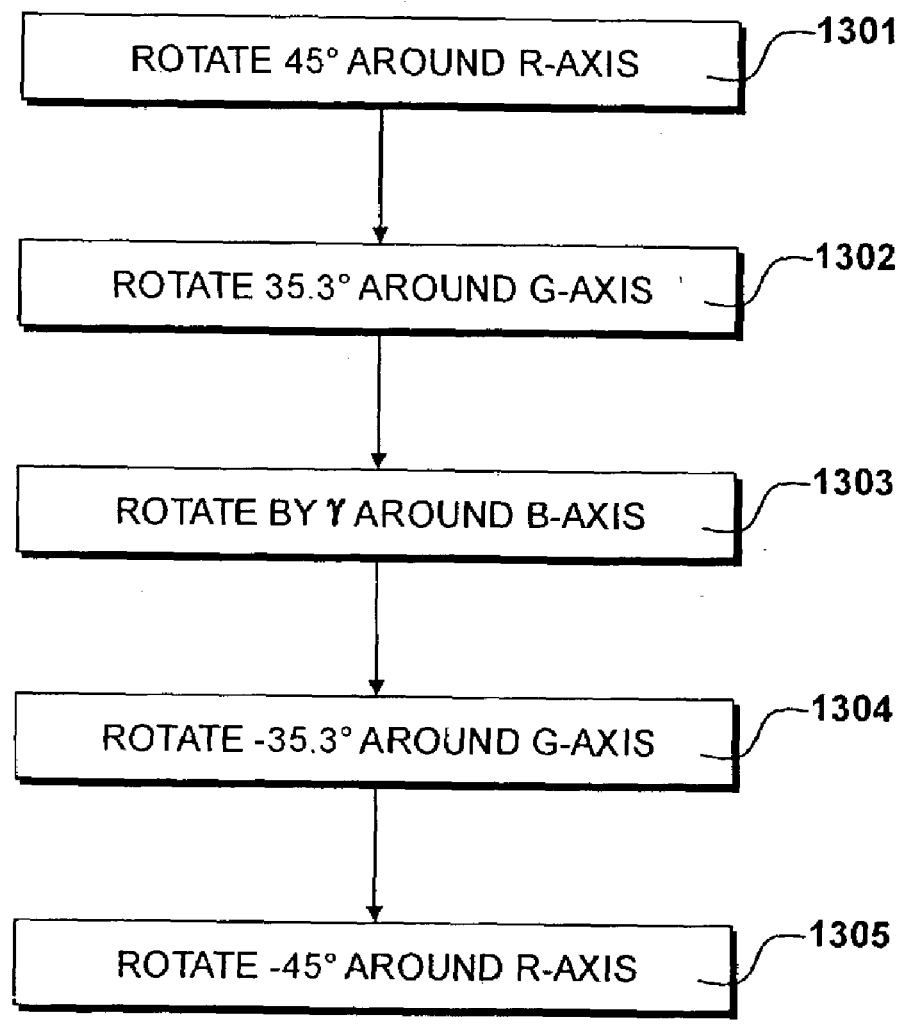
Figure 16:
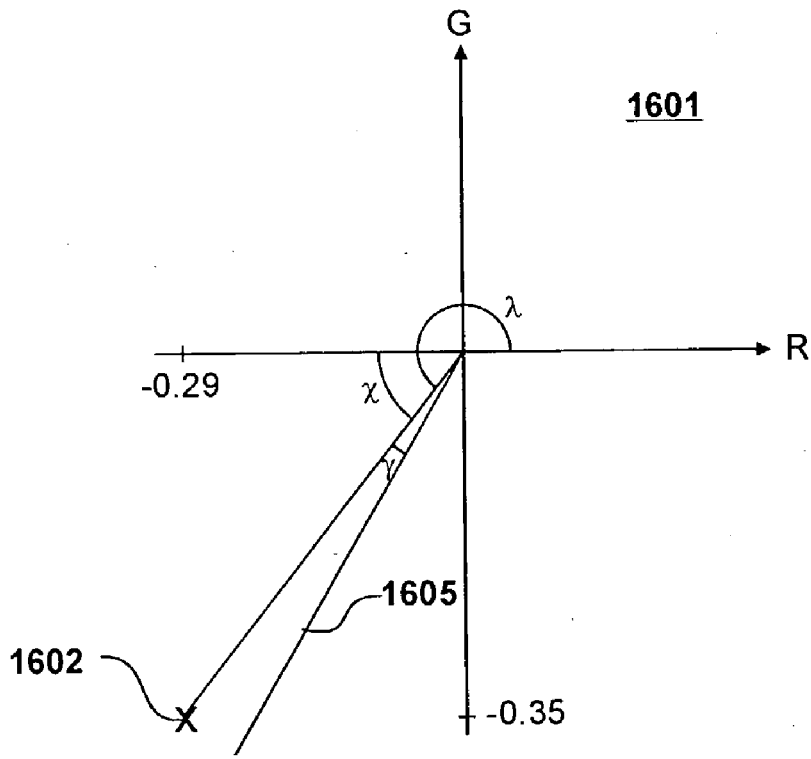
Figure 17:
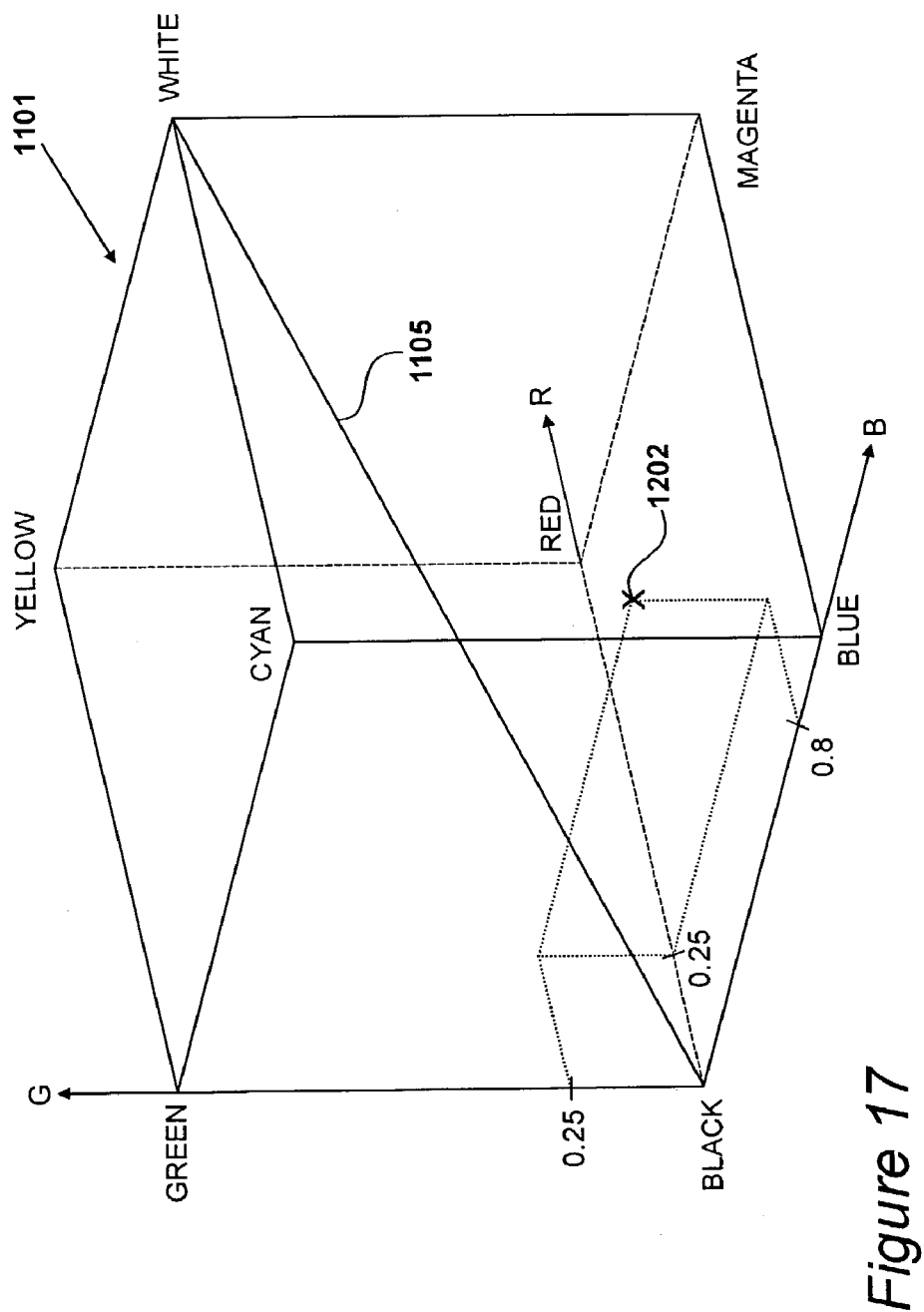
Figure 18:
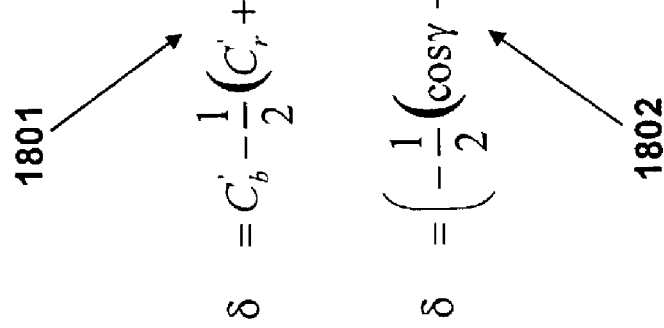
Figure 19A:
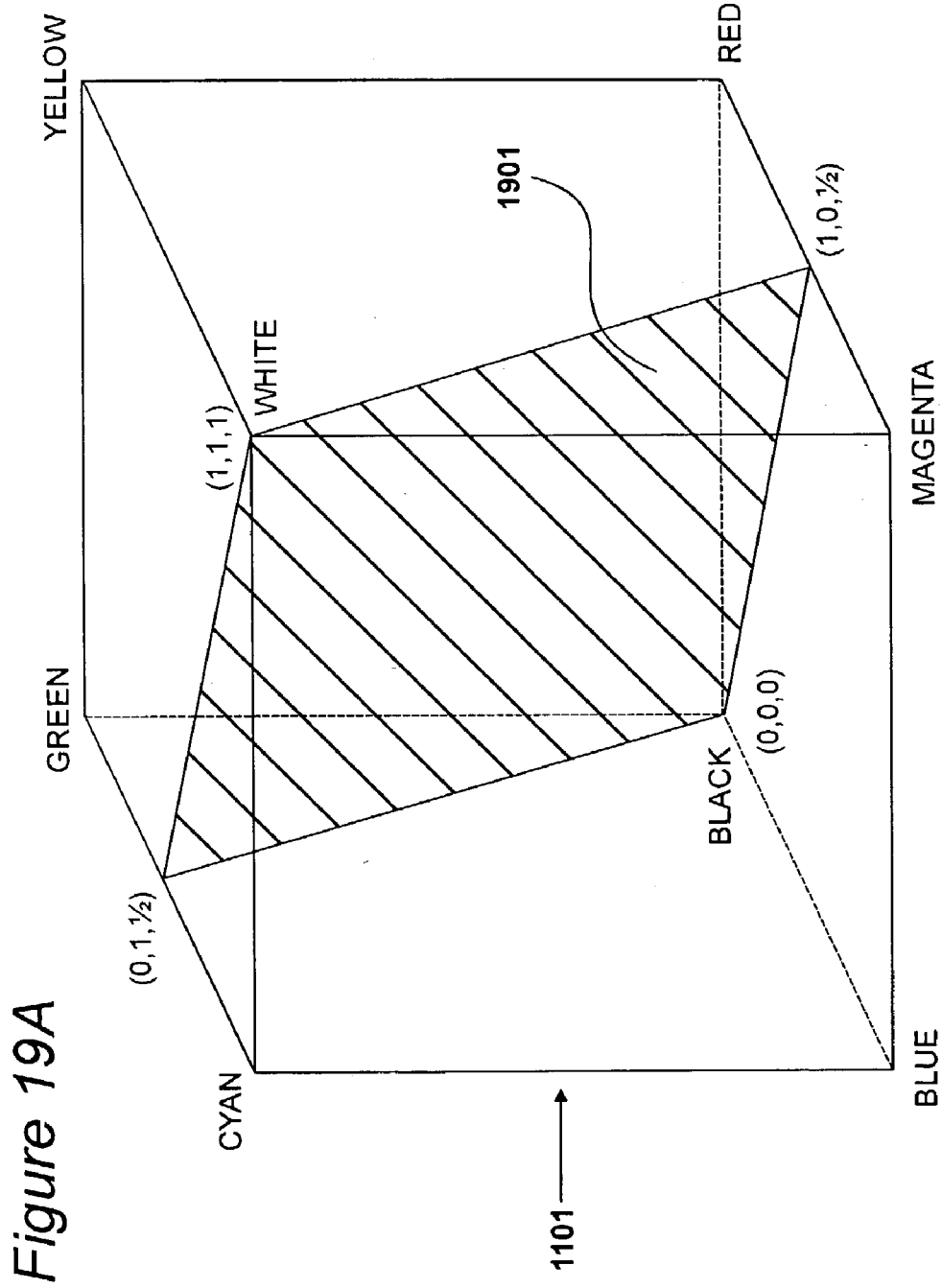
Figure 19B:
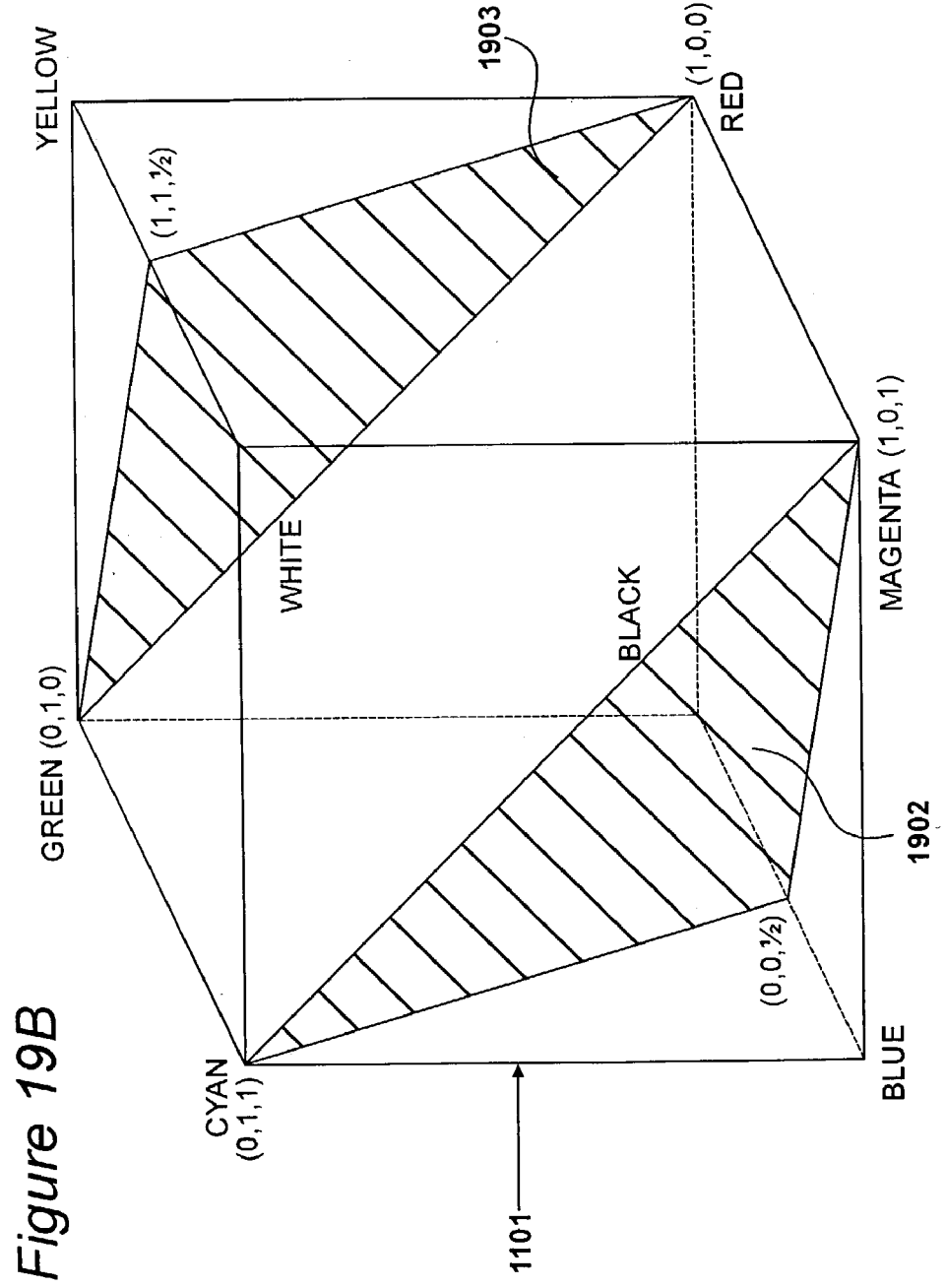
Figure 20:
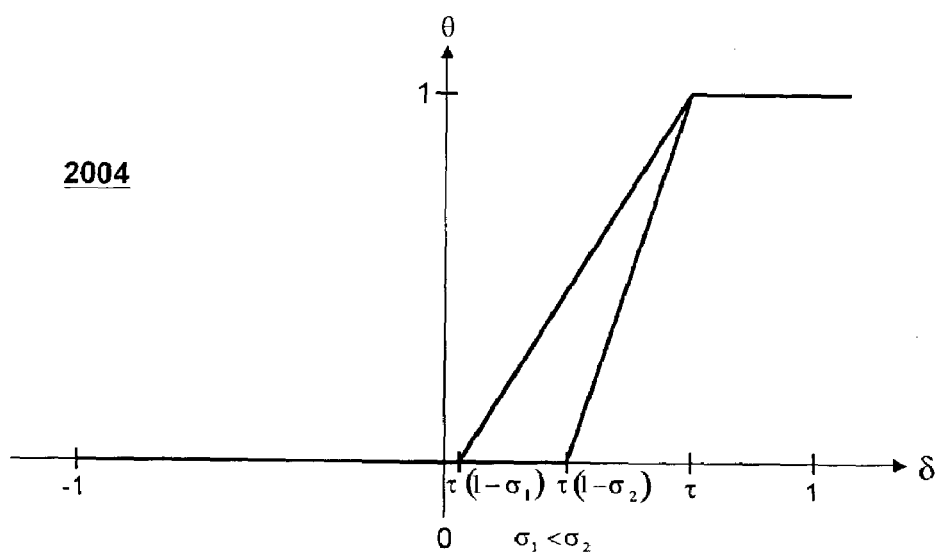
Figure 21:
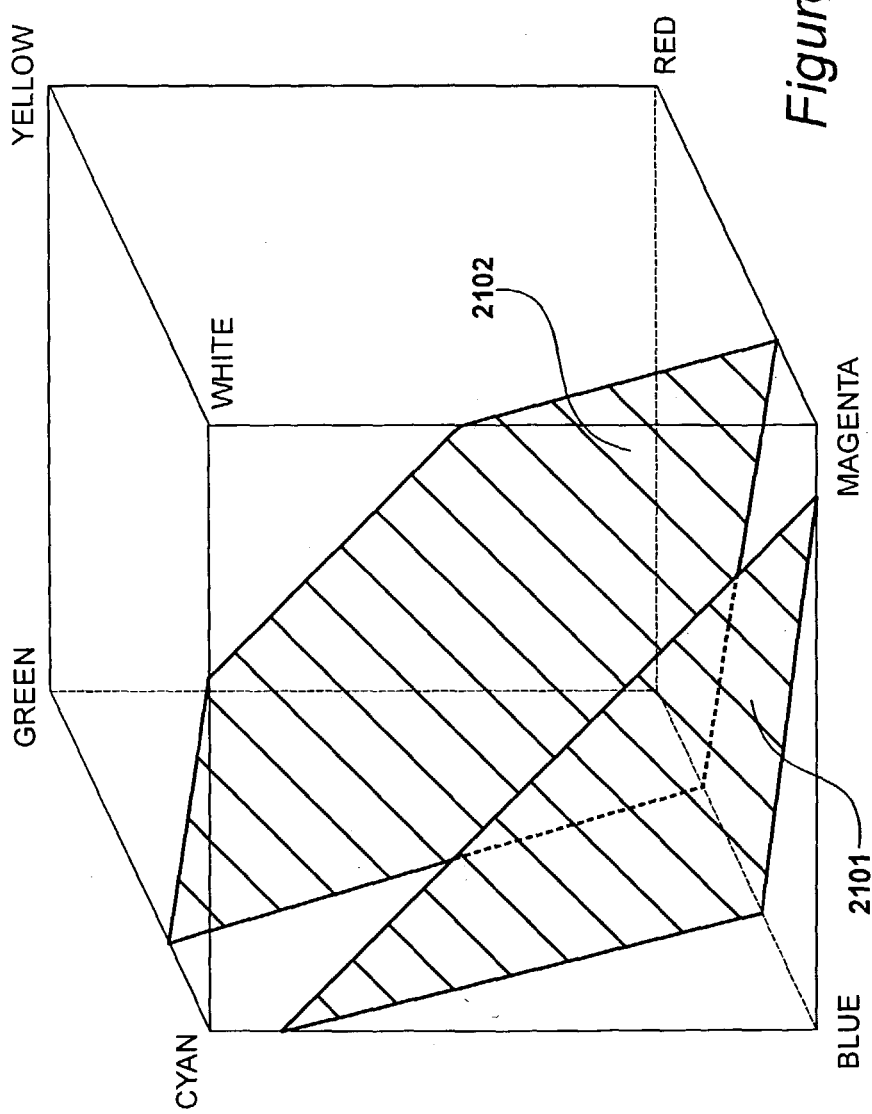
Figure 22:
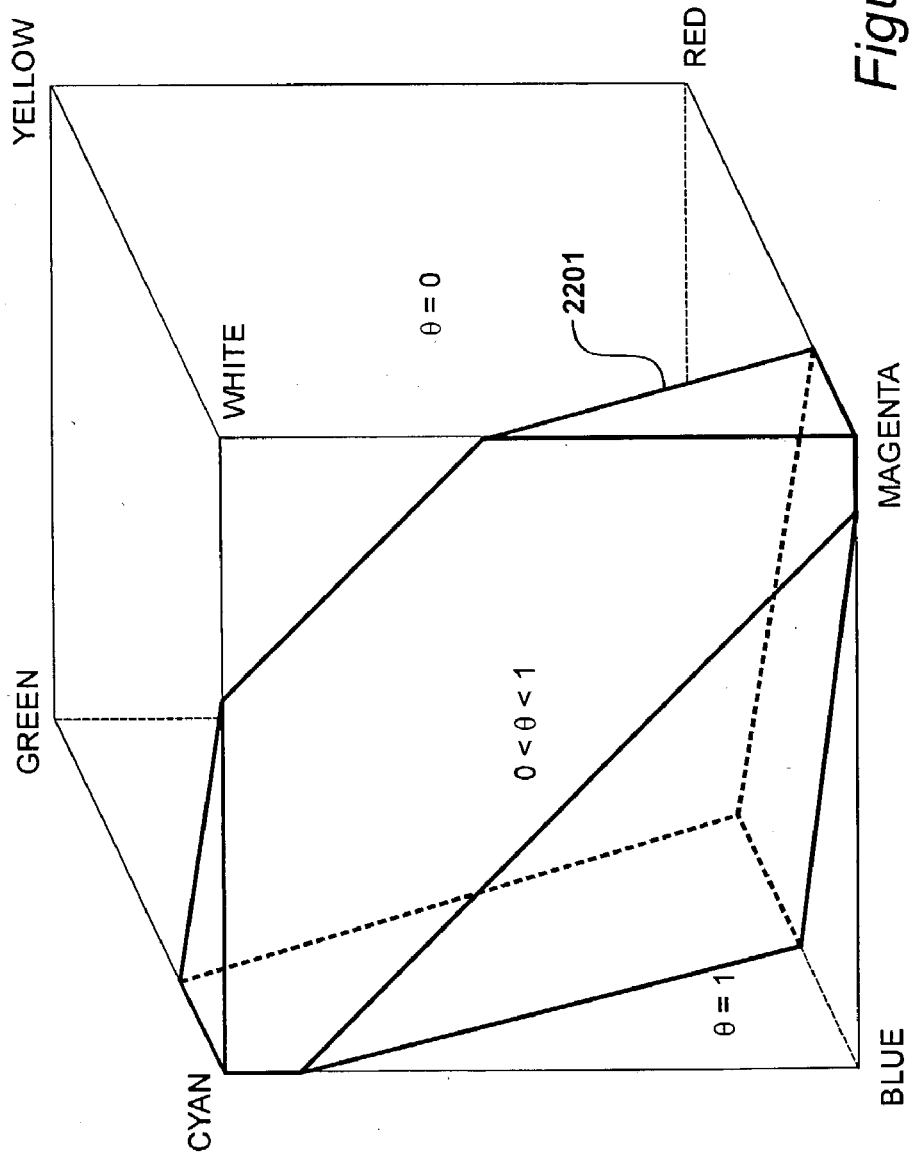
Figure 27:
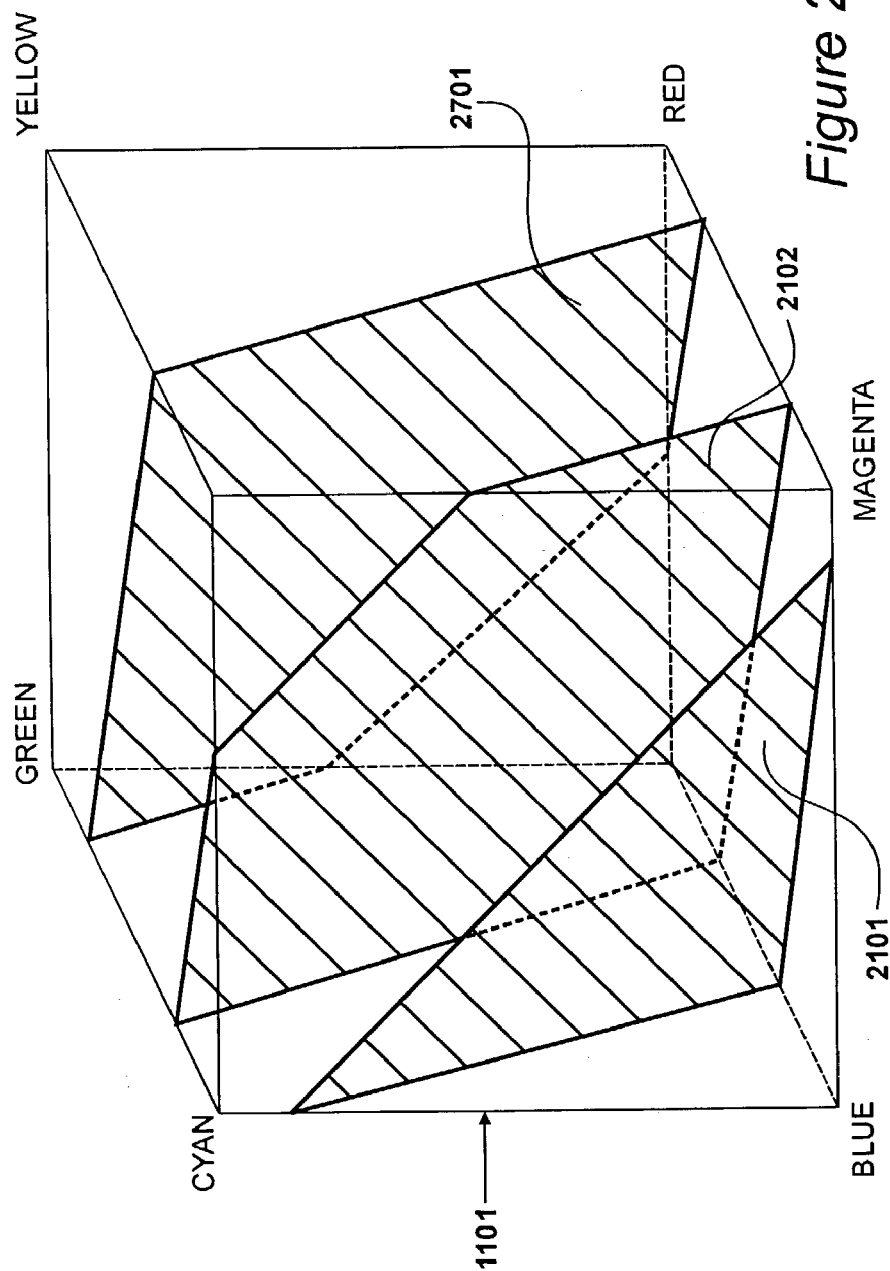
Figure 28:
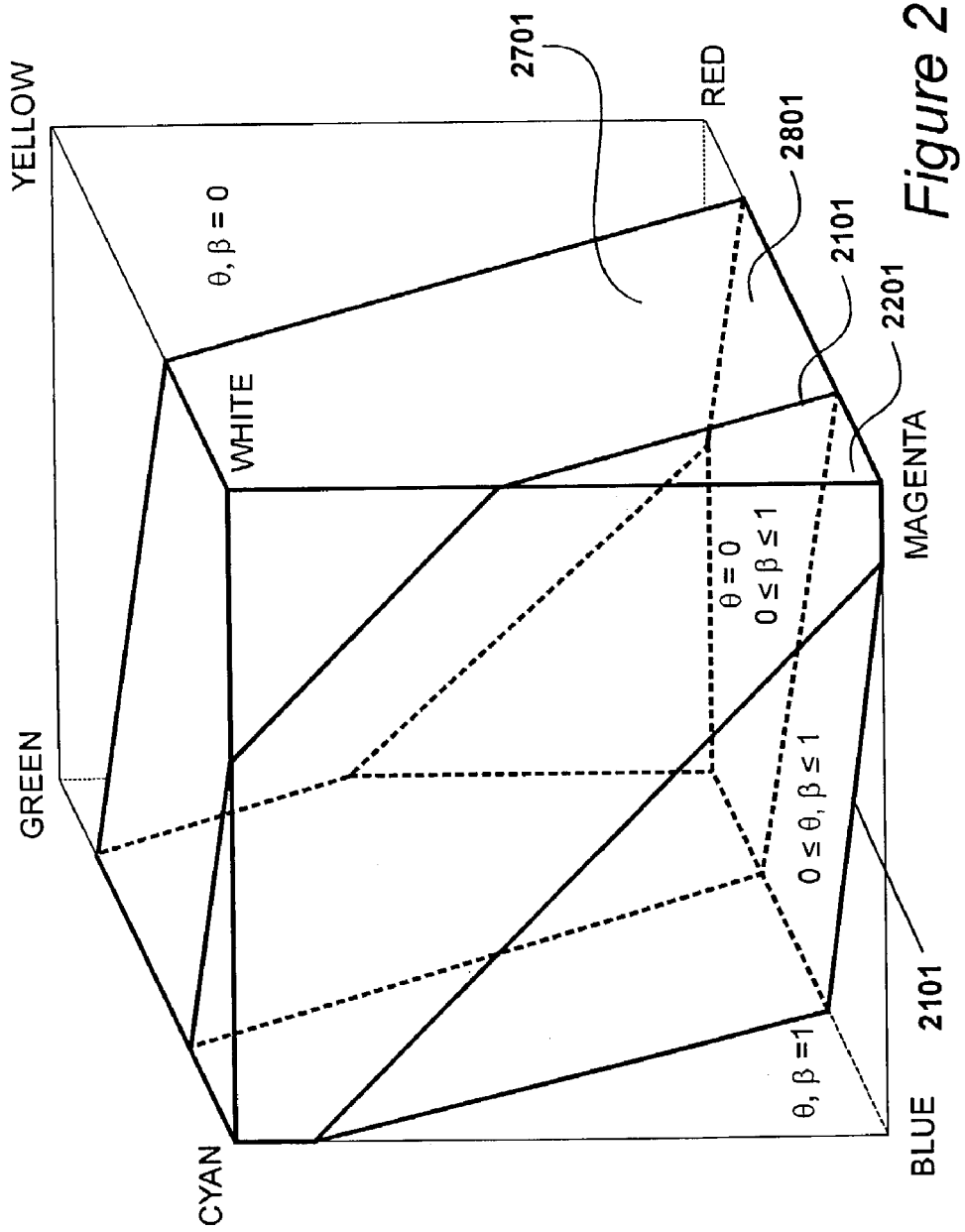
Figure 33:
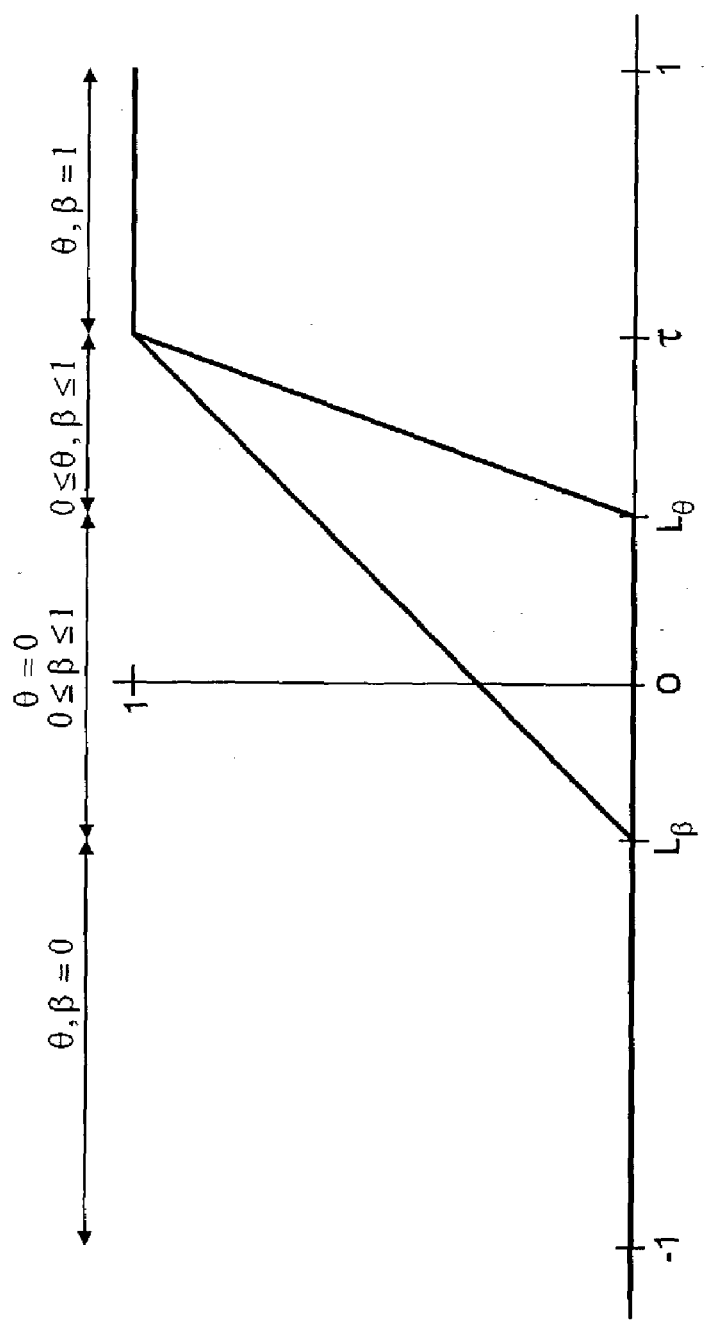
Figure 34:
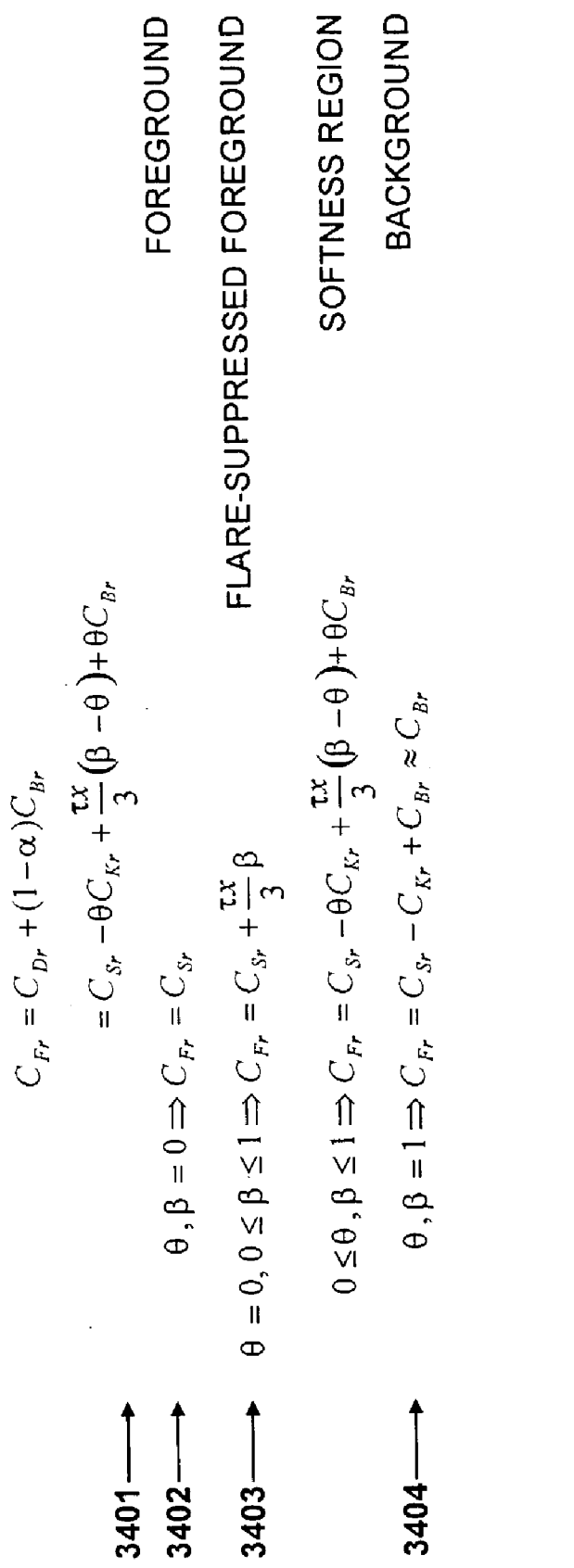
Figure 38:
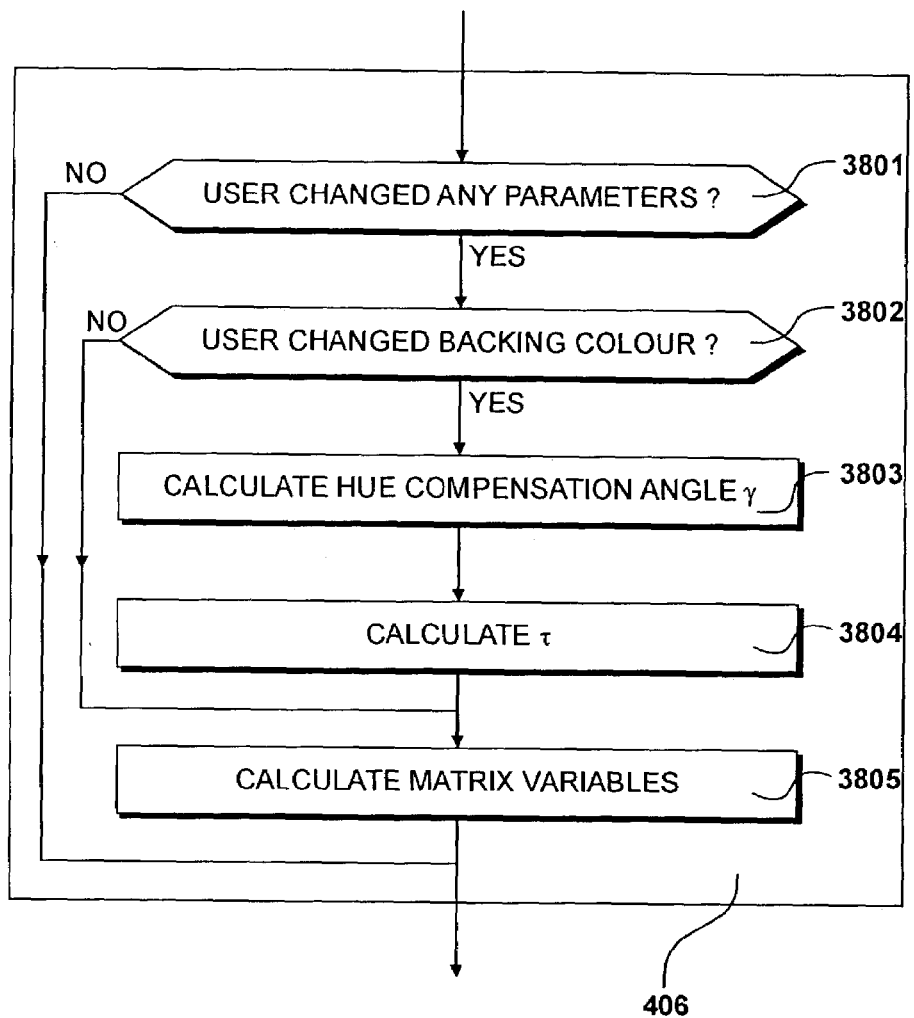
Figure 39:
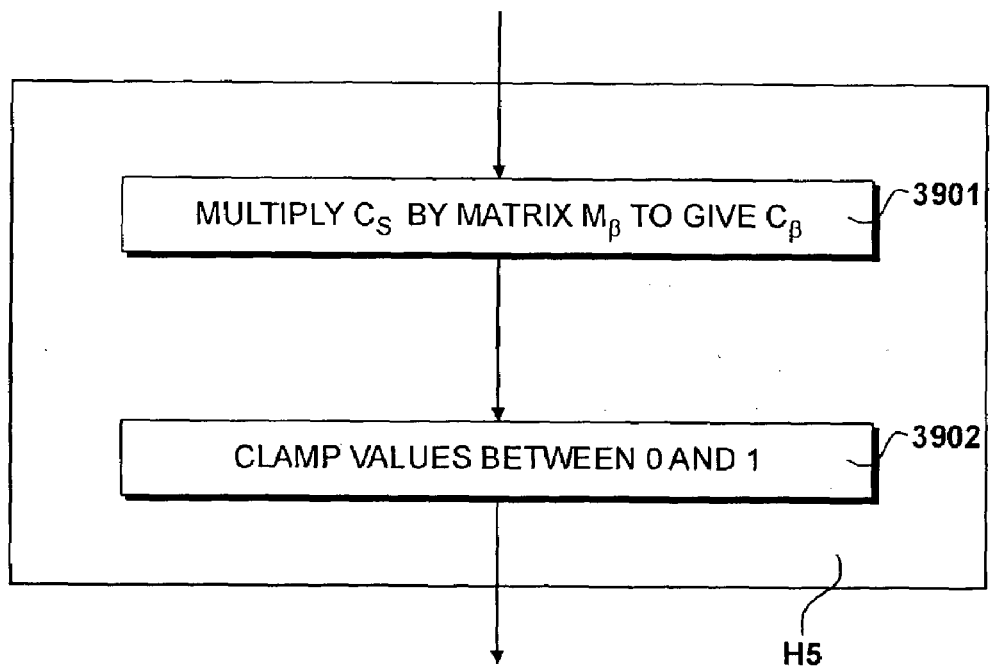
Figure 40:
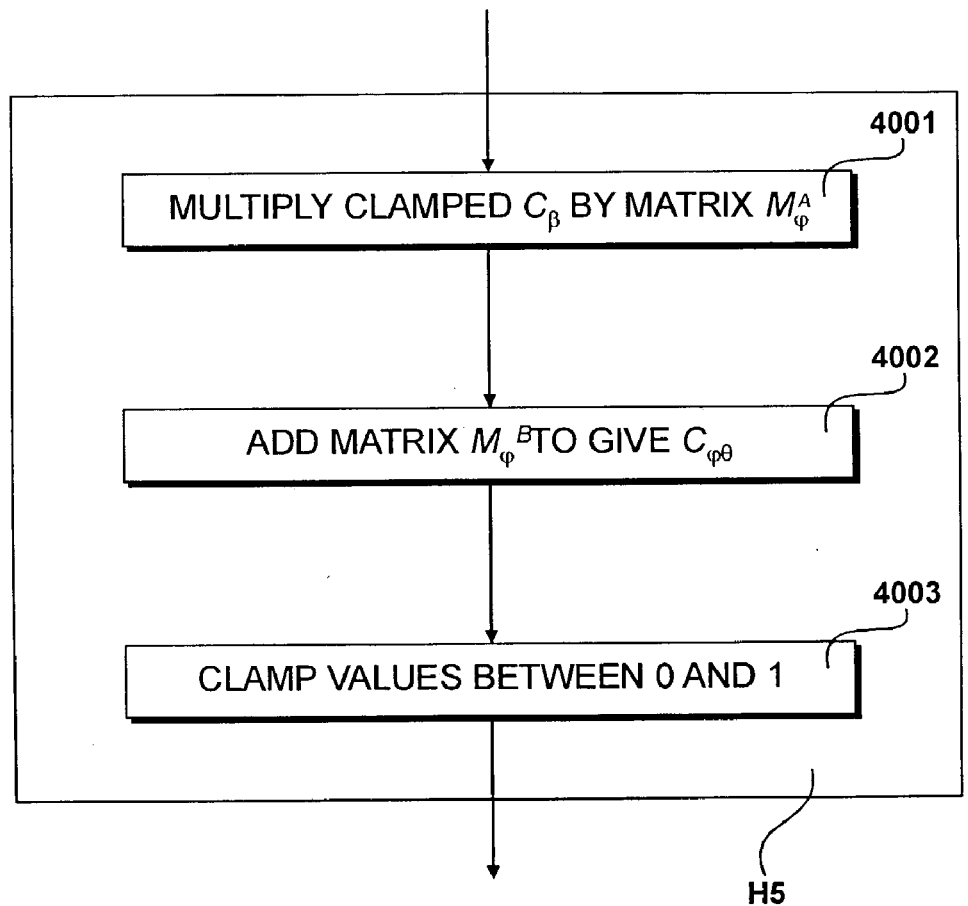
Figure 41:
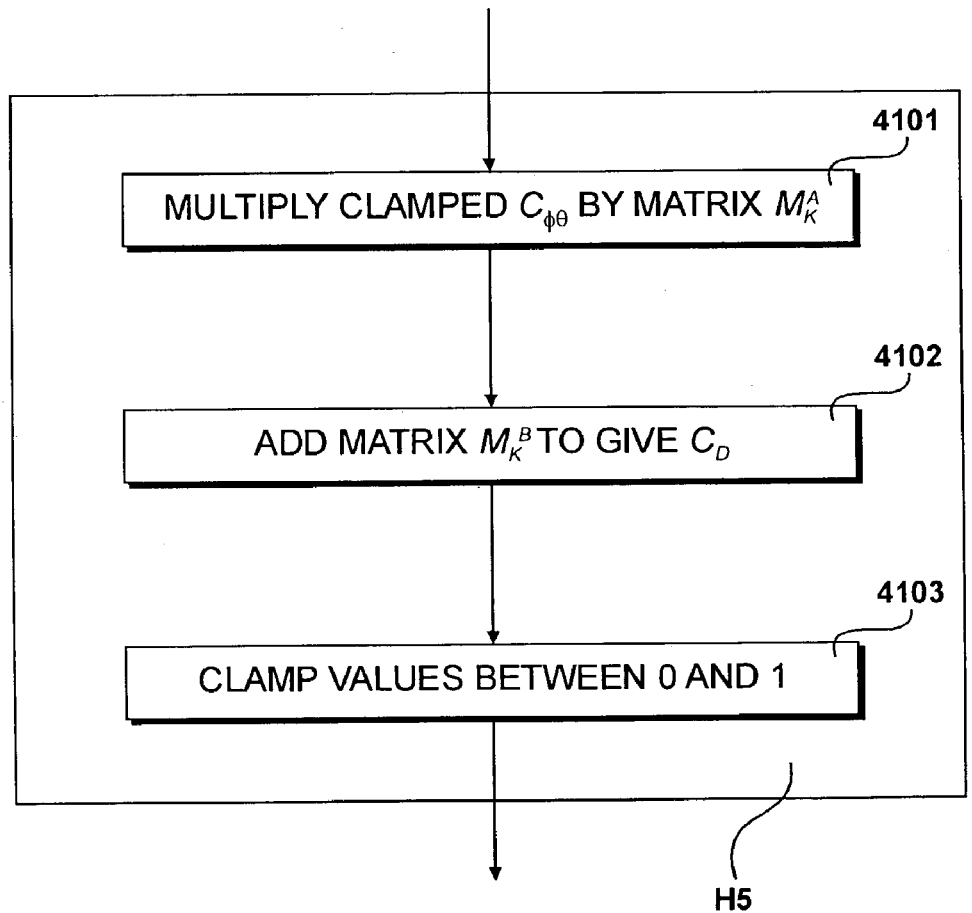
Figure 42:
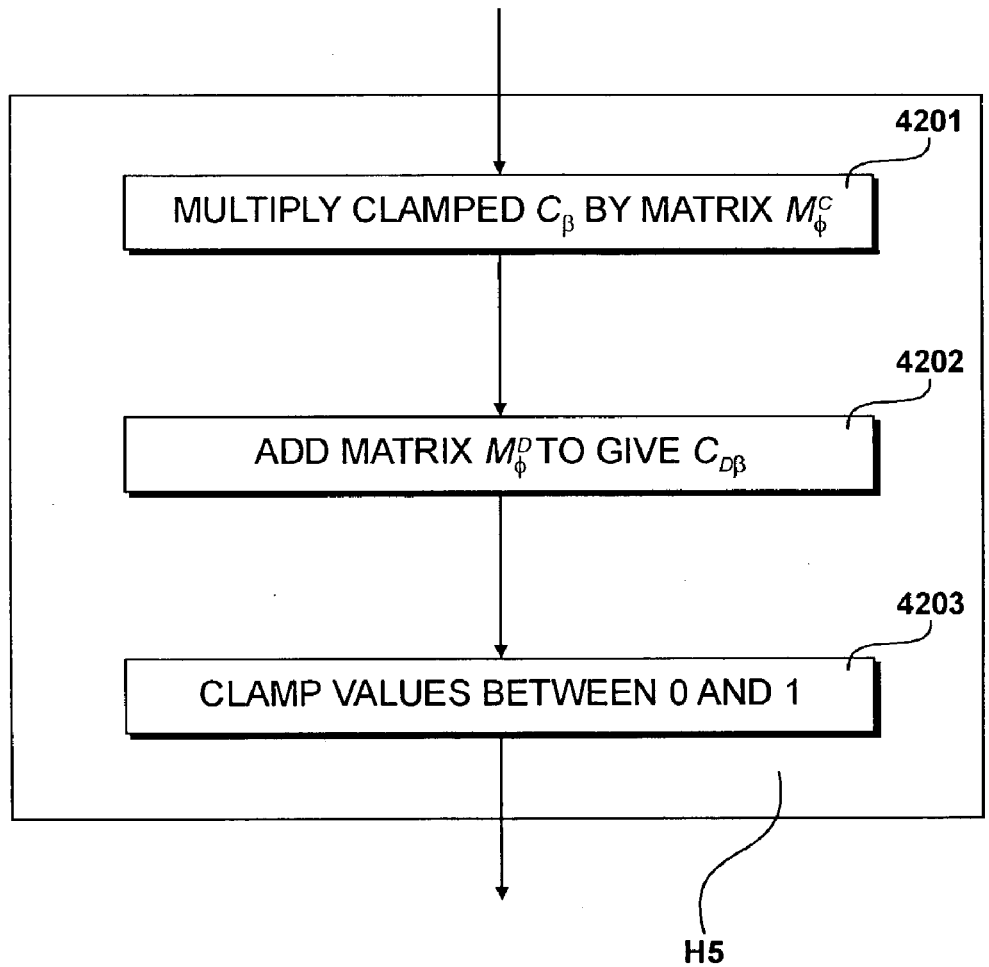
Figure 43:
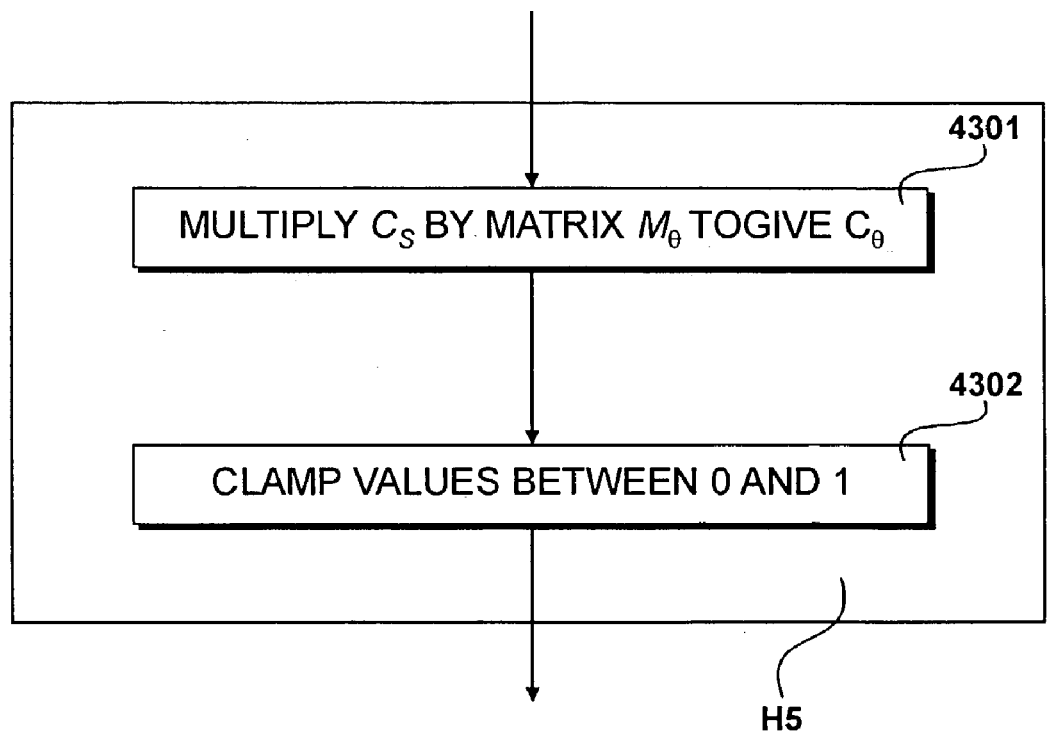
Figure 44:
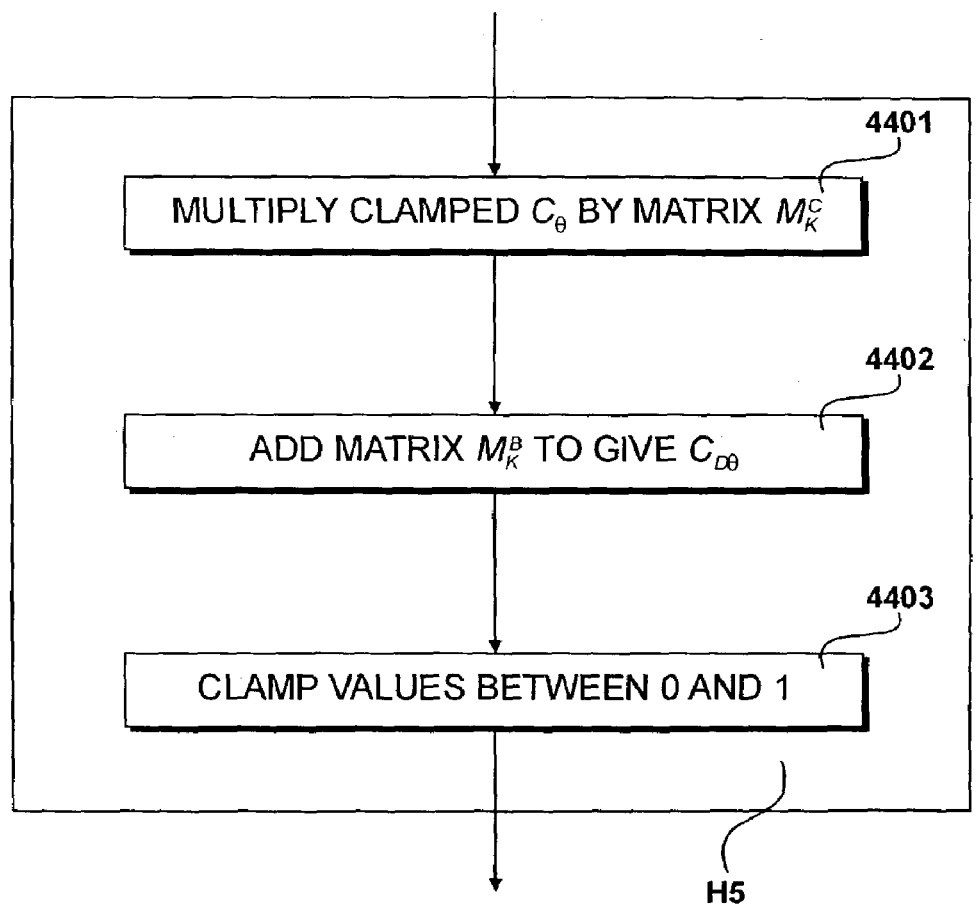
Figure 45:
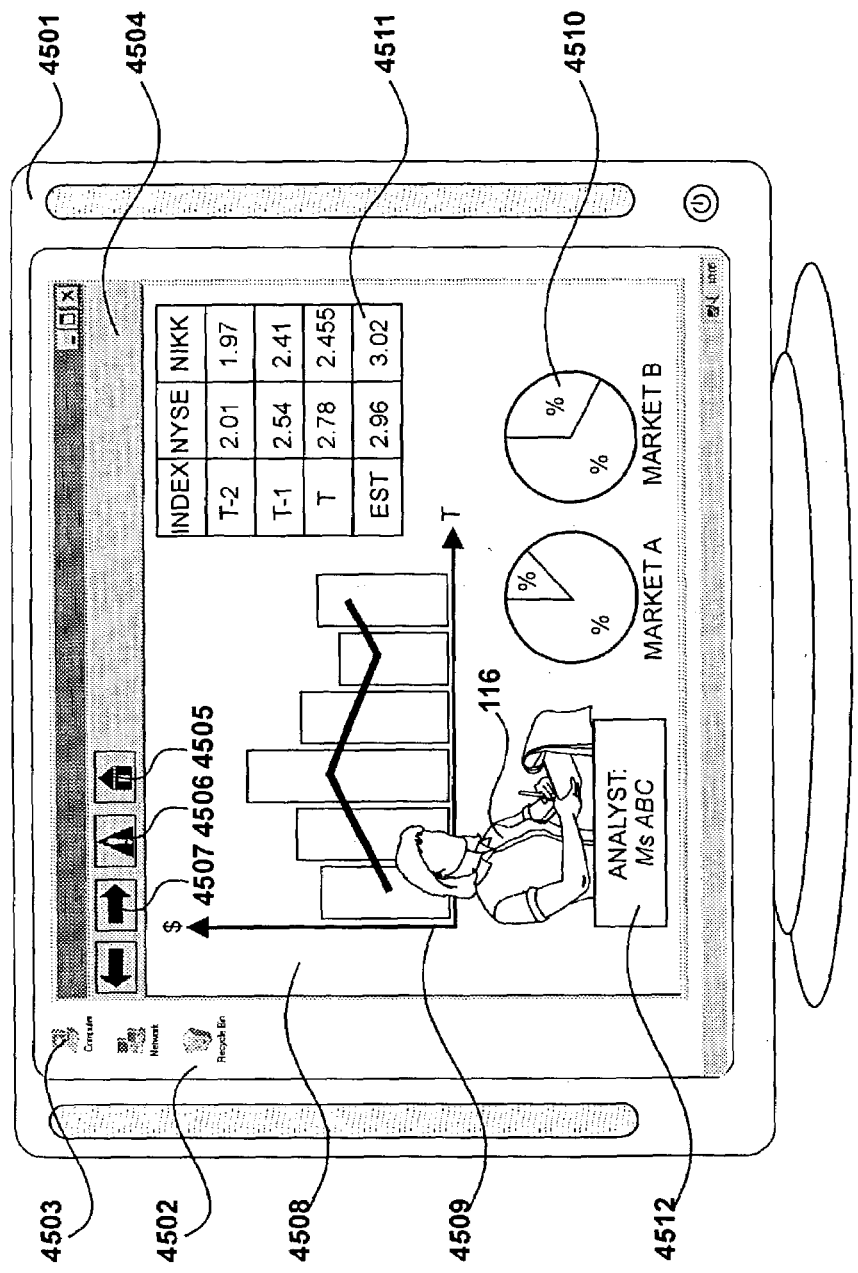

FIG. 1 shows an image processing system operated by an artist, which comprises an inexpensive computer system;

FIG. 2 shows a typical internal architecture of the computer system shown in FIG. 1, including a graphics accelerator card and a memory;

FIG. 3 shows a typical internal architecture of the graphics accelerator card shown in FIG. 2;

FIG. 4 details the operational steps according to which the artist shown in FIG. 1 operates the image processing system according to the present invention;

FIG. 5 details the contents of the memory shown in FIG. 2 upon completing the application starting step shown in FIG. 4, including an image processing application according to the present invention;

FIG. 6 further details the initialisation step shown in FIG. 4 with which the application according to the present invention initialises the graphics accelerator card shown in FIGS. 2 and 3;

FIG. 7 provides a graphical representation of the graphical user interface of the application displayed in FIG. 6, including a color selection interface;

FIG. 8 further details the keying initialisation step shown in FIG. 4;

FIG. 9A shows image data captured by the camera shown in FIG. 1 as supplied to the computer system also shown in FIG. 1;

FIG. 9B details the captured image data shown in FIG. 9A, including a plurality of picture screen elements;

FIG. 9C shows values conferred to the picture screen elements shown in FIG. 9B in order to generate a matte of the captured image data shown in FIGS. 9A and 9B;

FIG. 9D provides an alternative representation of the picture screen elements defining a matte of the captured image data shown in FIG. 9C;

FIG. 9E shows the matte shown in FIG. 9D configured by the present invention as foreground image data for subsequent compositing;

FIG. 9F shows captured image data shown in FIGS. 9A to 9E composited with background image data according to the present invention;

FIG. 10 illustrates the compositing of a background image frame shown in FIG. 9F, the foreground image frame shown in FIG. 9A and the matte shown in FIG. 9E generated according to the present invention in the frame buffer shown in FIGS. 3 and 6;

FIG. 11 shows a pixel's color values represented as a point in the RGB cube;

FIG. 12 illustrates an RGB cube viewed from the white corner;

FIG. 13 illustrates steps needed to rotate a point in RGB space around a line shown in FIG. 11;

FIG. 14 shows a matrix transformation that performs the steps shown in FIG. 13;

FIG. 15 defines a notion of distance in the RGB cube;

FIG. 16 illustrates a method of determining an angle for rotation in the RGB cube;

FIG. 17 shows the RGB cube with a hue-compensated point;

FIG. 18 defines the notion of distance using hue-compensated points;

FIGS. 19A and 19B illustrate planes formed in the RGB cube by the notion of distance;

FIG. 20 details equations defining a transparency mask;

FIG. 21 illustrates planes in the RGB cube obtained during color-suppression;

FIG. 22 illustrates a polygon defined by the planes shown in FIG. 21;

FIG. 23 details calculations performed to obtain a transparency mask;

FIG. 24 shows calculations necessary to composite a foreground and background image;

FIG. 25 details calculations necessary for flare-suppression;

FIG. 26 details equations defining a flare-suppression mask;

FIG. 27 illustrates a plane obtained during flare-suppression along with the planes shown in FIG. 21;

FIG. 28 illustrates a polygon in RGB space obtained during flare-suppression;

FIG. 29 details calculations performed to obtain a flare-suppression mask;

FIG. 30 details calculations carried out during flare-suppression;

FIG. 31 details calculations necessary to substitute the color suppression mask for the flare-suppression mask;

FIG. 32 details calculations necessary to perform color suppression;

FIG. 33 shows a graph illustrating flare-suppression and color suppression regions;

FIG. 34 shows equations illustrating the effect of color suppression and flare-suppression;

FIG. 35 shows the calculations necessary to perform color suppression and flare-suppression together;

FIG. 36 shows the equations necessary to perform only flare-suppression;

FIG. 37 shows the calculations necessary to perform only color suppression;

FIG. 38 details steps carried at step 406 as shown in FIG. 4 wherein the user interacts with the application;

FIG. 39 shows a function carried out at step H5 in Figure H during the first pass of chroma-keying;

FIG. 40 shows a function carried out at step H5 in Figure H during the second pass of chroma-keying;

FIG. 41 shows a function carried out at step H5 in Figure H during the third pass of chroma-keying;

FIG. 42 shows a function carried out at step H5 in Figure H during the second pass of flare suppression only;

FIG. 43 shows a function carried out at step H5 in Figure H during the first pass of color suppression only;

FIG. 44 shows a function carried out at step H5 in Figure H during the second pass of color suppression only; and FIG. 45 shows the final result of the analyst shown in FIG. 1 composited with the background shown in FIG. 9F

WRITTEN DESCRIPTION OF THE BEST MODE FOR CARRYING OUT THE INVENTION

The invention will now be described by way of example only with reference to the previously identified drawings.

FIG. 1

An image data processing system is shown in FIG. 1 and includes a programmable computer 101 having a drive 102 for receiving DVD-ROMs 103 and writing to CD-RAMs 104 and a drive 105 for receiving high-capacity magnetic disks, such as ZIP™ disks 106. Computer 101 may receive program instructions via an appropriate DVD-ROM 103 and output data may be written to a re-writable CD-RAM 104. Program instructions may be similarly received from a ZIP™ disk 106 and output data may be written thereto. Moreover, instructions may be transmitted to and received from a network server 107 or the internet 108, to which said server 107 provides access, by means of network connection 109.

The user 110 of computer system 101 may visualise the output data of computer 101 on a visual display unit 111. Manual input is received via a keyboard 112, a mouse 113 and/or from a graphic tablet-and-stylus combination (not shown).

In the example, user 110 operates a video capture studio and supplies image data for inclusion in webcasts, said webcasts being broadcasts streamed over the World Wide Web, or Internet. Accordingly, programmable computer 101 is interfaced with a camera 114, for instance a digital camera recorder supplying image data to said computer 101 by means of a Firewire™ connection 115. Alternatively, analogue image data may be supplied from a conventional video camera and converted to digital data by an analogue to digital video capture interface. In the example shown, user 110 has been tasked with supplying a commentary of a stock market analyst 116 to a financial website in real time. Thus, analyst 116 provides her commentary, which is captured as digital video by camera 114 in front of a bluescreen 117. Technical advances in image processing systems have enabled the generalisation of the "bluescreen" technique in video, whereby actors or models are filmed in a studio configured with blue-saturated surroundings in order to generate a clip of foreground image frames. An alternative clip of background image frames is subsequently generated and, in the example, said alternative clip comprises various stock market graphical indicators. A compositing process allows an editor, such as user 110, to seamlessly blend the foreground and background image frames by means of keying part of the corresponding video signals, for instance the luminance or chrominance signal.

FIG. 2

The components of computer system 101 are further detailed in FIG. 2. The system includes a Pentium 4™ central processing unit (CPU) 201 which fetches and executes instructions and manipulates data via a providing connectivity with a larger main memory 203, DVD-ROM re-writer 102, ZIP™ drive 105 and other components which will be further detailed below. System bus 202 is, for instance, a crossbar switch or other such bus connectivity logic. CPU 201 is configured with a high-speed cache 204 comprising between two hundred and fifty-six and five hundred and twelve kilobytes, which stores frequently-accessed instructions and data to reduce fetching operations from larger memory 203. Memory 203 comprises between two hundred and fifty-six megabytes and one gigabyte of dynamic randomly accessible memory and stores executable programs which, along with data, are received via said bus 202 from a hard disk drive 205. Hard disk drive (HDD) 205 provides non-volatile bulk storage of instructions and data.

A graphics card 206 receives graphics data from the CPU 201, along with graphics instructions. Said graphics accelerator 206 is preferably coupled to the CPU 201 by means of a direct port 207, such as the advanced graphics port (AGP) promulgated by Intel Corporation, the bandwidth of which exceeds the bandwidth of bus 202. Preferably, the graphics card 206 includes substantial dedicated graphical processing capabilities, so that the CPU 201 is not burdened with computationally intensive tasks for which it is not optimised.

Input/output interface 208 provides standard connectivity to peripherals such as keyboard 112, mouse 113, or a graphic tablet-and-stylus. A Universal Serial Bus (USB) 209 is provided as an alternative means of providing connectivity to peripherals such as keyboard 112, mouse 113 or said graphic tablet-and-stylus, whereby said connectivity is improved with a faster bandwidth for user input data transfer. A Firewire™ interface 210 is also provided as an alternative means of providing connectivity to peripherals such as camera 114, whereby said connectivity is improved with a faster bandwidth for image data transfer.

Network card 211 provides connectivity to server 107 and the Internet 108 by processing incoming and outgoing data packets according to a plurality of communication protocols. Optionally, a sound card 212 is provided which receives sound data from the CPU 201 over system bus 202, along with sound processing instructions, in a manner similar to graphics card 206. Preferably, the sound card 212 includes substantial dedicated digital sound processing capabilities, so that the CPU 201 is not burdened with computationally intensive tasks for which it is not optimised.

The equipment shown in FIG. 2 constitutes an inexpensive programmable computer of fairly standard type, such as a programmable computer known to those skilled in the art as an IBM™ PC compatible or an Apple™ Mac.

FIG. 3

Instructions according to the present invention may be processed by the image processing system 101 to display 3-D graphical objects on the video display unit 111, wherein the CPU 201 may transfer information to and from the 3-D graphics accelerator 206 according to a programmed input/output protocol over the AGP port 207. The 3-D graphics accelerator 206 in computer system 101 provides increased performance for processing geometric primitives to be rendered as three-dimensional objects on VDU 111, thus reducing the need for an expensive workstation and the associated cost thereof.

Functionally, instructions according to the invention preferably conform to an application programmer interface (API) such as OpenGL which, when processed by CPU 201, generate processor commands known as microcode and data that define a geometric primitive, such as a polygon, for output on VDU 111. The OpenGL (Open Graphics Library) API used in the preferred embodiment is designed as a hardware-independent interface to be implemented on many different hardware platforms, but it will be readily apparent to those skilled in the art that hardware-specific APIs or operating system-specific APIs may be used to achieve the benefit of the present invention. Such hardware-specific APIs or operating system-specific APIs include for instance Nvidia's Cg™ Programming Language, Creative LabS™'s Shading Programming Language, Microsoft™'s DirectX™ Pixel Shaders or Renderman™'s Image Shaders.

A typical architecture of a 3-D graphics accelerator 206 is shown in further detail in FIG. 3. The 3-D graphics accelerator 206 principally comprises a graphics processing unit 301 (GPU) configured with a memory cache 302 and a dynamic memory 303. The accelerator 206 further comprises a plurality of sub-processors including floating points processors and drawing controllers as well as a frame buffer and a random access memory digital-to-analogue converter (RAMDAC). The GPU 301 interfaces the graphics accelerator 206 to the AGP BUS 207 and controls the transfer of graphics processing instructions, known as microcode, and graphical data between said dynamic memory, floating point processors, drawing controllers and frame buffer.

A first floating point processor 304 acts as an evaluator, the processing function of which derives the vertices used to represent a polygonal surface from its control points. A second floating point processor 305 converts the vertices output by evaluator 304 into primitives, whereby the spatial co-ordinates thereof are projected from a position within a three-dimensional co-ordinate system to a two-dimensional position on a screen. An additional function of vertex processor 305 is the assembly of said primitives, which involves clipping (the elimination of geometrical data not required for output), viewport and depth processing operations and optionally culling, wherein all such processing operations will be familiar to those skilled in the art. The output of vertex processor 305 is complete geometric primitives, including vertices with related color data, depth data, optionally texture co-ordinate values and format for the next rasterization step by the rasterizer sub-processor 306, which will be further described below. A first drawing controller 307 processes non-geometric data received by GPU 301. Pixel processor 307 typically scales, biases and processes said non-geometrical data by means of a pixel map, whereby its output is then either forwarded to a second drawing controller 308, the function of which is to apply texture image data onto geometric objects, for instance to make said objects look more realistic, or said output is directly forwarded to said rasterizer 306. The rasterizer sub-processor 306 processes both geometric output data of vertex processor 305 and pixel output data of pixel processor 307 and/or texture assembler 308 into fragments, wherein each of said fragments corresponds to a pixel to be stored in frame buffer 309, which comprises an array of addressable dynamic random access memory.

A third drawing controller 310 performs a series of operations that may alter or possibly eliminate fragments before they are stored in frame buffer 309. Fragment processor 310 primarily processes texture(s) received from texture assembler 308 to generate a texture element, also known as a texel, to be applied to a fragment. Fragment processor 310 may perform additional processing functions including fog calculations, pixel blending, pixel dithering and/or bitmask masking. The processed fragment is eventually drawn into the frame buffer 309, wherein it is now a fully-processed, displayable pixel.

The RAMDAC 311 comprises a programmable video timing generator and programmable pixel clock synthesiser along with crossbar functions, as well as traditional color look-up tables and triple video DAC circuits. RAMDAC 311 in turn couples to the video display unit 111. The architecture of the 3-D graphics accelerator 205 described above may vary to a large extent and is here only provided for illustrative purposes. Those skilled in the art will be familiar with the functionality and performance benefits thereof.

With reference to the description of FIGS. 1 to 3, an aim of the present invention is to facilitate the generation of a matte from an image frame to composite a portion of said image, defined as a foreground image, with a background image from an alternative source. According to the known prior art however, the image processing system 101 described in FIGS. 1 to 3 may not provide sufficient processing resources to generate a matte of the above described blue-screened image frame in real-time as required. Indeed, although matte generation is a well-known technique for compositing image data from various sources, it is traditionally performed by the main processor 201 of the image processing system 101, because the computations involved according to the known prior art far exceed the processing capacities of any of the sub-processors in the graphics accelerator 206, and GPU 301 alone may not perform those processes in real-time. Thus it is known to generate a matte from image data with CPU 201, which is then sent to GPU 301 as a texture. According to the preferred embodiment of the present invention, however, only the "bluescreen" image frame captured by camera 114 is sent to GPU 301, and the matte thereof is generated by graphics accelerator 206.

FIG. 4

The operational steps according to which artist 110 operates image processing system 101 are detailed in FIG. 4.

At step 401, the computer system 101 is switched on, whereby all instructions and data sets necessary to process image data are loaded at step 402, including instructions according to the present invention to generate a matte of said image data. Optionally, said instructions and data sets necessary to process image data are loaded from a DVD-ROM 103, from network server 107 or the internet 108 at step 402, for instance if said instructions are not yet stored on HDD 205. Upon completing the loading operation of step 402, the processing of said instructions according to the present invention by CPU 201 starts at step 403.

A portion of the output of said processing step 403 comprises microcode for the initialisation of graphics accelerator 206 at the next step 404, whereby CPU 201 sends said microcode to GPU 301. Said microcode includes for instance parameterization for the operating mode and image data output of accelerator 206 and, preferably, processing functions to be performed by GPU 301 and its sub-processors 304 to 308 and 310, which are stored in memory 303 and/or cache 302. The completion of the above initialisation step 404 results in the eventual output of the Graphical User Interface (GUI) of the image processing application according to the present invention by graphics accelerator 206 to VDU 111, whereby user 110 may then select a preferred image keying process at step 405 from difference-keying, luminance-keying and chroma-keying, each of which will be further described below.

At step 406, image data is acquired as a single frame or, alternatively, from a clip of frames or stream thereof either in real-time from camera 114 or the Internet 108 or from hard disk drive 205, network server 107, a DVD-ROM 104 or a disk 106 such that it can be displayed to user 110 on VDU 111 for subsequent interaction therewith at step 406 by means of the image processing application. In the preferred embodiment of the present invention, said image data is acquired in real-time as a stream of image frames from camera 114. Upon completing the interactive step 406, the user-inputted parameters thereof specify how to process image data in order to generate a matte according to the present invention at step 407.

At step 408, a question is asked as to whether another image frame or another clip of image frames, i.e. a subsequent stream of image frames, require processing by image processing system 101 according to the present invention. If the question of step 408 is answered positively, control is returned to step 406 such that new image data can be acquired in real-time from camera 114 or the internet 108, or from hard disk drive 205, network server 107, a DVD-ROM 104 or a disk 106. Alternatively, if the question asked at step 408 is answered negatively, then user 110 is at liberty to stop the processing of the instructions according to the present invention at step 409 and, eventually, switch image processing system 101 off at step 410.

FIG. 5

The contents of main memory 203 subsequent to the application processing start step 403 are further detailed in FIG. 5.

An operating system is shown at 501 which comprises a reduced set of instructions for CPU 201, the purpose of which is to provide image processing system 101 with basic functionality. Examples of basic functions include for instance access to files stored on hard disk drive 205 or accessed from DVD/CD ROM drive 102 or ZIP drive 105 and management thereof, network connectivity with network server 107, the Internet 108 and camera 114, interpretation and processing of the input from keyboard 112, mouse 113 or graphic tablet-and-stylus. In the example, the operating system is Windows 2000 Professional™ provided by the Microsoft Corporation of Redmond, Calif., but it will be apparent to those skilled in the art that the instructions according to the present invention may be easily adapted to function under different other known operating systems, such as IRIX™ provided by Silicon Graphics Inc, Mac OGX or LINUX, which is freely distributed.

An internet browser application is shown at 502, which processes hypertext markup language-coded data packets or other internet-specific formatted data or applets into graphical data for display on VDU 111. A digital video capture application is shown at 503 which processes digital video image data generated by camera 114 and accessed at Firewire™ interface 210 into graphical data for display on VDU 111 and, optionally, storage in HDD 205 CD RAM 104, server 107 or disk 106.

An image processing application according to the present invention is shown at 504, which configures graphics accelerator 206 to generate a matte of the image data output by application 503 for subsequent compositing. Corresponding application data is shown at 505 which comprises various sets of user-independent data and user dependent-data according to which application 504 processes image data. Image data generated by application 503 to be subsequently processed by application 504 and its corresponding data 505 is shown at 506 and geometric data generated by any of applications 501 to 504 for subsequent processing by graphics accelerator 206 is shown at 507. Finally, user input data is shown at 508 which comprises user input-dependent data identifying parameters and/or data input by user 110 by means of keyboard 112, mouse 113 and/or graphic tablet-and-stylus to process image data 506.

Various datasets of each subset of main memory 203 are supplied to GPU 301 for dedicated graphics processing by CPU 201. For instance, operating system 501 supplies device drivers 509 when image processing system 101 is initially switched on to ensure hardware compatibility. Similarly, image processing application 504 and application data 505 supply microcode 510, wherein application data 505 specifies processing parameters within said microcode 510 according to user input data 508. Image data 506 may be supplied to GPU 301 as bitmaps 511 or complete pixels 512 either by application 503 or by application 504 and geometrical data 507 may similarly be supplied to GPU 301 as lines or vectors 513, vertices 514 or complete polygons 515 either by application 503 or by application 504.

For the purpose of clarity, the specific description will hereinafter refer only to image processing application 504 supplying microcode 510, pixels 512 defining a stream of image frames captured by camera 114 and vertices 514.

FIG. 6

Before image processing application 504 may supply any graphical data, either geometric or non-geometric, to GPU 301, the graphics accelerator 206 must first be initialised by said application 504 according to step 404, which is further detailed in FIG. 6.

Upon user 110 starting application 504 at step 403 CPU 201 parses and processes the application's initial settings at step 601. Said settings for instance specify the screen resolution at which application 504 operates, whereby the operating system 501 default display resolution may be 1024×768 pixels but application 504 requires a display resolution of 1600×1200 pixels, i.e. to display image data in finer detail. Other such initial settings may include an API operating mode, indicating for instance whether graphics accelerator 206 should operate under OpenGL, DirectX's Direct3D or other mode. CPU 201 subsequently forwards the corresponding initialising microcode to GPU 301, whereby it is initialised at step 602. Having processed said initialising microcode, GPU 301 is thus able to initialise all of its sub-processors 302 to 311 in turn at step 603.

At the next step 604, image processing application 504 and default application data 505 is generated by CPU 201 as function-specific microcode 510 and forwarded to GPU 301, whereby said microcode 510 is subsequently stored by GPU 301 either in cache 302, dynamic memory 304, or a combination thereof at step 605. A question is subsequently asked at 606 as to whether a portion of said function-specific microcode 510 instructs GPU 301 to configure a portion of frame buffer 309 as a temporary buffer, within which successive iterations of fragments will be stored during processing. If the question of step 606 is answered positively, GPU 301 apportions said addressable dynamic RAM 309 according to the needs of application 504, specified in said microcode 510. The combination of GPU 301 and its sub-processors is thus fully initialised for generating the output data of application 504, whereby the default Graphical User Interface (GUI) may now be output to VDU 111 at step 608. Alternatively, the question of step 606 is answered negatively, such that there is no requirement for a temporary buffer, thus control is directly forwarded to said step 608, whereby the default Graphical User Interface (GUI) may now be output to VDU 111 at step 608.

FIG. 7

A graphical representation of the GUI of application 504 generated according to step 608 is shown in FIG. 7, including a color selection interface.

VDU 111 is shown and displays the GUI 701 of operating system 501. Said GUI 701 includes at least one user-actionable widget 702, presenting user 110 with standard operating system tasks such as file browsing upon activation. The GUI 703 of image processing application 504 is shown overlaid over GUI 701 and includes a plurality of user-operable widgets, the functionality of some of which specify parameters, i.e. application data 505.

GUI 703 includes a first display area 704 within which image data acquired at step 406 is displayed to user 110 for interaction therewith. In the example, first image data comprises analyst 116 standing in front of bluescreen 117, as captured by digital camera 114 and initially processed by digital video capture application 503. Within said display area 704, a moveable color selection interface 705 is provided for user 110 to intuitively select the red, green and blue color component values of a pixel defining the background color to be keyed out. Preferably, the two-dimensional co-ordinates of interface 705 within area 704 are updated in real-time from the two-dimensional co-ordinates defined by the translation of mouse 113 or a stylus over a graphic tablet.

Upon positioning interface 705 satisfactorily, user 110 may subsequently either click on a pressure-sensitive button of mouse 113 or press a key of keyboard 112 to activate his selection, wherein the RGB color component values of the pixel currently designated by interface 705 are read as a first parameter and stored in application data 505. GUI 703 includes a second display area 706 configured with user-operable sliders, the function of which is to finely adjust the values derived from the above selection with interface 705. Thus area 706 is configured with sliders 707, 708 and 709 ranging between 0 (no color) and 255 (full color) for each of the red, green and blue color components respectively.

A third display area 710 is provided within which further sliders may be operated in a manner similar to sliders 707, 708 and 709 in order to provide image processing application 504 with additional application data 505. Within said area 710, a first slider 711 is provided to allow user 110 to specify how much application 504 is tolerant to divergence between the foreground colors and the background colors. A second slider 712 is provided to allow user 110 to configure how much softness application 504 should apply to edges within image 704. Finally a third slider 713 is provided to allow user 110 to refine the level of softness applied by application 504, which is known according to the present invention as flare suppression. Each of sliders 711 to 713 preferably ranges between 0 and 1, whereby the value identified by the position of the selector in said sliders is a floating point value.

FIG. 8

With the GUI 703 displayed onto VDU 111, user 110 may now select a preferred image keying process according to step 405, which is described in further detail in FIG. 8.

In the preferred embodiment, user 110 may select one of three available image keying processing functions f(DK), f(LK) and f(CK) by means of activating keys of keyboard 112 mapped to each of said image keying processing functions. Alternatively, GUI 703 may provide a selection interface for the same purpose, for instance by means of a "keying selection" drop-down menu or even by means of a user-operable pop-up menu, both types of which are known. According to the present embodiment, all three functions f(DK), f(LK) and f(CK) are stored as microcode in memory 303 and/or cache 302 upon completing the initialisation step 404.

At step 801, a first question is asked as to whether user input has been received to select difference keying as the appropriate image keying processing function, f(DK). If the question of step 801 is answered positively, said user input data is sent by CPU 201 after interpretation to GPU 301, which in turn configures fragment processor 310 according to the present invention to fetch then process said image keying processing function f(DK) at step 802.

Difference keying involves recovering the transparency mask of analyst 116 within a foreground from an identical reference background which must be provided, whereby said background-without-analyst and foreground-with-analyst are compared for "difference", said difference being said transparency mask. User 110 may alter parameters in the function such as the threshold $\tau$ controlling how much the function is tolerant to divergence of the foreground and background colors, ranging from 0 to 1, and the softness $\sigma$ controlling the softness of the edges in the image to be matted, also ranging from 0 to 1.

The keying function f(DK) is implemented in microcode and processed by fragment processor 310 as an equation:

$$a = \mathrm{clamp}\left(\frac{|C - C_b|^2 - \tau}{\Delta}, 0, 1\right)$$

where C is the input color pixel, $C_b$ is the reference background color pixel and $\Delta = 3[1-\tau-(1-\sigma)(1-\tau)]$. After a is computed as above, the color value of each pixel is processed with the following equation to remove the color of the background:

$$C_f = C - (1-a)C_b$$

The final pixel $C_f$ contains the foreground image, i.e. analyst 116, along with the backing color removed by means of its opacity value a.

Alternatively, the first question of step 801 is answered negatively, whereby a second question is asked at step 803 as to whether user input has been received to select luminance keying as the appropriate image keying processing function, f(LK). If the question of step 803 is answered positively, said user input data is sent by CPU 201 after interpretation to GPU 301, which in turn configures fragment processor 310 according to the present invention to fetch then process said image keying processing function f(LK) at step 804.

Luminance keying involves extracting a matte of an image frame having image data which matches a user-defined luminance value, the advantage of this processing function being that a specific luminance range may be specified independently of the hue data. The keying function f(LK) is implemented in microcode and processed by fragment processor 310 as an equation:

$$a = \mathrm{clamp}\left(\left(\frac{|C| - \tau}{\Delta}\right)^2, 0, 1\right)$$

where C is the input color pixel, $\tau$ is a threshold value and $\Delta$ is a scaling value.

Alternatively, the second question of step 803 is answered negatively, whereby a third and final question is asked at step 805 as to whether user input has been received to select chroma-keying as the appropriate image keying processing function, f(CK). If the question of step 805 is answered positively, said user input data is sent by CPU 201 after interpretation to GPU 301, which in turn configures fragment processor 310 according to the present invention to fetch then process said image keying processing function f(CK) at step 806. Alternatively, the third question of step 805 is answered negatively, whereby control is returned to question 801 and the process steps are repeated as described above until such time as an image keying processing function is selected.

The present description of the preferred embodiment will hereinafter describe the chroma-keying function f(CK) processed by fragment processor 310 in further detail, but it will be understood by those skilled in the art that the present embodiment is not limited to said function nor is it limited within the context of a graphics accelerator to the use of said fragment processor.

FIG. 9A

FIG. 9A shows a first source frame 901, ie image data acquired at step 406, depicting a foreground image of analyst 116 over a substantially uniform background of a blue backing color 117, of a stream of such image frames captured by the camera 114, wherein the frequency of said stream is defined as the shutter speed of said camera, which in the example is twenty-five frames per second corresponding to the European PAL broadcast format. Thus, image capture application 503 preferably processes twenty-five image frames with sound per second into image data with a format acceptable by image processing application 504 for subsequent further processing.

FIG. 9B

FIG. 9B shows said first source frame 901 after first processing by said image capture application 503, wherein said source frame is now configured into a finite number of picture screen elements (pixels) defining the total size of the frame, i.e. its resolution, which depends upon the resolution capability of the camera 114 itself, the format selected for image capture application 503 output image data, for instance Bitmap, JPEG or an alternative such image data format, whether compressed or uncompressed.

The image data is thus shown over which a mesh 911 has been superimposed to figuratively represent the resolution thereof in pixels. It will be apparent to those skilled in the art that said pixels are shown artificially enlarged for clarity and illustrative purposes only. In effect, first display area 704 of the image processing application 504 according to the invention displays pixels 911 according to the image data acquisition step 406, before the matte thereof is generated according to the user parameter selection step 406. Pixels 911 are thus supplied to GPU 301 under the form of four vertices, respectively the upper right corner, upper left corner, lower right corner and lower left corner of the array of pixels 911, i.e. the image frame, and a texture comprising all of the pixels 911 within the array, including their color characteristics.

FIG. 9C

FIG. 9C shows values conferred to the picture screen elements shown 911 in FIG. 9B in order to generate a matte of the captured image data 901.

The RGB color component values of the pixels representing the blue background 117 have a relatively similar configuration, which is the background's blue property, whilst the RGB color component values of the pixels representing the analyst 116 have a dissimilar configuration, including variations based upon skin tone, hair color, garment color and any other image component having RGB color component values differing substantially from those defining the uniform blue background.

For the purpose of clarity, pixels 911 are conferred values of either zero or one, representing a condition of "false" or "true" respectively, in the description of this figure only, whereby a more detailed description of said pixel evaluation will be provided hereinafter. According to the present invention, as the pixels defining the blue background 117 have fairly uniform RGB values selected with color selection interface 705, said pixels are processed by fragment processor 310 as defining the background to be removed and thus conferred a value 921 of zero. Conversely, the pixels defining the analyst 116 have dissimilar RGB values and are thus processed by fragment processor 310 and conferred a value 922 of one, indicating they are to be retained.

FIG. 9D

FIG. 9D provides an alternative representation of the conditional values 921, 922 applied to the pixels 911 shown in FIG. 9C, wherein pixels defining the uniform blue background 117 having a value of zero are whited out and pixels defining analyst 116 having a value of one are blacked out. It can therefore be observed that all pixels 911, 922 in the image frame 901 now have a uniform property, thereby defining a mask 931.

FIG. 9E

FIG. 9E shows the matte shown in FIG. 9D configured as alpha-channel image data according to the present invention for subsequent compositing.

In order to successfully blend the pixels defining the background image data from an alternative source, fragment processor 310 processes the first iteration of the rasterized source frame including the analyst 116 and the blue background 117 according to the present invention. The example mask 931 thus derived from said rasterized source frame by said fragment processor 310 is an image texture 941 stored in the temporary buffer portion of frame buffer 309. Fragment processor 310 processes the respective red, green, blue and alpha color component values of the pixels defining analyst 116 and uniform blue background 117 with the chroma-keying function f(CK), whereby said values remain unchanged insofar as analyst 116 is concerned but are nulled, save for a maximum transparency alpha-channel value with regard to blue background 117.

FIG. 9F

FIG. 9F shows captured image data shown in FIGS. 9A to 9D composited with background image data.

Further processing operations are performed by fragment processor 310, notably an alpha-channel blending operation known as "alpha blending", comprising blending the pixels 911 shown in FIG. 9B, the pixels defining alternative background image data 951 and the texture 941, whereby analyst 116 of texture 941 is correctly composited and only the black, conditionally "false" buffered pixel values are blended with said alternative pixels 951. Said blending operation is well-known to those skilled in the art and is for instance described in the "OpenGL Programming Guide", Third Edition, Addison-Wesley, ISBN 0201604582, at pp.220–232.

FIG. 10

The processing according to the present invention of the background frame 951 shown in FIG. 9F, the source frame 901 shown in FIG. 9A and the alpha-channel frame 941 shown in FIG. 9E is further illustrated in FIG. 10, in relation to the interactions between the frame buffer 309 and the fragment processor 310.

In the preferred embodiment of the present invention, the frame buffer 309 of graphics accelerator 206 is configured with a temporary buffer portion 1001 and a displayable image frame buffer portion 1002, upon GPU 301 receiving initialisation microcode 510 at step 404, whereby the temporary buffer 1001 is specified according to step 607. In the example, user 110 selects chroma-keying at step 405 by answering question 805 positively, whereby the chroma-keying function f(CK) portion of microcode 510 will be invoked and processed by fragment processor 310, to the exclusion of difference keying function f(DK) and luminance keying function f(LK).

First source frame 901 is received by pixel processor 307 at 1003, whereby the color attributes thereof are sent to fragment processor 310 at 1004, such that a first array of displayable pixels 1005 is generated therein and stored in portion 1001, having been processed as fragments including the rectangular shape of frame 901 as a three-dimensional data rasterized by rasterizer 306 and the image components, e.g. analyst 116 and blue background 117, as its color attributes. In accordance with the present description, the contents of temporary buffer 1001 are subsequently looped back to pixel processor 307 and thus a fragment processor 310 at 1006, whereby said fragment processor 310 generates the matte 941 of frame 901 and thus draws a corresponding second array of pixels 1007 in temporary buffer 1001, which may be understood as the alpha channel-based array of pixels of array 1005. The replacement background image frame data 951 is then supplied to pixel processor 307 at 1008 whereby, in a manner similar to source frame data 901, it is sent to fragment processor 310 and a third array of pixels 1010 thereof is drawn into temporary buffer 1001. As was the case for the data path 1006, the contents 1005, 1007 and 1010 of temporary buffer 1001 are looped back at 1111 to pixel processor 307 and thus eventually to fragment processor 310, whereby a subsequent blending function is processed to composite said contents into a final output image frame 1112.

Thus, according to the present invention, the extraction of the matte 941 from image data 901 is carried out by fragment processor 310 within graphics accelerator 206 and chroma-keying is performed within said accelerator 206, thereby configuring inexpensive image processing system 101 with a real-time image compositing processing capability traditionally reserved to much more expensive, specialist apparatus. To achieve this benefit, the chroma-keying function f(CK) is itself configured to process the red, green, blue and alpha values of each pixel as a low-level mathematical operation that may be processed by as limited a processor as fragment processor 310, an example of which is described further below.

FIG. 11

There are many ways of representing specific colors as co-ordinates in three-dimensional space. The RGB system is based on how much of each of the three primary colors red, green and blue is needed to produce a specified color. These values are then considered as co-ordinates in the RGB cube. Typically, values range either from zero to one or from zero to two hundred and fifty-five. The following description is based on values in the [0,1] range and if values in the [0,255] are used then they can be normalised by dividing through by two hundred and fifty-five.

FIG. 11 shows RGB cube 1101. Three-dimensional space is defined by red R-axis 1102, green G-axis 1103 and blue B-axis 1104. The cube is defined by all points having values in the range [0,1] on all three axes. Black, which is the absence of color, is at the origin, while white, which is the combination of the maximum of all three colors, is at the point (1,1,1). The primary colors red, green and blue are at points (1,0,0), (0,1,0) and (0,0,1) respectively, while the secondary colors yellow, magenta and cyan are at points (1,1,0), (1,0,1) and (0,1,1) respectively.

Shades of grey are achieved when the co-ordinates on all three axes are equal, and thus all greys lie on line 1105, defined as R=G=B, which runs from the black corner to the white corner.

Point 1106 represents the color of the blue screen behind the analyst in FIG. 1. It lies at the co-ordinates (0.2, 0.3, 0.8).

Other color systems use the concept of hue, saturation and luminance. For a given color, its luminance value is a linear function of its R, G and B values. Thus, black has the least luminance while white and the primary and secondary colors have maximum luminance. Roughly, therefore, increasing a color's luminance in RGB space means moving it away from black and towards white, in other words in the direction shown by line 1105.

Saturation is a concept defined by how far a particular color is from the shade of grey with equal luminance. The most saturated colors are the primary and secondary colors at the corners of the cube, while black, white and the greys in-between have no saturation. For example, point 1106 has a saturation value of 75%. Roughly, therefore, to increase the saturation of a specific color within the RGB cube it must be moved towards the edges of the cube and away from line 1105.

FIG. 12

FIG. 12 shows the RGB cube viewed from the white corner, i.e. down line 1105. The concept of hue is defined by the rotational position of a color when the cube is viewed in this way. It is traditionally measured from red, so that red is at zero degrees, yellow at sixty degrees, green at one hundred and twenty degrees, cyan at one hundred and eighty degrees, blue at two hundred and forty degrees and magenta at three hundred degrees.

It will now be clear that rotating a point about line 1105 changes neither the luminance nor the saturation of the color but only changes the hue. This is known as a hue shift. For example, point 1106 shown in FIG. 11 is also shown in FIG. 12. In this view of the RGB cube it is easy to see that the hue of this color lies between blue and cyan and that the color is mediumly saturated. The luminance cannot be shown since line 1105 extends out of the page. Rotating point 1106 by the angle shown at 1201 moves it to point 1202, which has the same saturation and luminance as point 1106 but it is now the bluest that it can be without changing these values. Perceptually, the color is neither brighter nor more vivid, but simply a different hue.

FIG. 13

FIG. 13 illustrates the steps needed to rotate a point in RGB space around line 1105, ie hue shift the color, by an angle γ. At step 1301 the point is rotated by 45° about the red axis and at step 1302 the point is rotated by 35.3° about the green axis. Twice-rotating line 1105 itself in this way translates it onto the blue axis and so at step 1303 the point is rotated by the desired angle γ around the blue axis. The point is then rotated by −35.3° about the green axis at step 1304 and by −45° about the red axis at step 1305 to return it to the RGB color-space.

FIG. 14

Rotations around the red, green and blue axes are well defined and combining these five rotations results in matrix 1401, called matrix T, as shown in FIG. 14. The transformation of a pixel C to its corresponding hue-shifted (transformed) pixel C is therefore defined as C=TC.

FIG. 15

This idea of changing a color's hue but not its saturation or luminance can be used in chroma-keying. If the talent is filmed against a background of a uniform backing color, a notion of distance from that color could be introduced such that pixels with colors close to the backing color, for example those belonging to the bluescreen that have the exact backing color or a color close to it, or those where the bluescreen is seen through a transparent object, are considered to be part of the background for compositing purposes. Pixels with colors further away from the backing color, i.e. those making up the talent, are considered to belong to the foreground. However, it is in practice impossible to have a backing color of pure blue and it is usually an arbitrary color close to blue. In order to use such a notion of distance, therefore, it would have to be defined between any two arbitrary points in the RGB cube. Such a distance would be computationally intensive.

It is possible however to define a distance between any arbitrary point and a specific point, such as the point (0,0,1) that is pure blue with maximum saturation and luminance. Equation 1501 shown in FIG. 15 defines such a distance value p for any pixel C, obtained by subtracting half the sum of the red and green values from the blue value. The higher the distance value, the closer the color is to pure blue. However, since the backing color is never blue, using this distance causes problems. For example, point 1106 at (0.2, 0.3, 0.8), a typical backing color, is perceptually an obvious blue. However, it has the same distance value (0.55) as the point (0.7, 0.2, 1.0) which is magenta. Magenta colors often result from reflections of the bluescreen onto blonde hair or fair skin and so the color of a pixel belonging to the talent could be at the same distance from blue as the backing color. Using ρ is clearly, therefore, not appropriate for chroma-keying in its current form.

However, if all the pixels in the source frame are hue-shifted as described with reference to FIG. 12, such that the backing color is as blue as possible, this problem is resolved. Pixels with the backing color will then be the ones in the image that are closest to blue. Pixels where the backing color is seen through a transparent object will be relatively close to blue, while the talent, which should contain none of the backing color, will be a long way from blue.

In the example, the backing color with co-ordinates at point 1106 can be hue-shifted to the point (0.25, 0.25, 0.8), which has a distance value of 0.56, by rotating it about line 1105 by 9°. Applying the same transformation to the magenta color gives the point (0.75, 0.2, 0.95). This point has a distance value of 0.48, which is less than the distance value of the transformed backing color. The magenta color is therefore further away from blue than the backing color.

Hence it is possible to hue-shift every pixel in the source frame by rotating them about the line 1105 by the angle necessary to make the backing color as blue as possible, thus giving, for each source frame pixel, a corresponding transformed pixel. ρ can then be used on the hue-shifted pixels to give, for each source frame pixel, a distance value measuring how far each corresponding transformed pixel is from blue. These distances can then be compared with the distance of the backing color from blue to determine which pixels belong to the foreground and which to the background, thus producing a matte. Depending on the distance value of the corresponding transformed pixel, a certain proportion of the backing color can then be subtracted from each source frame pixel to color-suppress the source frame 901.

This technique not only works when the backing color is not a uniform blue, but also in those cases when backing colors of different hues are used. For example, when filming a science fiction movie a director may want to shoot a blue-skinned alien against a green backing color. Transforming the co-ordinate system will move the green backing color to blue and the blue skin to red. Thus, the backing color will be considered as close to blue and the talent as a long way from blue.

FIG. 16

Graph 1601 illustrates how to obtain γ, the angle through which any color point must be rotated in order to make the color as blue as possible. Calculating γ for a selected pixel in the background therefore gives the necessary hue-shift angle for the source frame. Referring back to FIG. 12, it is clear that in order to hue-shift a color without changing its saturation or luminance it must be rotated about line 1105. When rotated, a color has a maximum distance value when it appears to be superimposed on the blue axis when the RGB cube is viewed from the white corner. As described with reference to FIG. 13, the rotation is performed by moving line 1105 onto the blue axis and then rotating the point around this line, before returning the co-ordinate system to its original position.

Graph 1601 shows the RGB co-ordinate system with the blue axis pointing out of the page towards the viewer. Rotation around this axis is now a two-dimensional problem. Point 1602 is point 1106 having been moved by steps 1301 and 1302. Angle χ is obtained by the inverse tan function of the value on the green axis divided by the value on the red axis, as shown by equation 1603, where C contains the original co-ordinates of point 1106 as in FIG. 15. λ, the total measurement from the red axis, is obtained as shown at 1604. χ is added to either $2\pi$ or $\pi$ or left unchanged, according to the quadrant in which the transformed point lies. This compensates for the periodic nature of the tan function.

Line 1605 illustrates the position of pure blue, which is at 240° from the red axis. γ is therefore obtained by subtracting angle λ from 240° as shown by equation 1606. Note that equations 1604 and 1606 are expressed in terms of radians although in this description degrees are used to facilitate understanding. In the current example, using the point (0.2, 0.3, 0.8) as the color of the selected background pixel, γ is calculated as 9°.

FIG. 17

FIG. 17 again shows the RGB cube 1101 and also shows point 1202, which is point 1106 rotated by 9° about line 1105, ie the point representing the hue-shifted backing color.

Comparing point 1202 with point 1106 as shown in FIG. 11, it can be seen that the point has clearly moved closer to blue. It will also be noted that the red and green components of point 1202 are equal. Referring to FIG. 12, it will be seen intuitively that in order for a point to appear superimposed on the blue axis when the RGB cube is viewed from the white corner, the red and green components must be equal. Mathematically, it can be shown that when a color is rotated around line 1105 by such an angle as to maximise its distance value, the red and green components will always be equal.

FIG. 18

A pixel belonging to source frame 901 is defined by a column matrix $C_S$ with four rows, the first three representing the color's components in the RGB cube and the fourth currently zero. The hue-shifted source frame pixel, $C_S'$, has been transformed in the above manner by an angle γ calculated with respect to the color of a selected background pixel.

The above-described transformation of the source frame pixels is only necessary to calculate the distance values of the corresponding transformed pixels. For each source frame pixel a transparency value is then calculated from the distance value, which is multiplied by the components of the backing color and subtracted from the components of the source frame pixel. This last calculation is in terms of the original pixels, not their hue-shifted counterparts, and they would therefore need to be transformed back to their original positions.

Equation 1801 therefore defines, for a source frame pixel $C_S$, a shifted distance value δ. This is the distance value of the corresponding transformed pixel $C_S'$. Half the red and green components of the shifted color are subtracted from the blue component of the shifted color. For any pixel in the source frame, therefore, the shifted distance value δ is equal to the distance value ρ of the corresponding transformed pixel. Using the identity $C_S'=TC_S$, it can be shown that δ is defined as in equation 1802, as follows.

Cos of γ is added to the square root of 3 multiplied by sin of γ. This is halved, negatived and multiplied by the original red components of the pixel. Cos of γ is then subtracted from the square root of 3 multiplied by sin of γ. This is then halved and multiplied by the original green component of the pixel. The original blue component of the pixel is multiplied by cos of γ. These three products are then summed. Thus the shifted distance value δ of a pixel describes how close its hue-shifted point $C_S'$ is to blue, but is calculated with respect to its original values $C_S$. Note that δ varies only with the color of the pixel. γ, the amount by which the source frame pixels are hue-shifted, is obtained from the selected background pixel and is the same for every pixel in the source frame.

FIGS. 19A and 19B

FIGS. 19A and 19B illustrate the idea of the ρ distance within the RGB cube. FIG. 19A illustrates RGB cube 1101 containing plane 1901. Plane 1901 is defined by all points having a distance value of zero. As can be seen, ρ is not a simple measurement in space, since, for example, using Euclidean geometry the point (0,0,0) is at a distance of one from blue, whereas the point (1,1,1) is at a distance of root 2 from blue, but both have the same distance value of zero. The ρ distance is a more intuitive distance, since black, white, all greys in between, the fuschia color at (1,0,½) and the aqua color at (0,1,½), which are all on plane 1901, are at a δ distance of one from blue.

FIG. 19B illustrates the two planes 1902 and 1903, which are defined by all colors having distance values of one half and minus one half respectively. It can be seen that according to the ρ distance, cyan, magenta and the saturated blue with low luminance at (0,0,½) are all at a distance of one half from blue. Red, green and the mediumly-saturated yellow with high luminance at (1,1,½) are all at a distance of one and a half from blue.

Therefore, using the ρ distance, cyan and magenta are relatively close to blue, grey, bright pink and greeny-blue are further away and red, green and yellow are furthest away.

The RGB cube can therefore be thought of as being composed of an infinite number of planes, each being defined by a different distance value. By picking any two of these planes a color-space polygon can be defined using the edges of the RGB cube. Traditionally, defining polygons in color-space is a complicated procedure, requiring many vertices to be defined. The method herein described allows a polygon to be defined by simply identifying two values of ρ.

It will be clear to anyone skilled in the art that if required the function defining the ρ distance can be altered to use red or green as the color to be measured from, instead of blue. Additionally, different functions could be developed allowing, for example, secondary colors to be used.

FIG. 20

Distance values, may therefore be used to color-suppress source frame 901. This means removing the backing color and making it black such that when the color-suppressed frame is composited with a replacement background frame 951 the background shows through where the backing color 117 was before. However, a transparency or opacity mask must be defined to decide firstly which parts of the source frame 901 should be color-suppressed and secondly to decide, in the final composited image, for any pixel position whether the color values should be taken from the color-suppressed source frame or from the replacement background frame 951.

A transparency value, which is equal to the opacity value α subtracted from one, basically measures how far it is from the color of a source frame pixel to the color of a selected background pixel but obtaining such values is computationally expensive. However, if all the pixels are hue-shifted this measurement remains the same but can be evaluated in terms of the difference between the shifted distance value of the background pixel and the shifted distance value of a source frame pixel. For any source frame pixel, therefore, a transparency value can be calculated that is a function of its shifted distance value, ie the distance value of the corresponding transformed pixel.

For any source frame pixel, a very simple transparency value could be set to one if the shifted distance value of the pixel equalled or exceeded the shifted distance value of the selected background pixel and to zero if not. However, this would only work with source frames having very well-defined foreground images. In practice a softness region is required where the foreground and replacement background images are merged slightly to create a natural-looking join. To achieve this transparency values must be between zero and one. A transparency value θ, is therefore defined as shown by equation 2001.

Firstly an upper threshold τ is defined as the shifted distance value of the backing color, $δ_K$. A softness value σ is defined between zero and one, and a lower threshold for θ is then defined as τ multiplied by one minus σ, as shown by equation 2002. For any source frame pixel, θ is then defined as the lower threshold subtracted from the shifted distance value of that pixel, all divided by the lower threshold subtracted from the upper threshold, which simplifies to σ multiplied by τ. The value of θ is clamped such that values below zero are set to zero, whereas values above one are set to one. This function is shown at 2003.

θ is a transparency value for each pixel and is used to obtain the color-suppressed red, green and blue values for each pixel. If the transparency value of a particular pixel is zero, the pixel is opaque. Its color-suppressed color will be the same as its original color, and in the final compositing that color will be shown at that position. If the transparency value of pixel is one then it is transparent. It therefore belongs to the backing color, and its color is fully suppressed to black, in order to allow the replacement background to show through in the final composited image.

Pixels which have transparency values of between zero and one are in the softness region. Source frame pixels in this region have a certain amount, dependent on θ, of the backing color subtracted from their color to give the color-suppressed pixel color. In the final compositing the same amount of the color of the replacement background pixel in the same position is added in.

Thus, when the picture is composited, pixels with a transparency value of zero will show only the color-suppressed foreground, pictures with a transparency value of one will show only the replacement background image, while pixels in the softness region will contain a blend of both. This has the effect of softening the line around the talent in addition to allowing semi-transparent objects to be composited correctly The softness value σ is adjusted to increase or decrease the size of the softness region. If σ is equal to zero, there is no softness region at all and source frame pixels are either unaltered or the whole of the backing color is subtracted. If σ is equal to one, the softness region is as large as possible. This means that all pixels having shifted distance values between zero and the upper threshold τ will be considered as being in the softness region. Pixels with negative values of δ will always be left unaltered in the destination foreground, no matter how large σ is made. This is because the lower threshold for θ will always be positive since σ and τ are positive.

Graph 2004 illustrates how the transparency value is changed when σ is altered. The softness region is indicated by the distance between the lower threshold and the upper threshold, and graph 2004 shows that a larger value of a increases the size of the softness region.

FIG. 21

FIG. 21 shows the threshold and softness planes used to color-suppress the the analyst shown in FIG. 1. Since the backing color is (0.2, 0.3, 0.8) the upper threshold τ is 0.56. Plane 2101 is defined by all points in the RGB cube having a distance value of 0.56.

The user has set the σ value to be 0.6, and this sets the lower threshold for θ to 0.22. Plane 2102 is defined by all points in the RGB cube having a distance value of 0.22.

FIG. 22

FIG. 22 illustrates how planes 2101 and 2102 define a polygon 2201, using the faces of the RGB cube to form the remaining sides. Thus pixels with a shifted distance value of above 0.56 are completely color-suppressed, pixels with a shifted distance value of below 0.22 are unaltered and pixels within the polygon 2201 are in the softness region. The transparency value increases linearly from the back face formed by plane 2102 to the front face formed by plane 2101.

FIG. 23

The equation for θ can be rewritten as equation 2301, defined as the shifted distance value δ divided by both σ and τ, all added to 1 minus the reciprocal of σ. Since this is in terms of δ, equation 1802, defining δ, can be substituted in as shown at equation 2302. A matrix $C_\theta$ can thus be defined for each pixel in a source frame. It contains the pixel's original RGB components from the matrix $C_S$, along with a θ value giving the transparency of the pixel. It is obtained by multiplying the original pixel values by matrix $M_\theta$, which is a 4×4 matrix containing the identity matrix in the first three rows and the definition of θ, as given by equation 2302, in the fourth row. Variables x, y and z are used to simplify the equation, where x is equal to cos of γ plus root 3 multiplied by sin of γ, y is equal to cos of γ minus root 3 multiplied by sin of γ, and z is equal to cos of γ. Thus, $C_\theta = M_\theta C$ as shown at 2303.

FIG. 24

The well known compositing equation is given at 2401. This states that for any pixel in a composited image, its color is given by the color of the color-suppressed source frame pixel in that position plus the color of the replacement background frame pixel in that position multiplied by 1 minus the opacity value of the source frame pixel. The color-suppressed source frame is that having the foreground image, in this case analyst 116, against a black background instead of the original background 117.

In this case, since the analyst 116 is shot against a nearly uniform backing color 117, it is a reasonable approximation to say that matrix $C_\theta$ is the result of the color-suppressed source frame being composited with a replacement background image comprising only the uniform backing color. Also, 1 minus the opacity value of the source frame pixel is the transparency value. Thus, as shown at equation 2402, $C_\theta$ is allowed to be equal to the color of the source frame pixel in that position plus the transparency multiplied by the backing color.

Rearranging this gives equation 2403, which defines the color-suppressed source frame pixel in a particular position as the transparency value of the pixel θ multiplied by the backing color $C_K$, all subtracted from $C_\theta$. Since $C_\theta$, θ and $C_K$ are all known, the color-suppressed source frame $C_D$ can be obtained. This can then be input into equation 2401, along with an additional frame as a replacement background, to give a final composited pixel value for every pixel in the image.

Hence each pixel is color-suppressed by subtracting its transparency value θ multiplied by the backing color from its original colors. This is shown by equation 2404, which can be written as a column matrix having the following entries: θ multiplied by the red component of the backing color subtracted from the red component of the source frame pixel, θ multiplied by the green component of the backing color subtracted from the green component of the source frame pixel, θ multiplied by the blue component of the backing color subtracted from the blue component of the source frame pixel, and θ. This is shown by equation 2405.

The matrix $C_{D\theta}$ can therefore be defined as the product of matrices $M_K^A$ and $C_\theta$ added to matrix $M_K^B$, as shown by equation 2405. Matrix $M_K^A$ is a 4×4 matrix having as its first three columns the identity matrix and whose fourth column is $-C_K$. Matrix $M_K^B$ is a column vector whose first three rows are zero and fourth is one.

FIG. 25

Suppressing the backing color of a frame is the most crucial step in chroma-keying. However when filming against a bluescreen, blue light often reflects onto light portions of talent, particularly the skin and blonde hair. This is normally removed by a process known as flare-suppression. Parts of the talent in the foreground image have some of the blue suppressed to produce a flare-suppressed source frame.

Like chroma-keying, traditional flare-suppression algorithms are complicated and cannot be implemented using 4×4 matrices. Typically the process involves calculating, for each component in the backing color, a compensating value which should be added on in order to send the backing color to a grey of equal luminance. Calculating these compensating values is usually difficult. Again the backing color $C_K$ is hue-shifted to $C_K$ in order to make the computation easier.

The transformed backing color has the same luminance as the original backing color and therefore removing the saturation from either results in exactly the same shade of grey.

Greys occur when all three components are equal, and so equation 2501 stipulates that $C_{Kr}$ plus a first amount $\Delta_r$ must equal $C_{Kg}$ plus a second amount $\Delta_g$ which must equal $C_{Kb}$ plus a third amount $\Delta_b$. Equation 2502, which stipulates that the sum of the three amounts must be equal to zero, ensures that the resulting grey has the same luminance as the backing color. Clearly, therefore, at least one of $\Delta_r$, $\Delta_g$ or $\Delta_b$ must be negative.

If these equations can be solved and a mask produced that shows only the parts of the talent that needs flare-suppressing then flare-suppression is then a relatively simple matter, but the two equations have three variables to solve for which normally makes the solution difficult. However, the result of the hue-shift, as discussed with reference to FIG. 17, is to make the red and green components of the transformed backing color equal. Thus, as shown at equation 2503, $\Delta_r$ is equal to $\Delta_g$. There are now three equations to solve the three variables, and this is a simple task resulting in the solutions shown at 2504, which are that the first and second amounts, $\Delta_r$ and $\Delta_g$, are equal to a third of the threshold value $\tau$, while the third amount $\Delta_b$ is equal to minus two thirds of the threshold value $\tau$. These simple variables can be easily implemented using 4×4 matrices.

FIG. 26

The flare-suppression however should not be applied to the entire image. Only parts of the talent which are bluer than they should be are to be flare-suppressed. Therefore, a mask must be defined, similar to the color-suppression mask defined by the transparency values $\theta$. Such a mask is defined by the flare value $\beta$ in FIG. 26. The user specifies a flare-suppression value, $\phi$, in addition to the softness value $\sigma$. The upper threshold for $\beta$ is $\tau$, as with $\theta$, and the lower threshold is $\phi$ subtracted from $\tau$ multiplied by 1 minus $\phi$ multiplied by 1 minus $\sigma$. These thresholds are shown by equations 2601 and 2602.

For any pixel, its flare value is defined by the lower threshold subtracted from its shifted distance value $\delta$, all divided by the the lower threshold subtracted from the upper threshold, with the result clamped between zero and one as shown by equation 2603. Graph 2604 illustrates the flare-suppression region where $\delta$ values are between the lower threshold and the upper threshold. It illustrates how the greater the value of $\phi$, the larger the flare-suppression region. Note that, unlike the softness region, the flare-suppression region can extend into negative values of $\delta$. The definition of the lower threshold for the flare values ensures that it will always be less than (or equal to, if the flare-suppression value $\phi$ is set to zero) the lower threshold for the transparency values.

FIG. 27

The lower threshold for $\beta$ defines another plane in the RGB cube. FIG. 27 shows, in the current example, plane 2101 given by upper threshold $\tau$ and plane 2102 given by the lower threshold for $\theta$, both as shown in FIG. 21, and also shows plane 2701 which is that given by the lower threshold for $\beta$. The user has set a $\phi$ value of 0.4, which yields a lower bound for $\beta$ of −0.27, and pixels with $\delta$ values of −0.27 are on plane 2701.

FIG. 28

The polygon created by the three planes 2101, 2102 and 2701 is shown in FIG. 28. For all pixels having hue-shifted colors outside the polygon on the blue side, $\theta$ and $\beta$ are both equal to one. These are pixels that belong to the backing color. Pixels with hue-shifted colors falling in the first area of the polygon 2201, that defined between plane 2101 and plane 2102, have both transparency and flare values between zero and one. These pixels fall within both the softness region and the flare-suppression region. Pixels whose hue-shifted colors fall within polygon 2802, defined between plane 2101 and plane 2701, have zero transparency values but flare values between zero and one. These pixels are not in the softness region but are in the flare-suppression region. Transformed pixels with colors outside the polygon on the green/red side of the cube have both transparency and flare values set to zero. These pixels belong to areas of the analyst which neither belong to the softness region nor should be flare-suppressed.

FIG. 29

As for $\theta$, $\beta$ is defined in terms of the shifted distance value $\delta$ as shown by equation 2901. $\beta$ can be written as the lower bound of $\beta$, $L_\beta$, divided by $L_\beta$ subtracted from $\tau$, all subtracted from $\delta$ divided by $L_\beta$ subtracted from $\tau$. Matrix $C_\beta$, which contains a pixel's source red, green and blue component values plus a flare value $\beta$, is defined as shown by equation 2902. This is a 4×4 matrix that has as its first three rows of the identity matrix and as its last row equation 2901 combined with equation 1802 that defines $\delta$. This matrix is called $M_\beta$, and so $C_\beta$ is defined as $M_\beta$ multiplied by $C_S$.

FIG. 30

For each source frame pixel color component, the amounts $\Delta_r$, $\Delta_g$ and $\Delta_b$ must be multiplied by its flare value before being added on to its red, green and blue hue-shifted components respectively. Thus, for example, to obtain the flare-suppressed red component of a pixel its flare value is multiplied by $\Delta_r$ and the result is added on to its hue-shifted red component $C_{Sr}$. This is shown by equation 3001, where a matrix $M_\Delta$ is multiplied by a matrix $C_\beta$. Matrix $M_\Delta$ has as its first three columns the 4×4 identity matrix and in its last column it has the amounts that must be added on to each of the components for flare-suppression, ie $\Delta_r$, $\Delta_g$ and $\Delta_b$. $C_\beta$ contains the hue-shifted color components of the pixel together with the pixel's flare value $\beta$. This gives a matrix $C_{\phi\beta}$, which contains the flare-suppressed pixel color components and the pixel's $\beta$ value.

However, these amounts are the amounts that are added onto the transformed backing color, and the actual compensating values should be those necessary to send the original backing color to grey. In order to obtain these it is recalled that $C_S$ equals $TC_S$ as shown by equation 3002. Each side of equation 3001 is then multiplied by the inverse of $\tau$, as shown by equation 3003. Since $T^1 T$ is equal to one, this gives the definition of $C_{\phi\beta}$, which is in terms of the original pixel components, as $C_\beta$ multiplied by matrix R multiplied by matrix $M_\Delta$ multiplied by matrix $T^1$, as shown by equation 3004.

It can be shown that the matrix $T^1 M_\Delta T$ can be written as matrix $M_\phi$ as shown by equation 3005. Matrix $M_\phi$ has as its first three columns the 4×4 identity matrix, while its fourth column contains the three compensating values and one. The first compensating value is $\Delta_r$ multiplied by x, the second compensating value is $\Delta_g$ multiplied by y, and the third compensating value is $\Delta_b$ multiplied by z, where x, y and z are as defined in FIG. 23.

FIG. 31

For any pixel in source frame 901, matrix $C_{\phi\beta}$ contains the flare-suppressed red, green and blue values plus the flare value β. However, once flare suppression has taken place flare values are no longer necessary and transparency values are needed in order to carry out the color suppression. Equation 3101 defines the transparency value θ in terms of β, which is obtained by eliminating δ. θ is equal to the upper threshold τ minus the lower threshold for β divided by both σ and τ, subtracted from one, and all added to β multiplied by the upper threshold τ minus the lower threshold of β divided by both σ and τ. This is substituted into equation 3005 to give equation 3102, which defines matrix $C_{\phi\beta}$. This matrix contains, for any pixel, its flare-suppressed red, green and blue components along with its transparency value. It is obtained by multiplying matrix $C_\beta$ by a matrix $M_\phi^A$ and adding the result to matrix $M_\phi^B$. Matrix $M_\phi^A$ is identical to matrix $M_\phi$ except that the bottom right value is not one but the upper threshold τ minus the lower threshold of β divided by both σ and τ. Matrix $M_\phi^B$ is a column vector whose first three values are zero and last value is the upper threshold τ minus the lower threshold of β divided by both σ and τ, all subtracted from one. Thus, at this stage, the matrix $C_{\phi B}$ contains the already flare-suppressed color components and a θ value that can be used to perform color suppression.

FIG. 32

Referring back now to FIG. 24, the matrix transformations for color suppression are given by equation 2406. If flare suppression has already taken place then a proportion of the backing color will have already been subtracted from pixels that are to be color-suppressed, since the color-suppression region falls completely within the flare-suppression region. This proportion is equal, for each component, to the flare value multiplied by the compensating value for that component. Replacing $C_\theta$ with $C_{\phi\theta}$ (which contains the flare-suppressed pixel color values) and compositing matrix $M_K^A$ with matrix $M_\phi^A$ to give matrix $M_K^C$, as shown in equation 3201, color-suppresses, according to the mask defined by the transparency values, the already flare-suppressed source frame.

FIG. 33

Graph 3301 plots transparency values θ and flare values β against shifted distance values δ. For values between −1 and $L_\beta$, the lower threshold for β, both θ and β are zero. Pixels with shifted distance values falling into this region are neither flare-suppressed nor color-suppressed and therefore belong to areas of the analyst that do not need correcting.

Pixels with shifted distance values between the lower bound for β, $L_\beta$, and the lower bound for θ, $L_\theta$, have zero transparency values but flare values between zero and one. These pixels are not color-suppressed but are flare-suppressed and therefore belong to areas of the analyst that have blue reflections but are not in the softness region.

Pixels with shifted distance values between $L_\theta$ and the upper threshold τ have both transparency and flare values between zero and one. These pixels fall into the softness region on the edge of the analyst and also require flare suppression. Pixels with shifted distance values between the upper threshold τ and 1 have both transparency and flare values of one. These pixels are fully color-suppressed and flare-suppressed and in the fully suppressed source frame will be black or very close to black. These are pixels that have the backing color.

FIG. 34

FIG. 34 details the effect of the color-suppression and flare-suppression in terms of the final image, which is a blending of the fully suppressed (ie flare-suppressed and color-suppressed) source frame 901 with a certain amount of the replacement background frame 951, determined by the transparency values θ. Equation 3401 gives, as an example, the final value of the red component of a pixel after being flare-suppressed, color-suppressed and composited with a pixel from the replacement background frame in the same position. For any pixel, its final red component $C_{Fr}$ is equal to the fully suppressed source frame red component $C_{Dr}$ added to the replacement background frame red component $C_{Br}$ multiplied by, 1 minus the opacity α. The fully suppressed source frame red component $C_{Dr}$ is obtained from equation 3201 with equation 3102 substituted in, and is θ multiplied by the red component of the backing color $C_{Kr}$ subtracted from the red component of the source frame pixel $C_{Sr}$, all added to a third of τ multiplied by x(the first compensating value) multiplied by θ subtracted from β. Substituting this into the compositing equation and replacing 1 minus α by θ gives equation 3401.

A pixel with both θ and β equal to zero belongs to the foreground image, ie analyst 116, and does not require any sort of color correction. Therefore the final composited red component $C_{Dr}$ simply equals the original source frame red component $C_{Sr}$. Since the opacity of this pixel is one none of the background image is added, and since its flare value is zero it is not flare-suppressed. This is shown at equation 3402.

If a pixel has a transparency value of zero but a flare value between zero and one it belongs to a part of the analyst 116 that contains blue spill but does not belong to the softness region. The opacity of a pixel in this area is one and so the background image does not show through. As shown by equation 3403, the fully suppressed red component $C_{Dr}$ is therefore equal to the source red component $C_{Sr}$ added to a third of β multiplied by τ multiplied by x. It will be recalled that a third of τ multiplied by x is the first compensating value that must be added on to the red component of the backing color during the process of sending the backing color to grey. In the flare-suppressed regions a proportion, given by β, of this amount is added to the red component. Since β increases the more blue the pixel is, this controls how much flare-suppression is applied to each pixel.

Pixels that have both β and θ values between zero and one belong to the softness region of analyst 116. The final composited red component $C_{Dr}$ in this region is that given by equation 3401. Since the pixel is in the softness region the final color should be a mixture of the source frame pixel color and the replacement frame pixel color, but it should also be flare-suppressed. Therefore a smaller proportion of the first compensating value is added than for pixels not in the softness region, the proportion being given by θ subtracted from β. A proportion, given by θ, of the backing color red component $C_{Kr}$ is subtracted and the same amount of the red component $C_{Br}$ of the replacement background pixel at that position is then added on.

Pixels that have both β and θ equal to one belong to the background 117 and have the backing color or a color very close to it. Here the compensating value is cancelled out and so the fully suppressed red component $C_{Dr}$ is given by the backing color red component $C_{Kr}$ subtracted from the source frame red component $C_{Sr}$, the result of which is approximately equal to zero. Similarly, the fully suppressed green and blue components are approximately equal to zero. The fully suppressed color $C_D$ for these pixels is therefore black. Since these pixels have an opacity of zero the background image shows through completely. In the final image, therefore, the colors of these pixels are equal or very close to the colors of the corresponding pixels of the replacement background frame 951.

FIG. 35

FIG. 35 shows the three calculations that must be performed to fully suppress (ie color-suppress and flare-suppress) a source frame. Firstly, as shown by equation 3501, the source foreground pixel $C_S$ is multiplied by matrix $M_\beta$ (defined in FIG. 29). The values are then clamped between zero and one. This gives the flare-suppression mask provided by the flare values $\beta$. The color components of the pixel are unchanged at this point.

Secondly, as shown by equation 3502, the result of 3501 is multiplied by the matrix $M_\phi^A$ and added to matrix $M_\phi^B$ (both defined in FIG. 31). The values are then clamped between zero and one. This gives the flare-suppressed red, green and blue components as determined by the flare-suppression mask, and also gives the color-suppression mask provided by the transparency values $\theta$. At this point, therefore, the output is the flare-suppressed pixels of the source frame and the transparency mask.

Thirdly, as shown by equation 3503, the result of 3502 is multiplied by matrix $M_K^A$ and added to matrix $M_K^B$ (both defined in FIG. 24). The values are then clamped between zero and one. This color-suppresses the red, green and blue components according to the color-suppression mask, and also gives an opacity value $\alpha$, which is equal to 1 minus $\theta$. The output at this stage is the fully suppressed source frame with a matte provided by the opacity values.

The opacity value is then used to blend the fully suppressed source frame, comprising only the foreground of analyst 116 over a black background, with the replacement background frame 951, as described in FIG. 34. The transparency mask given by $\theta$ can be kept instead of the opacity mask $\alpha$ but most compositing software uses opacity values. Alternatively, the fully suppressed source frame matrix $C_D$ can be split into two matrices, one containing only the color values and the other containing only the opacity value. These matrices can then be used to blend the foreground and background as described with reference to FIG. 9.

FIG. 36

It is possible to perform the color-suppression and the flare-suppression separately. Firstly, letting $\phi$ be equal to zero makes all the pixels' $\beta$ and $\theta$ values equal. Referring back to FIG. 34 it will be seen that this eliminates the flare-suppression. However, the two processes may also be completely separated. FIG. 36 shows the calculations necessary to perform only color suppression. Firstly, as shown by equation 3601, the source foreground pixel $C_S$ is multiplied by matrix $M_\theta$ (defined in FIG. 23). The values are then clamped between zero and one. This gives the color-suppression mask provided by the transparency values but at this stage the color components of the pixel are unchanged.

Secondly, as shown by equation 3602, the result of equation 3601 is multiplied by matrix $M_K^A$ and added to matrix $M_K^B$ (both defined in FIG. 24). The values are then clamped between zero and one. This color-suppresses the source foreground according to the color-suppression mask and also gives an opacity value $\alpha$. The output is therefore only color-suppressed and not flare-suppressed and also contains a matte given by the opacity values.

FIG. 37

FIG. 37 shows the calculations necessary to perform only flare suppression. Firstly, as shown by equation 3701, the source frame pixel $C_S$ is multiplied by matrix $M_\beta$ (defined in FIG. 29). The values are then clamped between zero and one. This gives the flare-suppression mask provided by the flare values. The color components of the pixel are unchanged at this point.

Secondly, as shown by equation 3702, the result of equation 3701 is multiplied by matrix $M_\phi^C$ and added to matrix $M_\phi^D$. Matrix $M_\phi^C$ is identical to matrix $M_\phi^A$ (defined in FIG. 31) except that the fourth value of the fourth column is negative, as shown by identity 3703. Matrix $M_\phi^D$ is identical to matrix $M_\phi^D$ (defined in FIG. 31) except that the fourth value is $\tau$ minus the lower threshold for $\beta$, all divided by both $\sigma$ and $\tau$, as shown by identity 3704. The results are then clamped between zero and one. This flare-suppresses the source frame according to the flare-suppression mask, and also provides an opacity value $\alpha$.

The flare-suppressed frame output by this process will have a near-uniform grey background. It cannot be immediately composited with a background image using the compositing equation given here but the output includes opacity values and so the frame may be used with another compositing technique.

FIG. 38

Returning to the implementation of the compositing on a graphics accelerator, the calculations shown in FIGS. 35 to 37 are converted into functions and are implemented in fragment processor 310. However first the user must interact with the application. Referring back to FIG. 4, the user chooses the keying method at step 405. He can choose between difference keying, luminance keying, full chroma-keying, color suppression only or flare suppression only. Difference keying and luminance keying have already been described with reference to FIG. 8. For any of the types of chroma-keying, the parameters are initialised as follows. The backing color is assumed to be pure blue at (0,0,1) and the threshold value $\tau$ is therefore set at one. The softness value $\sigma$ and/or the flare-suppression value $\phi$ are both set to zero, depending on the type of suppression chosen.

A source frame 901 is received at step 406 and at step 407 the keying application is interacted with. This is detailed in FIG. 38. At step 3801 a question is asked as to whether the user has changed any of the parameters. If this question is answered in the negative then control is directed to step 408. However, if it is answered in the affirmative then at step 3802 a question is asked as to whether the user has changed the backing color. The user may do this either by selecting a pixel in the source foreground image or by altering the RGB values as shown in FIG. 7. It is also contemplated that the backing color may be automatically selected by the application. If this question is answered in the affirmative the hue-compensation angle $\gamma$ for that backing color is calculated at step 3803 and at step 3804 the upper threshold $\tau$ is calculated. $\tau$ is re-calculated when the backing color changes but can then be altered by the user if required.

At this point, and if the question asked at step 3802 is answered in the negative, meaning that only the parameters $\sigma$, $\tau$ or $\phi$ have been changed, then at step 3805 the variables used in the various matrices are calculated based on the backing color and the parameters $\gamma$, $\sigma$, $\tau$ and $\phi$.

Control then proceeds to step 408 when the source frame 901 is sent as a texture to the GPU along with the variables identified at step 3805.

FIG. 39

A standard graphics card is used to perform chroma-keying by inputting the source frames as textures and associating them with certain functions. Steps carried out by a fragment processor are shown in Figure H. For each fragment the appropriate function is identified at step H1 by reading the fragment header, and the fragment is processed at step H5. FIGS. 39 to 44 therefore show functions carried out by the fragment processor at step H5.

When the user has selected full chroma-keying the fragment processor carries out the calculations identified in FIG. 35 by performing three passes. FIG. 39 shows the function carried out in the first of these passes. At step 3901 a source frame pixel $C_S$ is multiplied by matrix $M_\beta$ and at step 3902 the resultant values are clamped between zero and one. Returning to Figure H, the pixel is then drawn in the frame buffer at step H6 and the fragment is copied to the texture processor at step H8, since this function calls for a reprocess. Once all pixels have been processed in this way the new texture, comprising the processed fragments, is input back into the fragment processor to be processed as shown in FIG. 40.

FIG. 40

FIG. 40 illustrates the second function carried out by the fragment processor. At step 4001 the clamped matrix $C_\beta$ is multiplied by the matrix $M_\phi^A$. At step 4002 the result of step 4001 is added to matrix $M_\phi^B$. At step 4003 the resultant values are clamped between zero and one. Once all pixels have been processed in this way the new texture is input back into the fragment processor to be processed as shown in FIG. 41.

FIG. 41

At step 4101 the clamped matrix $C_{\phi\theta}$ is multiplied by matrix $M_K^C$. At step 4102 the resultant values are added to matrix $M_K^B$. At step 4103 the resultant values are clamped between zero and one. Once all pixels have been processed in this way they are written to the frame buffer. In this case the function does not call for a reprocess. The fully suppressed source frame is therefore left in the frame buffer to be blended with the replacement background image. Alternatively, it can be split into two layers, one containing the color information and one containing the matte information, before blending.

In some more advanced fragment processors it is possible to perform all three steps in a single pass. In that case the three functions shown in FIG. 35 are combined into a single function which does not call for a reprocess.

FIG. 42

If the user has selected only flare suppression the fragment processor carries out the calculations identified in FIG. 36 by performing two passes. The function carried out at the first pass is the same as that shown in FIG. 39. FIG. 42 shows the function carried out in the second of these passes.

At step 4201 the clamped matrix $C_\beta$ obtained on the first pass is multiplied by matrix $M_\phi^C$. At step 4202 the resultant values are added to matrix $M_\phi^B$. At step 4203 the resultant values are clamped between zero and one. Once all pixels have been processed in this way they are written to the frame buffer to be processed further in some way.

FIG. 43

If the user has selected only color suppression the fragment processor carries out the calculations identified in FIG. 37 by performing two passes. FIG. 43 shows the function carried out in the first of these passes.

At step 4301 the source frame pixel $C_S$ is multiplied by matrix $M_\theta$. At step 4302 the resultant values are clamped between zero and one. Once all pixels have been processed in this way the new texture is input back into the fragment processor to be processed as shown in FIG. 44.

FIG. 44

At step 4401 the clamped matrix $C_\theta$ is multiplied by matrix $M_K^A$. At step 4401 the resultant values are added to matrix $M_K^B$. At step 4403 the resultant values are clamped between zero and one. Once all pixels have been processed in this way they are written to the frame buffer, either as a single layer or as two layers, foreground and matte, to be blended with the background image.

FIG. 45

With reference to the description to FIG. 1, an aim of the processing application 504 according to the present invention is to facilitate the generation of a matte from a source frame 901 to composite a portion of said frame, defined as a foreground image, with a replacement background 951. A typical application for which the compositing function of the present invention is provided, is shown in FIG. 45, including a dynamic internet page configured with a webcasting portion displayed within an internet browser.

A VDU 4501 is shown and displays the GUI 4502 of a computer's operating system, comparable in purposes and functionality to operating system 501. Said GUI 4502 includes a plurality of user-actionable widgets 4503, representing standard operating system tasks. A second GUI 804 of an internet browsers comparable in purposes and functionality to browser 502 is shown overlaid on GUI 4502 and features a plurality of conventional browser tasks widgets, including a "go to my home page" widget 4505, a "stop navigation" widget 4506 and navigation widgets 807. In the example, the browser 4504 displays an active server page (ASP) 4508 broadcast over the internet 108 by the financial website described in FIG. 1.

Accordingly, ASP 4508 features financial information in different formats, which include for instance a bar chart 4509, pie charts 4510 and a statistical comparison chart portion 4511. In the example, charts 4509, 4510 and statistical data in portion 4511 are updated in real-time from various stockmarkets around the world. Analyst 116 shown in FIG. 1 is commissioned to comment the financial information described above in real-time also and is optionally identified by name shown at 4512. In an alternative embodiment of the present invention, a plurality of analysts are similarly commissioned around the world to simultaneously provide the same real-time commenting, for instance in their respective natural tongue, and are thus selectively broadcast over the internet to various geographical areas but composited over the same background, i.e. ASP 4508. In yet another alternative embodiment the background may be a two-dimensional representation of a three-dimensional "virtual set".

In the figure, analyst 116 is shown partially overlaying bar chart 4509. The reason for this partial obstruction is that analyst 116 is captured against the blue background 117, wherein in the final composited frame analyst 116 constitutes the foreground image and the bluescreen 117 constitutes the backing color keyed out and replaced with ASP 4508 according to the present invention.

The invention claimed is:

1. Image editing apparatus, comprising processing means, input means and selection means; wherein a source frame comprising a foreground image against a solid background color is provided to said processing means via said input means, wherein said source frame is composed of a plurality of pixels, each pixel being represented by three components defining a position within a color space; wherein said processing means is configured to:

calculate a transformation that maximizes a distance value of a selected pixel in the background, which when applied to any pixel in said source frame defines a transformed pixel, wherein for any pixel said distance value describes how close its color is to a specified color;

calculate first, second and third compensating values, wherein said compensating values are functions of amounts that when added to the first, second and third components respectively of the transformed selected background pixel minimize saturation of said transformed selected background pixel but leave luminance unaltered;

calculate a flare value for each pixel in said source frame, wherein for each said pixel said flare value is a function of the distance value of the transformed pixel; and for each pixel in said source frame, multiply the first, second and third compensating values by the flare value of said source frame pixel and add multiplication results to the first, second and third components respectively of said source frame pixel to suppress flare of the background color from said foreground image.

2. Image editing apparatus according to claim 1, wherein said transformation is a hue shift that leaves saturation and luminance unaltered.

3. Image editing apparatus according to claim 1, wherein said specified color is a specified primary color, selected from the group of primary colors red, green and blue, with maximum saturation and luminance.

4. Image editing apparatus according to claim 3, wherein said components are amounts of said three primary colors red, green and blue.

5. Image editing apparatus according to claim 4, wherein for any pixel in said source frame said distance value is defined as the component that represents said specified primary color minus half of each of the remaining components.

6. Image editing apparatus according to claim 5, wherein said specified primary color is blue.

7. Image editing apparatus according to claim 5, wherein for each pixel in said source frame said flare value is defined as a lower threshold subtracted from the distance value of the transformed pixel, all divided by said lower threshold subtracted from an upper threshold, with the result clamped between zero and one.

8. Image editing apparatus according to claim 7, wherein said lower threshold is defined as a first constant subtracted from the product of one minus said first constant, one minus a second constant and said upper threshold.

9. Image editing apparatus according to claim 8, wherein said upper threshold is defined as the distance value of said transformed selected background pixel.

10. Image editing apparatus according to claim 1, wherein:

said first compensating value is defined as a third of the product of said upper threshold and a first variable;

said second compensating value is defined as a third of the product of said upper threshold and a second variable; and said third compensating value is defined as minus two thirds of the product of said upper threshold and a third variable.

11. Image editing apparatus according to claim 10, wherein said upper threshold is defined as the distance value of said transformed selected background pixel.

12. Image editing apparatus according to claim 1, wherein said processing means is a graphics accelerator card.

13. Image editing apparatus, comprising processing means, input means and selection means; wherein a source frame comprising a foreground image against a solid background color is provided to said processing means via said input means, wherein said source frame is composed of a plurality of pixels, each pixel being represented by three components defining a position within the RGB color space; wherein said processing means is configured to:

calculate a transformation that maximizes a distance value of a selected pixel in the background, which when applied to any pixel in said source frame defines a transformed pixel, wherein:

for any pixel said distance value describes how close its color is to a specified primary color with maximum saturation and luminance, and said transformation is a hue shift that leaves saturation and luminance unchanged;

calculate first, second and third compensating values, wherein said compensating values are functions of the amounts that when added to the first, second and third components respectively of the transformed selected background pixel minimize the saturation of said transformed selected background pixel but leave the luminance unaltered;

calculate a flare value for each pixel in said source frame, wherein for each said pixel said flare value is a function of the distance value of the transformed pixel; and for each pixel in said source frame, multiply the first, second and third compensating values by the flare value of said source frame pixel and add multiplication results to the first, second and third components respectively of said source frame pixel to suppress flare of the background color from said foreground image.

14. Image editing apparatus according to claim 13, wherein for any pixel in said source frame said distance value is defined as the component that represents said specified primary color minus half of each of the remaining components.

15. Image editing apparatus according to claim 13, wherein for any pixel said flare value is defined as a lower threshold subtracted from the distance value of the transformed pixel, all divided by said lower threshold subtracted from an upper threshold, with the result clamped between zero and one, wherein:

lower threshold is defined as a first constant subtracted from the product of one minus said first constant, one minus a second constant and said upper threshold, and said upper threshold is defined as the distance value of said transformed selected background pixel.

16. Image editing apparatus according to claim 13, wherein:

said first compensating value is defined as a third of the product of said upper threshold and a first variable;

said second compensating value is defined as a third of the product of said upper threshold and a second variable; and said third compensating value is defined as minus two thirds of the product of said upper threshold and a third variable.

17. A method of suppressing flare in a source frame comprising a foreground image against a solid background color, wherein said source frame is composed of a plurality of pixels and each pixel is represented by three components defining a position within a color space; comprising:

calculate a transformation that maximizes a distance value of a selected pixel in the background, which when applied to any pixel in said source frame defines a transformed pixel, wherein for any pixel said distance value describes how close its color is to a specified color;

calculating first, second and third compensating values, wherein said compensating values are functions of the amounts that when added to the first, second and third components respectively of the transformed selected background pixel minimize saturation of said transformed selected background pixel but leave luminance unaltered;

calculating a flare value for each pixel in said source frame, wherein for each said pixel said flare value is a function of the distance value of the transformed pixel; and for each pixel in said source frame, multiplying the first, second and third compensating values by the flare value of said source frame pixel and adding multiplication results to the first, second and third components respectively of said source frame pixel.

18. A method of suppressing flare in a source frame according to claim 17, wherein said transformation is a hue shift that leaves saturation and luminance unaltered.

19. A method of suppressing flare in a source frame according to claim 17, wherein said specified color is a specified primary color, selected from the group of primary colors red, green and blue, with maximum saturation and luminance.

20. A method of suppressing flare in a source frame according to claim 19, wherein said components are amounts of said three primary colors red, green and blue.

21. A method of suppressing flare in a source frame according to claim 20, wherein for any pixel in said source frame said distance value is defined as the component that represents said specified primary color minus half of each of the remaining components.

22. A method of suppressing flare in a source frame according to claim 21, wherein said specified primary color is blue.

23. A method of suppressing flare in a source frame according to claim 21, wherein for each pixel in said source frame said flare value is defined as a lower threshold subtracted from the distance value of the transformed pixel, all divided by said lower threshold subtracted from an upper threshold, with the result clamped between zero and one.

24. A method of suppressing flare in a source frame according to claim 23, wherein said lower threshold is defined as a first constant subtracted from the product of one minus said first constant, one minus a second constant and said upper threshold.

25. A method of suppressing flare in a source frame according to claim 24, wherein said upper threshold is defined as the distance value of said transformed selected background pixel.

26. A method of suppressing flare in a source frame according to claim 17, wherein:
said first compensating value is defined as a third of the product of said upper threshold and a first variable;
said second compensating value is defined as a third of the product of said upper threshold and a second variable; and
said third compensating value is defined as minus two thirds of the product of said upper threshold and a third variable.

27. A method of suppressing flare in a source frame according to claim 26, wherein said upper threshold is defined as the distance value of said transformed selected background pixel.

28. A method of color-suppressing a source frame that has been flare-suppressed according to claim 16, in which the following additional steps are performed:

for each pixel in said source frame, calculating a transparency value, wherein for each said pixel said transparency value is a function of the distance value of the transformed pixel;

for each pixel in said source frame, adding the first, second and third components of the selected background pixel to the first, second and third compensating values respectively and multiplying the results by the transparency value of the source frame pixel to produce first, second and third color-suppression amounts; and for each pixel in said flare-suppressed source frame, subtracting the first, second and third color-suppression amounts from the first, second and third components respectively of the flare-suppressed pixel to additionally color-suppress said flare-suppressed source frame.

29. A method of compositing an additional frame with a source frame that has been flare-suppressed and color-suppressed according to claim 28, wherein said additional frame is composed of a plurality of pixels, each pixel being represented by three components defining a position within the color space and each pixel corresponding in position to a pixel in said source frame; in which the following additional steps are performed for each pixel in the fully suppressed source frame:

multiplying the components of the corresponding pixel in said additional frame by said transparency value for the source frame pixel; and adding multiplication results to the fully suppressed components of the source frame pixel.

30. A method of suppressing flare in a source frame comprising a foreground image against a solid background color, wherein said source frame is composed of a plurality of pixels and each pixel is represented by three components defining a position within a color space; comprising the steps of:

calculating a transformation that maximizes a distance value of a selected pixel in the background, which when applied to any pixel in said source frame defines a transformed pixel, wherein:

for any pixel said distance value describes how close its color is to a specified primary color with maximum saturation and luminance, and said transformation is a hue shift that leaves saturation and luminance unchanged;

calculating first, second and third compensating values, wherein said compensating values are functions of the amounts that when added to the first, second and third components respectively of the transformed selected background pixel minimize the saturation of said transformed selected background pixel but leave the luminance unaltered;

calculating a flare value for each pixel in said source frame, wherein for each said pixel said flare value is a function of the distance value of the transformed pixel; and for each pixel in said source frame, multiplying the first, second and third compensating values by the flare value of said source frame pixel and adding the multiplication results to the first, second and third components respectively of said source frame pixel.

31. A method of suppressing flare in a source frame according to claim 30, wherein for any pixel in said source frame said distance value is defined as the component that represents said specified primary color minus half of each of the remaining components.

32. A method of suppressing flare in a source frame according to claim 30, wherein for any pixel said flare value is defined as a lower threshold subtracted from the distance value of the transformed pixel, all divided by said lower threshold subtracted from an upper threshold, with the result clamped between zero and one, wherein:

lower threshold is defined as a first constant subtracted from the product of one minus said first constant, one minus a second constant and said upper threshold, and said upper threshold is defined as the distance value of said transformed selected background pixel.

33. Image editing apparatus according to claim 30, wherein:

said first compensating value is defined as a third of the product of said upper threshold and a first variable;

said second compensating value is defined as a third of the product of said upper threshold and a second variable; and said third compensating value is defined as minus two thirds of the product of said upper threshold and a third variable.

34. A method of compositing an additional frame with a source frame that has been flare-suppressed according to claim 30, wherein said additional frame is composed of a plurality of pixels, each pixel being represented by three components defining a position within the color space and each pixel corresponding in position to a pixel in said source frame; in which the following steps are performed for each pixel in said flare-suppressed source frame:

calculating a transparency value, wherein for each said pixel said transparency value is a function of the distance value of the corresponding transformed pixel;

adding the first, second and third components of the selected background pixel to the first, first, second and third compensating values respectively, and multiplying addition results by the transparency value of the source frame pixel to produce first, second and third totals;

subtracting the first, second and third totals from the first, second and third components respectively of the flare-suppressed source frame pixel to produce a color-suppressed pixel; and multiplying the components of the corresponding pixel in said additional frame by said transparency value and adding the multiplication results to the components of said color-suppressed pixel.

* * * * *

UNITED STATES PATENT AND TRADEMARK OFFICE
CERTIFICATE OF CORRECTION

| | |
|---|---|
| PATENT NO. | : 7,084,879 B2 |
| APPLICATION NO. | : 10/324565 |
| DATED | : August 1, 2006 |
| INVENTOR(S) | : Benoit Sevigny |

It is certified that error appears in the above-identified patent and that said Letters Patent is hereby corrected as shown below:

Column 1, Line 29-30, change "ultimatte" to --ultimate--.
Column 7, Line 10, change "three dimensional" to --three-dimensional--.
Column 8, Line 67, after "9F" insert --.--.
Column 10, Line 65, change "LabS$^{TM}$'s" to --Labs$^{TM}$'s--.
Column 13, Line 30, change "Inc," to --Inc.,--.
Column 17, Line 7, change "ie" to --i.e.--.
Column 20, Line 51, change "ie" to --i.e.--.
Column 20, Line 52, change "angely." to --angle y.--
Column 20, Line 59-60, Delete "-35.3° about the green axis at step 1304 and by -45° about the red axis at step 1305 to return it to the RGB color-space." and insert the same in line 57 after "rotated by".
Column 22, Line 58, change "maximise" to --maximize--.
Change 24, Line 32, change "ie" to --i.e.--.
Column 25, Line 15, after "correctly" insert --.--.
Column 25, Line 31, After "value of" change "a" to -- σ --.
Column 25, Line 35, After "color-suppress the" delete "the".
Column 27, Line 41, After "by the" delete "the".
Column 28, Line 39, change "ie" to --i.e.--.
Column 28, Line 49, change "$_T$," to --T,--.
Column 29, Line 64, change "ie" to --i.e.--.
Column 30, Line 19, change "ie" to --i.e.--
Column 31, Line 3, change "ie" to --i.e.--.
Column 32, Line 3, "MΦ$^D$" to --MΦ$^B$--.
Column 36, Line 62, change "calculate" to --calculating--.
Column 40, Line 9, after "the first," delete "first,".

Signed and Sealed this

Thirtieth Day of January, 2007

JON W. DUDAS
*Director of the United States Patent and Trademark Office*